United States Patent [19]

Getzinger et al.

[11] Patent Number: 4,972,314
[45] Date of Patent: Nov. 20, 1990

[54] DATA FLOW SIGNAL PROCESSOR METHOD AND APPARATUS

[75] Inventors: Thomas W. Getzinger, La Habra; Hans L. Habereder, Anaheim; R. Loyd Harrison, Fullerton; Donald M. Hopp, Fullerton; David L. Mitchell, Fullerton; Chao-Kuang Pian, Anaheim; John A. Propster, La Mirada, all of Calif.

[73] Assignee: Hughes Aircraft Company, Los Angeles, Calif.

[21] Appl. No.: 218,520

[22] Filed: Jul. 5, 1988

Related U.S. Application Data

[63] Continuation of Ser. No. 736,600, May 20, 1985.

[51] Int. Cl.$^5$ .............................................. G06F 13/14
[52] U.S. Cl. .................................. 364/200; 364/232.22
[58] Field of Search ... 364/200 MS File, 900 MS File

[56] References Cited

U.S. PATENT DOCUMENTS

| | | | |
|---|---|---|---|
| 4,153,932 | 5/1979 | Dennis et al. | 364/200 |
| 4,177,514 | 12/1979 | Rupp | 364/200 |
| 4,227,245 | 10/1980 | Edblad et al. | 364/200 |
| 4,302,818 | 11/1981 | Niemann | 364/200 |
| 4,393,468 | 7/1983 | New | 364/736 |
| 4,541,048 | 9/1985 | Propster et al. | 364/200 |
| 4,590,555 | 5/1986 | Bourrez | 364/200 |
| 4,646,231 | 2/1987 | Green et al. | 364/200 |
| 4,675,806 | 6/1987 | Uchida | 364/200 |

Primary Examiner—Michael R. Fleming
Assistant Examiner—Debra A. Chun
Attorney, Agent, or Firm—Wanda K. Denson-Low

[57] ABSTRACT

A single instruction stream multiple data steam data flow signal processor and method for implementing macro data flow control, in which a plurality of data processors have contentionless access to global memory data. Data processing tasks for the data processors, such as primitive executions together with graph scheduling processes, are developed asynchronously and in parallel from a command program and a macro data flow control graph.

15 Claims, 49 Drawing Sheets

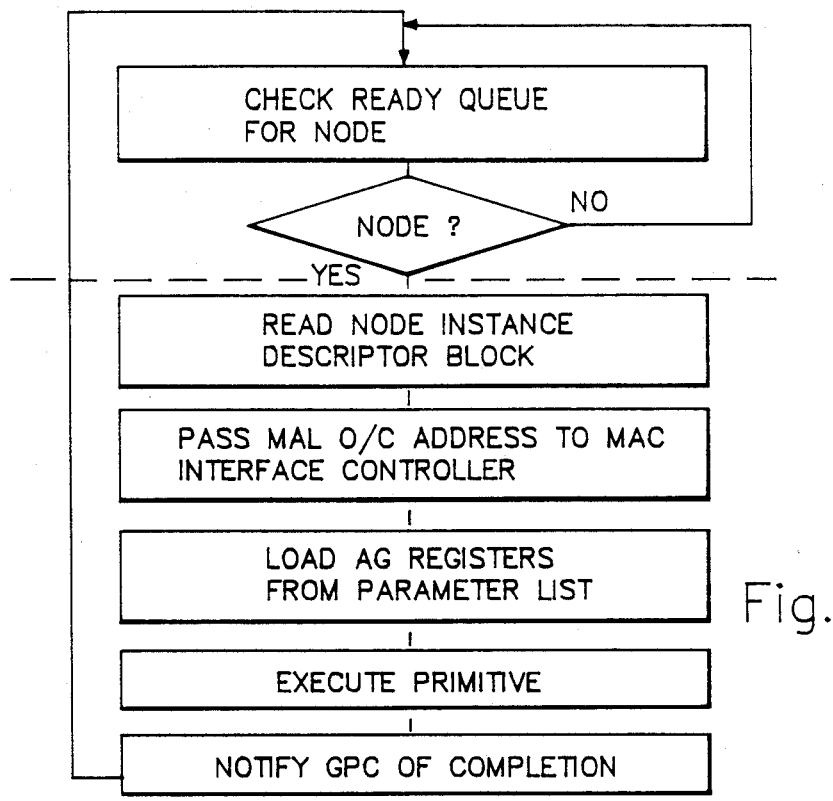
Fig. 41
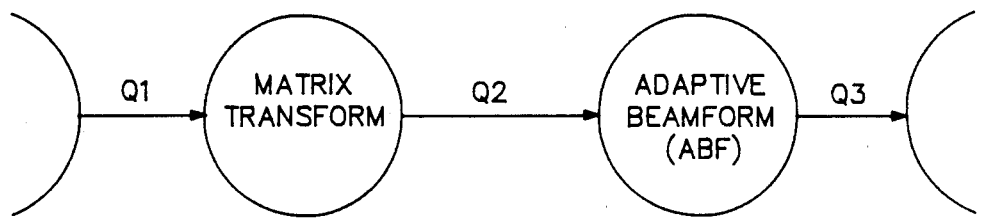
(1) PORTION OF ABF BENCHMARK GRAPH
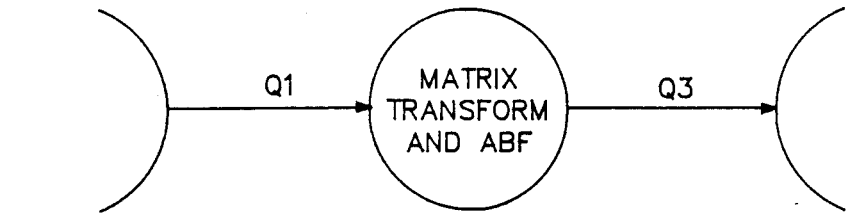
(2) MATRIX TRANSFORM AND ABF COMBINED INTO SINGLE SUPER-PRIMITIVE (Q2 ELIMINATED)
Fig. 43

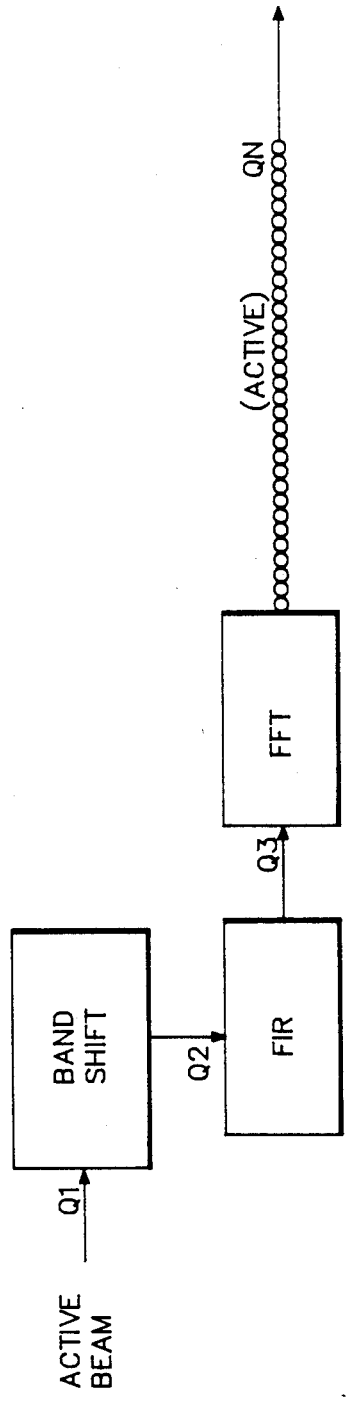
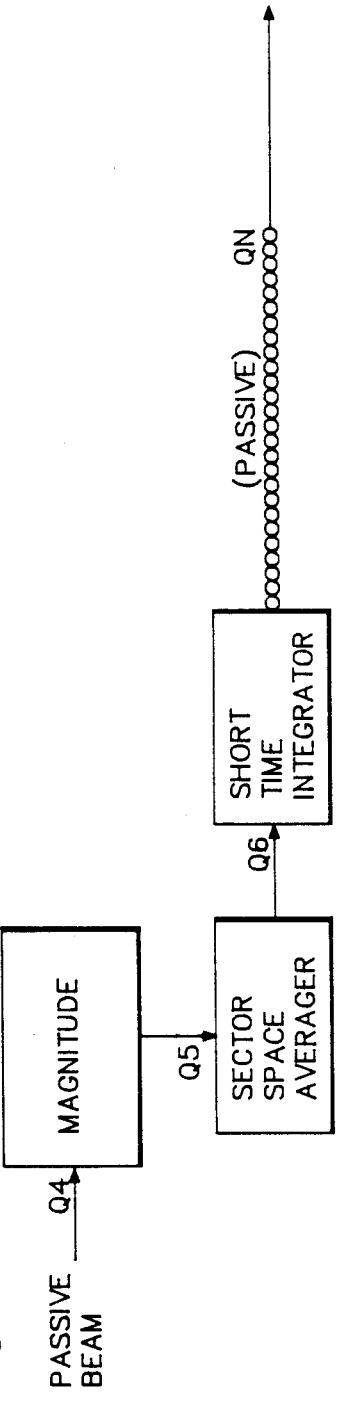
Fig. 55a
Fig. 55b

DATA FLOW SIGNAL PROCESSOR METHOD AND APPARATUS

This application is a continuation of application Ser. No. 06/736,600, filed May 20, 1985.

BACKGROUND OF THE INVENTION

1. Field of the Invention

This invention relates generally to single instruction stream multiple data stream signal processors and, more particularly, to such signal processors employing macro data stream or data flow methodology and to improved data processing methods therefor.

2. Description of Related Art

The benefits of macro data flow methodology are not realizable when implemented on contemporary data processing architectures. In such instances, signal processing tasks are allocated to specific processors prior to run-time system execution, either manually or by the use of complicated software tools, often achieving less than satisfactory results. The allocation of signal processing tasks to specific processors requires that data be transferred from one processor to another in order to continue the next signal processing task in sequence. Such signal processing task assignments involve significant overhead due to the time required to transfer data between processors, contributing to processor overloading. Equally important, these contemporary signal processing architectures neither allow for dynamic real-location of tasks nor for degraded performance envelope processing. These inherent limitations in contemporary signal processing architectures seriously limit implementation of the data flow programming methodology due the absence of key features which are necessary to support data flow operating system functions.

SUMMARY OF THE INVENTION

This improved data flow signal processor is a signal processor network architecture which provides a partitioned global memory for elimination of memory access contention. This maximizes the arithmetic processing bandwidth for efficient support of macro data flow functions by providing an inherently high performance data communication medium in the global memory and a special purpose high-speed signal processing graph process controller for dynamic allocation and control of resources. This improved data flow signal processor efficiently supports macro data flow signal processing programming methodology for a wide range of applications. A high performance graph node scheduler is also provided for macro data flow operating system functions. Signal processing tasks are dispatched to multiple arithmetic processors which proceed with processing independently and concurrently. The key to arithmetic processor efficiency is the partitioned global memory to which all arithmetic processors have access to data queues without contention by utilization of a time division multiplexing access technique.

In contemporary signal processing architectures, the generation and maintenance of signal processing software is proving to be an expensive and time-consuming process. The data flow programming methodology proposed herein solves such problems by elevating programming tasks to a higher level, which is more understandable. Software is, therefore, easier to generate and to maintain and is less error prone in its development. The key to this software efficiency is a signal processing architecture which efficiently implements macro data flow concepts. The improved data flow signal processing architecture described herein provides dynamic allocation and control of signal processing resources which allows dynamic reconfiguration in the run-time environment. This feature is the key in support of macro data flow operating system functions. Tasks can be redirected easily during the run-time environment under the control of the graph node scheduler. In this improved architecture, a partitioned global memory, to which all processors have access without contention, provides the data communication medium which is the key to efficient macro data flow task allocation. Now all processors have access to any data set at any time without contention. These improved architectural features provide significant advantages over those of a statically reconfigurable architecture of the prior art in which task allocation is performed prior to system start-up.

The realization of data flow programming methodology goals is essential in future systems to provide a cost effective and maintainable product of high quality. However, achievement of data flow methodology ideals is too often compromised due to hardware and architecture limitations, thus limiting dynamic reconfiguration and data transfer capabilities which are the key data flow concepts. This improved data flow signal processor achieves dynamic task allocation and control, and intraprocessor data communication efficiency, thus making true macro data flow methodology a viable signal processing approach.

BRIEF DESCRIPTION OF THE DRAWINGS

FIG. 41 illustrates the processing sequence of an arithmetic processor;

FIG. 43 shows how two contiguous nodes are combined

FIGS. 55a and b illustrate typical simplified beam graphs; and

DESCRIPTION OF A PREFERRED EMBODIMENT

This signal processor is a flexible signal processing system that addresses a wide variety of sonar, radar, communications and electro-optical processing applications. By reason of its organizational concept, or its architecture, it efficiently utilizes available resources to achieve the required throughput without user intervention. Table I summarizes the key approaches.

TABLE I

| APPROACH TO KEY DATA FLOW SIGNAL PROCESSOR REQUIREMENTS | |
|---|---|
| KEY REQUIREMENT | APPROACH |
| Modularity for full range of applications | Replication of only six basic building blocks |
| Ease of programming | Proven support software |
| Ease of maintenance | Proven signal processor fault isolation techniques |
| Ease of operational upgrades | Data flow architecture which readily accommodates new tasks |
| Ease of technology upgrades | Functional blocks designed to accept new technology when available |
| Assured operation throughout mission | Software which simply deletes failed elements for uninterrupted operations |

The versatility of this signal processor in meeting such diverse requirements is a direct consequence of its programmability, configurability and modularity. The system is designed to meet the needs of applications that require a high performance, i.e., 6–384 MHz, fixed or floating point multiplication rate capability in a cost effective manner. Its modular design provides graceful degradation; 72,000 hours, meantime between failure at 50% capacity as well as fault isolation through diagnostics to one card for over 80% of the faults.

Figure 1:
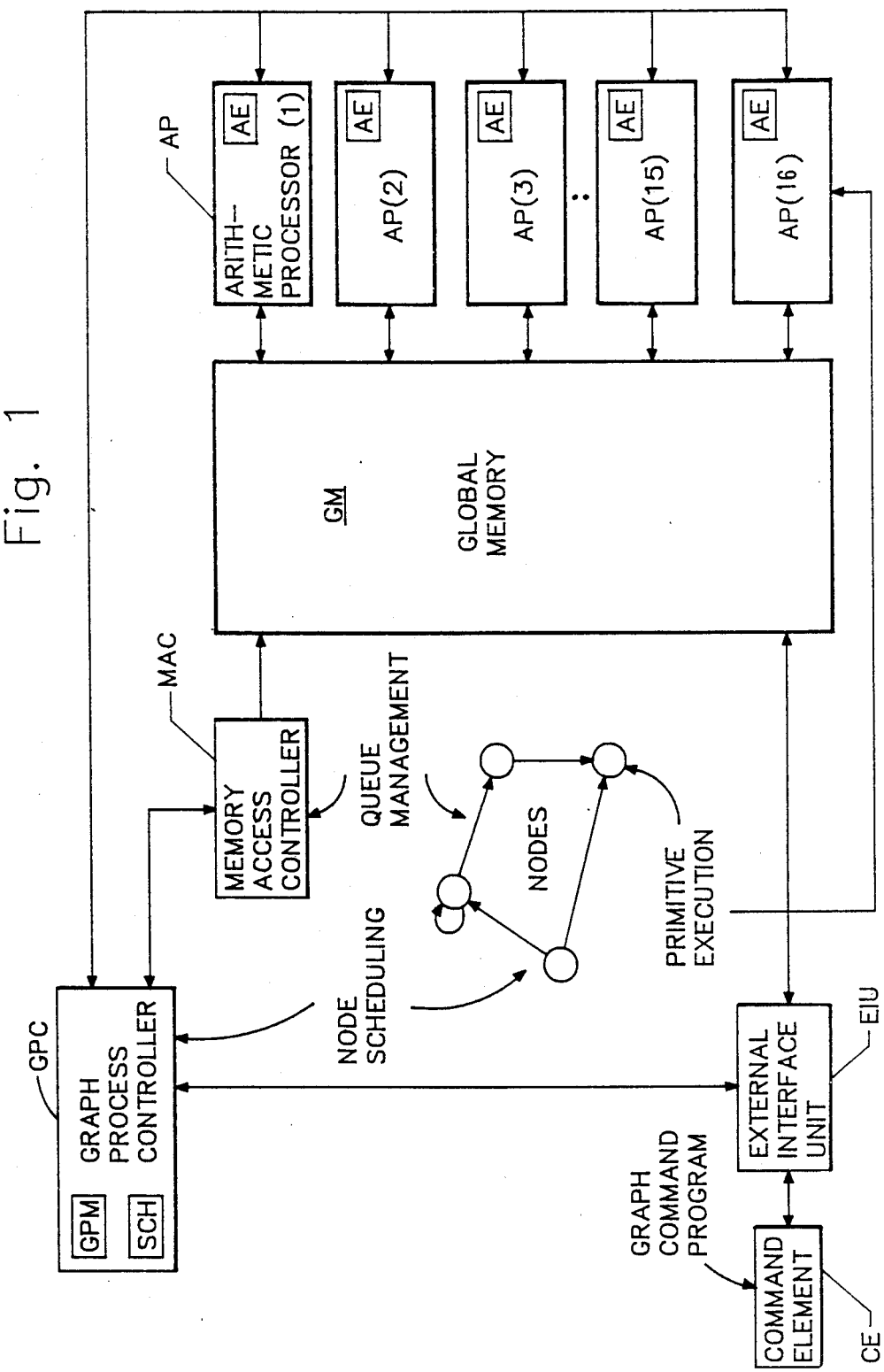
FIG. 1 is a block diagram of an improved data flow signal processor architecture for implementing macro data flow control.

This signal processor efficiently implements the macro data flow programming methodologies in that the logical or virtual machine is very close to the physical machine. The implementation architecture is shown in FIG. 1. Here, individual arithmetic processors (AP) are coupled to a global memory (GM). This global memory, as will be considered in greater detail at a later point, is partitioned and provides efficient support to macro data flow control functions, eliminating memory access contention and providing the processing bandwidth required for present and future systems. Queue management, node scheduling and primitive execution are depicted among a memory access controller (MAC), a graph process controller (GPC) and the arithmetic processors (AP). A command element (CE) provides the graph program via an external interface unit (EIU) to the graph process controller and program loading communication with the global memory (GM). As will be evident as this description develops, to implement the macro data flow control methodology and provide the required processing capability, the architecture provides dedicated hardware in areas to off-load the software. Also, as will be described at a later point, the architecture provides a virtual global queue storage directly accessible by up to 32 arithmetic elements (AE), in which case there are two arithmetic elements for each arithmetic processor. Both floating and fixed point arithmetic are supported by this signal processor. These features provide efficient and dynamic resource allocation without the need for elaborate software to determine data path connections, thereby eliminating bus traffic congestion.

The global memory (GM), is expandable and provides parallel read or write paths through multiple data ports coupled to the arithmetic processors in a "round-robin" fashion. This global memory is also designed to contain time division multiplex registers (FIGS. 17 and 18) which, when accessed by the arithmetic processors, act as parallel to serial "caches" on each clock cycle. This guarantees global memory access to any queue and the capability of executing any node without data transfers. The architecture provides dynamic memory allocation which operates in conjunction with the graph process controller (GPC) to provide dynamic scheduling of processing tasks to the asynchronous arithmetic processors (AP), thereby allowing any arithmetic processor to process any node. This structural organization allows straightforward implementation of data queue management in the macro data flow control methodology. Although not illustrated, provision is conveniently made for thorough testability of hardware with fault detection/fault location features incorporated into the hardware. An important aspect of this design is the extensive provision for hardware redundancy for failed element replacement. The advantages of the architecture of FIG. 1 are:

(1) The virtual (logical) machine and physical machine functions are extremely close allowing run-time allocation of the data flow signal processor resources rather than compile-time allocation;

(2) System support software and application software development are greatly simplified;

(3) Fault tolerance is provided because resource allocation is done at run-time;

(4) The machine structure naturally allows and encourages function/node chaining via high-order languages entirely within the arithmetic processors (AP) for super primitives that are developed; and (5) Only one arithmetic processor type is required for all data flow signal processor performance envelopes.

The global architecture of a data processing system of the type of FIG. 1 allows the use of simple system application concepts to achieve cost effective signal processing system solutions. It provides a wide range of signal processing capabilities. By observing a few simple system application concepts, it is possible to achieve cost effective signal processing systems using this data flow signal processor architecture. Several application concepts are discussed below.

Parallel Processing Concept

With reference to FIG. 1, high throughput is achieved by using multiple arithmetic processors (AP), each with one or two arithmetic elements (AE). The total data flow signal processor throughput capability is the sum of the individual capabilities of all of the arithmetic processors. The throughput for a single iterative primitive may not exceed a single arithmetic processor's throughput since, by definition, iterative primitives cannot be executed in parallel across multiple arithmetic processors. An example of an iterative primitive is the infinite impulse response filter. An example of a noniterative primitive performing the same filtering function is a finite impulse response filter. Even though the entire throughput exceeds the arithmetic processor's maximum for a benchmark with many channels and beams, no single iterative primitive exceeds the throughput capability of a single arithmetic processor.

Scheduling Concept

Although nodes are not illustrated in detail in FIG. 1, node scheduling is referred to, using node symbols. Scheduling time to update nodes and to prepare a node for execution is minimized through the use of dedicated hardware, including the nodes. The scheduling time of a node is a function of the input/output queues associated with that node, plus a fixed time for processing. The scheduling time is independent of the batch size (the number of samples processed). Arithmetic processing time is a function of the primitive algorithm and the batch size. If the scheduling time exceeds the arithmetic processing time, which generally does not occur, the arithmetic processing time can be increased by increasing batch size and the scheduler time can be decreased by stringing primitives together (using super primitives).

Global Memory Bandwidth Concepts

Each scheduled node receives data from the global memory (GM), directs it for processing in an arithmetic processor, resulting in new data which is returned to the global memory. The arithmetic element, or elements, (AE) of each arithmetic processor, accesses one serial global memory word per clock cycle and the arithmetic element processing is two multiplication operations per clock cycle. The transfer of the data of some primitives from the global memory to the arithmetic element of the arithmetic processor and from the arithmetic element to the global memory requires more time than is required to do the calculations in the arithmetic elements themselves. For example, time weighting for a fast Fourier transform, requires one global memory read operation, one multiplication operation in the associated arithmetic element and one write operation in the global memory and is thus limited by the global memory timing. The arithmetic processor provides the capability to string primitives together; that is, to execute a string of primitives within the arithmetic processor rather than interfacing with the global memory for each primitive. Indeed, all primitives are capable of being strung together. This does not require any added microcode. Thus, in the above example, it is possible to string time weighting followed by a fast Fourier transform, eliminating the transfer to global memory for the output of time-weighting and the input for the fast Fourier transform. Hence, the data flow signal processor is used more efficiently and effectively and more data throughput is available for other processors.

Batch Size Concept

High bandwidth is achieved in the multi-port global memory of FIG. 1 by reading, in parallel, 32 words per clock time and sending 64 words to the arithmetic element of the associated arithmetic processor, which uses two clock cycles per global memory access. Thus, each access of the global memory by an arithmetic element is most efficient when a request is made for 64 real words or 32 complex real words. The number of words the arithmetic element requires is usually a function of the batch size.

Growth Concept

Growth of this data flow signal processor for increased performance is achieved by simply increasing the number of arithmetic processors and arithmetic elements associated therewith to 16 and 32, respectively. Other options are available when higher performance is required, such as interfacing of another data flow signal processor architecture, or the use of special purpose processors which have additional arithmetic processing capability.

Functional Element Classes

Figure 2:
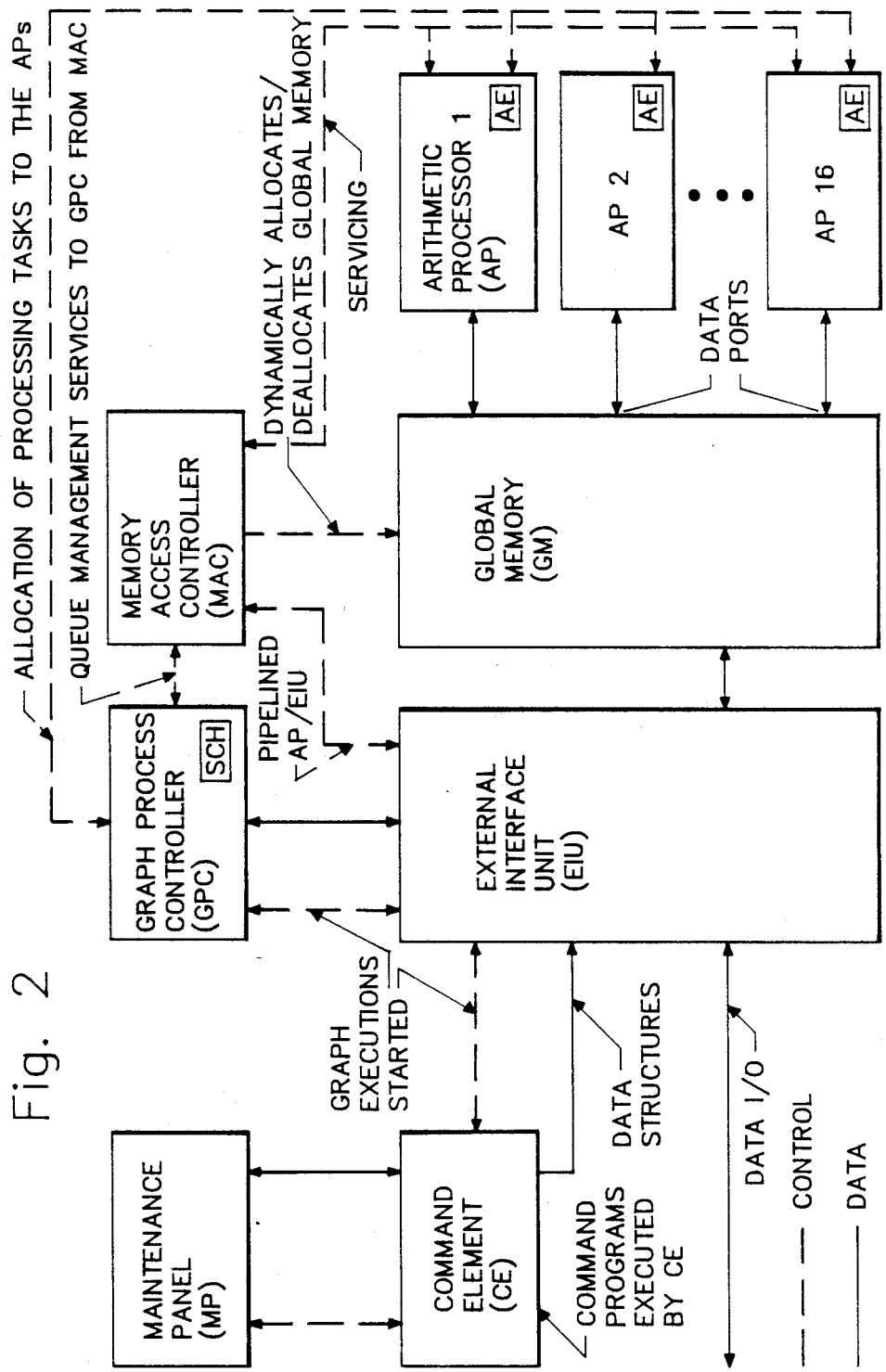
FIG. 2 is a block diagram of an improved data flow signal processor depicting its organization with respect to control paths and data paths.

FIG. 2 is a further development of FIG. 1 and illustrates the functional element classes. As shown in FIG. 2, the data flow signal processor comprises seven classes of functional elements. These include the maintenance panel (MP), the command element (CE), the external interface unit (EIU), the graph process controller (GPC), the memory access controller (MAC), the partitioned, multi-port global memory (GM) and the arithmetic processors (AP). In this figure, the control paths are shown by dotted lines and the data paths are shown by solid lines.

The architecture illustrated comprises 1 to 16 modular expandable arithmetic processors (AP), each of which can be configured with one or two arithmetic elements (AE) for single instruction, multiple data signal processing. This multi-arithmetic element capability capitalizes on the inherent parallelism found in many signal processing graphs. Either fixed or floating point operation may be selected, allowing for expanded dynamic range processing. Each arithmetic element is capable of a multiplication rate of 12 MHz and an addition rate of 24 MHz. There is no throughput degradation due to floating point operation.

The graph process controller (GPC) provides for dynamic graph node dispatching under hardware control. It also provides graph scheduling control under microcode control to significantly reduce the graph scheduling over-head time. Although not illustrated in detail in FIGS. 1 or 2, the graph process controller contains up to two schedulers (SCH), yet to be described. These work in lock-step. Each scheduler controls the allocation of processing tasks to the arithmetic processors. It starts and stops the graphs; it performs PM/FL functions; and provides the command element interfacing. The arithmetic processors (AP) control the arithmetic element (AE). The schedulers are compatible with the arithmetic processors and are assisted by dedicated hardware queues and first in/first-out lists to aid the macro data flow control shell to dynamically maintain the integrity of the graphs and ensure that all of the arithmetic elements are kept active.

The global memory may be configured with a variable number of data ports. Forty-eight global memory data ports are provided in one embodiment. For the maximum performance envelope, when accessing the global memory, the arithmetic elements use 32 of the 48 global memory data ports. If accesses to the global memory are excessive for a particular application, special arithmetic processors may replace a standard arithmetic processor, providing the special arithmetic processor conforms to the interface protocols of the arithmetic processors. The global memory has a capability of single-bit error correction and double-bit error detection, which will be described at a later point.

The external interface unit (EIU) provides for data input/output. The word size which is utilized is 22 bits. Fixed point realization comprises 16 bits of the 22 available bits. Provision is made in the external interface unit to provide a conversion of data from fixed point to floating point format. Additionally, it features a packed floating point format where two 16-bit fixed point input words are converted to two floating point words, each with a 3-bit exponent and an 8-bit significant. These are then packed into a single 22-bit word.

The memory access controller (MAC) dynamically allocates/deallocates the global memory. The memory access controller provides queue management services to the graph process controller (GPC). It provides multiple node instance management (FIG. 1 queue management) and pipe-lined arithmetic processor/external interface unit servicing to allow multi-page memory addressing. The memory access controller uses simple linked page addressing requiring no external tagging or scrubbing. It is a dedicated controller slaved to the graph process controller.

Figure 4:
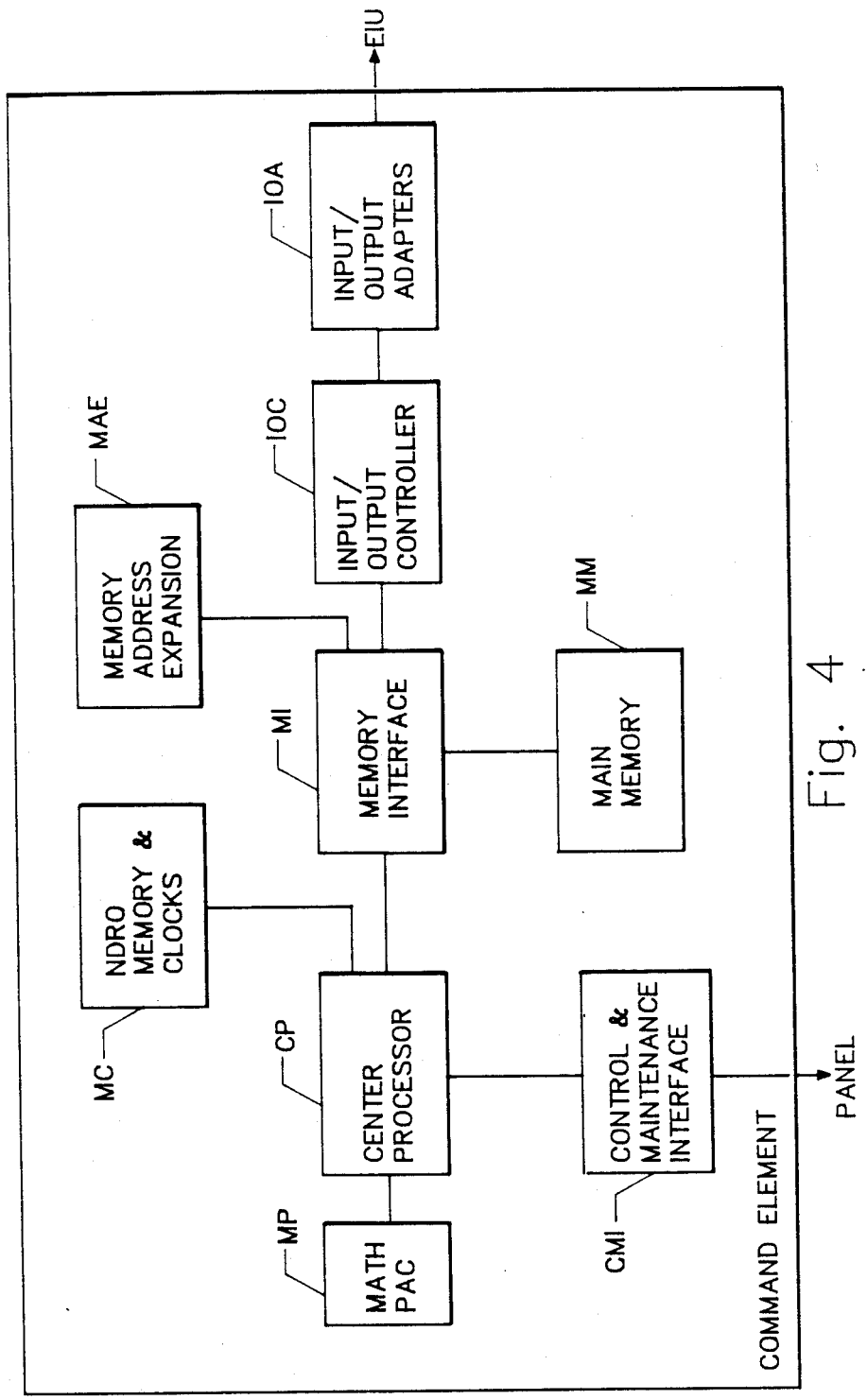
FIG. 4 illustrates the organization of the command element of the data flow signal processor.

The command element (CE), FIG. 4, is normally embedded. Optionally, it can be external to this data flow signal processor. It communicates with the other data flow signal processor elements via the external interface unit (EIU). The command element comprises an AN/UYK-44 MRP computer which comprises nine functional elements as shown in FIG. 4. These functional elements are a central processor (CP) and input/output controller (IOC), a set of input/output adapters (IOA), a control and maintenance interface (CMI), a memory address expansion unit (MAE), a mathpac unit (MP), a memory interface unit (MI), and NDRO memory and clocks (MC).

The central processor (CP) executes the AN/UYK-44 instruction set comprising 294 instructions in 16-bit and 32-bit form. The central processor (CP) has two sets of 16-bit general registers with two status registers and a program counter.

The mathpac (MP) functional element enhances the performance of the command element (CE) for execution of square root, trigonometric and hyperbolic instructions, of floating point add, subtract and multiply instructions, and of double precision integer multiply and divide and arithmetic quadruple left and right shift instructions.

The memory interface (MI) functional element interfaces a maximum of 512K words to a common bus.

The NDRO memory and clocks functional element (MC) provides a 192 word bootstrap, memory, a 32-bit real-time clock, and a 16-bit monitor or internal clock.

The memory address expansion functional element (MAE) allows the central processor (CP) and input/output controller (IOC) to address beyond 64K words by using four sets of page registers and provides execute, write and read memory protection.

The input/output controller (IOC) executes I/O chain program instructions and provides for independent I/O operations. The input/output controller (IOC) can interface up to 16 input/output adapters (IOA).

The input/output adapter (IOA) provides the interface to a specific I/O channel type, in this case, an NTDS serial channel.

The control and maintenance interface (CMI) provides the electrical interface for interconnection to a maintenance panel for control of the command element (CE).

The main memory functional element (MM) provides 256K words of semiconductor memory with a 350 nanosecond cycle time.

Run-time replication of graph data structures enables maximum utilization of resources and allows rapid reconfiguration. In order to obtain the optimum performance from the data flow signal processor system, the macro data flow control graph, which defines the signal processing strings in terms of the flow of data from inputs to outputs, is not translated into conventional, sequential program code, Instead, the graph topology is maintained in a linked-list data structure within the system. To further ensure flexibility and allow effective reconfiguration, the topology is stored in its static state, with replication performed at the time the graph is started. In order to accomplish this rapidly at run-time, the graph, encoded in data flow control signal processor graph notation, is translated prior to execution into a set of SPL/I data structures, linked together to describe the topology of the graph they represent.

When a request is made to the macro data flow control shell in the command element (CE) to start execution of a graph, the necessary replication factors are provided. The shell replicates the graph by expanding the static structures into the equivalent dynamic structures, and downloads the dynamic structures into the graph process controller (GPC).

Figure 5:
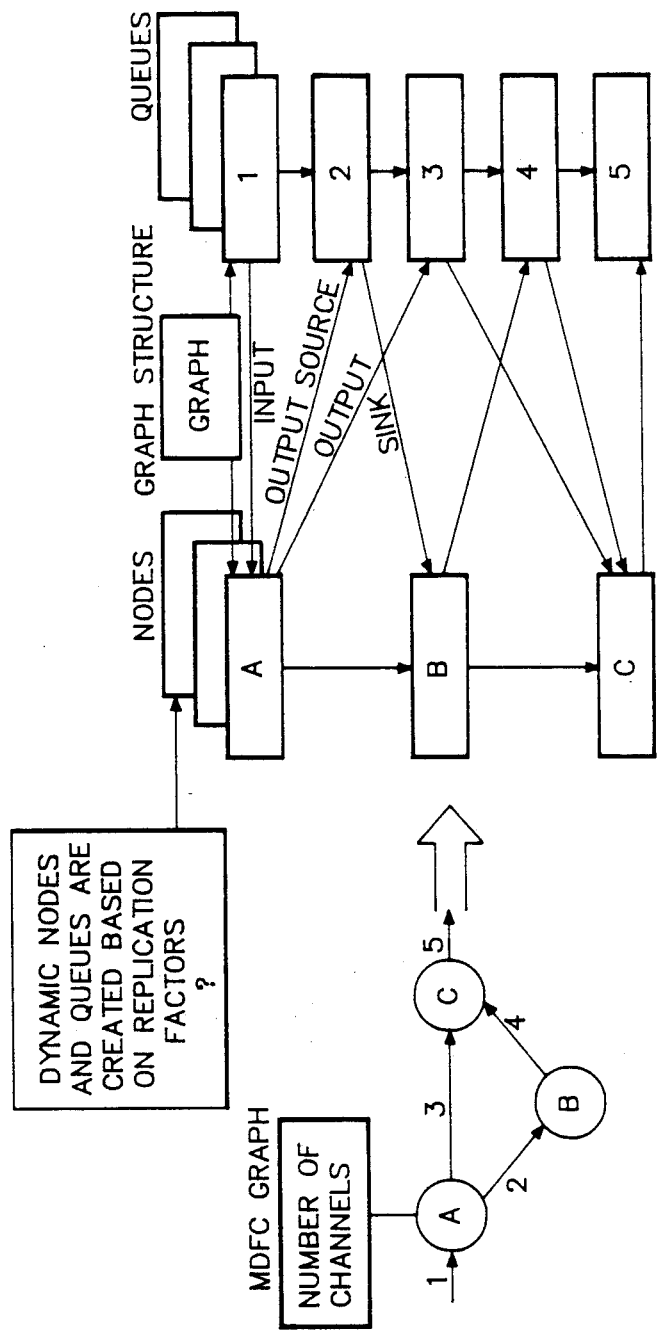
FIG. 5 illustrates graph data structure.

The individual data structures correspond to the basic elements of the macro data flow methodology (see FIG. 5). The macro data flow control graph is translated into a linked-list structure which preserves the topology of the graph. Thus, a graph structure points to a list of node structures within that graph, as well as lists of input and output data and trigger queues. Each node structure points to lists of queue structures, which in turn identify their associated source and sink nodes. During replication, multiple copies of the various structures are created and linked together, constituting the dynamic graph structure. All command programs are executed in the command element and all graph executions are started by the command element. All operator influence causing modification to graphs are processed by the command element. The command element (CE) down-loads graph data structures for the graph process controller (GPC) to start and stop graphs. It also provides program and control instructions for each arithmetic processor. (Down-loading can also be done from global memory). The command element (CE) further determines failed units or elements in a unit, switches in redundant elements, removes failed elements and monitors the status of all data flow signal processing functional element classes.

The maintenance panel (MP) contains those controls and displays necessary to enable a maintenance technician to control and monitor system power; initiate system loading functions; interact with hardware and software diagnostic functions; and interpret the results of diagnostic functions.

Macro Data Flow Control

FIG. 1 also illustrates the data flow signal processor architecture to implement macro data flow control. The data flow signal processor architecture is designed to carry out macro data flow control functions in a straightforward manner and to utilize each functional element efficiently.

The scheduling function of the macro data flow control shell is handled by the graph process controller (GPC), which also interfaces with the command element (CE) to process command program requests. Within the graph process controller, a scheduler (SCH) (to be described), which controls node scheduling, performs the macro data flow control's shell scheduling function and the macro data flow control's shell command program interface function.

The graph data structures that represent active graph instances reside in a graph processor memory (GPM) in the graph processor controller (GPC). This memory (GPM) is accessible to the scheduler at a higher priority than to the other functional elements. Primitive parameter blocks, as integral parts of these data structures, are also stored here and passed to the arithmetic processors during primitive execution. The sharing of graph and primitive parameters among the scheduler and the arithmetic processors eliminates requirements for data transfer and synchronization. This achieves efficiency in the utilization of hardware resources. Additional details on this will be discussed at a later point.

The macro data flow control methodology is a combination of control flow command programs and data flow graphs. The essential signal processing task is handled by the graphs. Therefore, the major focus of the data flow signal processor architecture is on the efficiency and throughput of the graph executions.

The design of the data flow signal processor architecture is based upon the requirements of the macro data flow control methodology. As a result the data flow signal processor with the support of the macro data flow control methodology not only makes the macro data flow control approach time and resource utilization efficient, but also makes the macro data flow control shell easy to design and implement, thereby insuring the success of the macro data flow control methodology. Table II summarizes what macro data flow control requires of the data flow signal processor architecture. The macro data flow control functions utilizing these features are further discussed following Table II.

TABLE II
MACRO DATA FLOW CONTROL REQUIREMENTS
AND ARCHITECTURE SUPPORT

Command Program
• Command Element (CE).

SPL/I support (high order language (HOL)).
Interface to the operator.
Interface to Graph Process Controller (GPC), to carry out command program service requests such as start graph, change graph variable.
Reconfigure a graph dynamically at run time.
• Graph Process Controller (GPC)

Graph execution and command program execution asynchronous and in parallel. Hardware FIFO used by the graph process controller (GPC) to backlog the command element (CE) request.
Start and stop multiple instances of a graph independently.
Macro Data Flow Control Graph
• Graph Process Controller (GPC)

TABLE II-continued
MACRO DATA FLOW CONTROL REQUIREMENTS AND ARCHITECTURE SUPPORT Primitive executions and graph scheduling are
processed asynchronously and in parallel.
Hardware FIFOs are used to achieve the asynchronous
operation and build up task backlogs for the
arithmetic processors (APs) and the scheduler (SCH).
Provide scheduler processor tailored for
graph scheduling process.
Special hardware is provided in the scheduler
(SCH) to detect the status transistions of
data and to trigger queues efficiently. (Part
of the data flow programming methodology.)
Provide arithmetic capability to handle the
run time evaluation of consume, produce,
read amounts and thresholds of queues due to
the change of graph variables.
Provide big memory space to store the dynamic
graph data structures.
Provide look ahead feature for program branching
in the macro data flow control's shell software.
Provide node dispatcher to dynamically handle
single instruction stream multiple data stream
(SIMD) utilizations and the priority of a node
and special processor required by a primitive.
Capable of creating multiple instances of a node.
Dynamic memory management of the GPC memory for creating and destroying data structures at run time.
Data Queues and Graph Variables
• Global Memory
Global Memory accessible by all arithmetic
processors (AP) provides the space for data
queues and graph variables.
Sequential memory access control of data
queues. Random access control of graph variables.
Two block sizes provided for big and small data queues.
• Memory Access Controller
Assist GPC to manage the data queue efficiently.
Provide capability to handle queues of multiple
instances of a given node.
Provide functions of macro data flow control's
oriented memory management, such as create a
produce amount portion on a queue, reduce a
consume amount from a queue.
Provide queue management for multiplexed channels.
• External Interface Unit
Provide multiplexing and demultiplexing
capability to read data from and write data
into a data queue in the Global Memory.
Primitive Executions
• Arithmetic Processor
Provide a block of words each time the Global
Memory is accessed.
Provide multiple Arithmetic Elements per AP
to handle parallel channels.
Provide interface to GPC to get the parameter
block of a primitive.
Provide capability to chain primitives in the
arithmetic processor (AP) without having to
write different primitives for each chain.
The chaining is done in the CS program of the
arithmetic processors (AP). This capability
reduces the graph process controller (GPM)
memory and Global Memory utilization, as well
as scheduler loading.
Special processor, if used, handled as if a general
purpose arithmetic processor with limited repertoire.
Floating point capability to ease the primitive programming.

Figure 3:
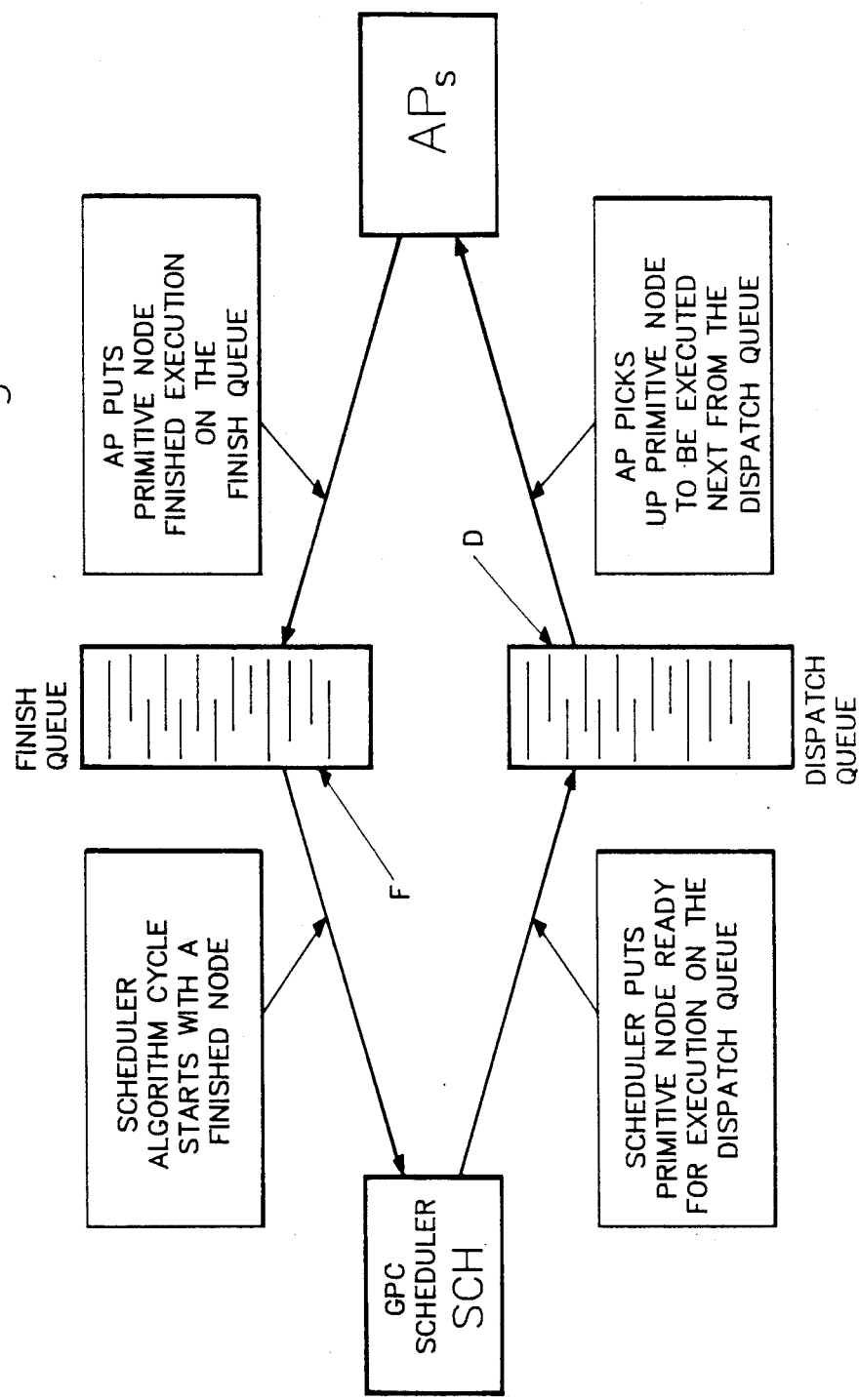
FIG. 3 illustrates an aspect of the processor architecture which provides asynchronous operation of scheduling and arithmetic functions.
Figure 8:
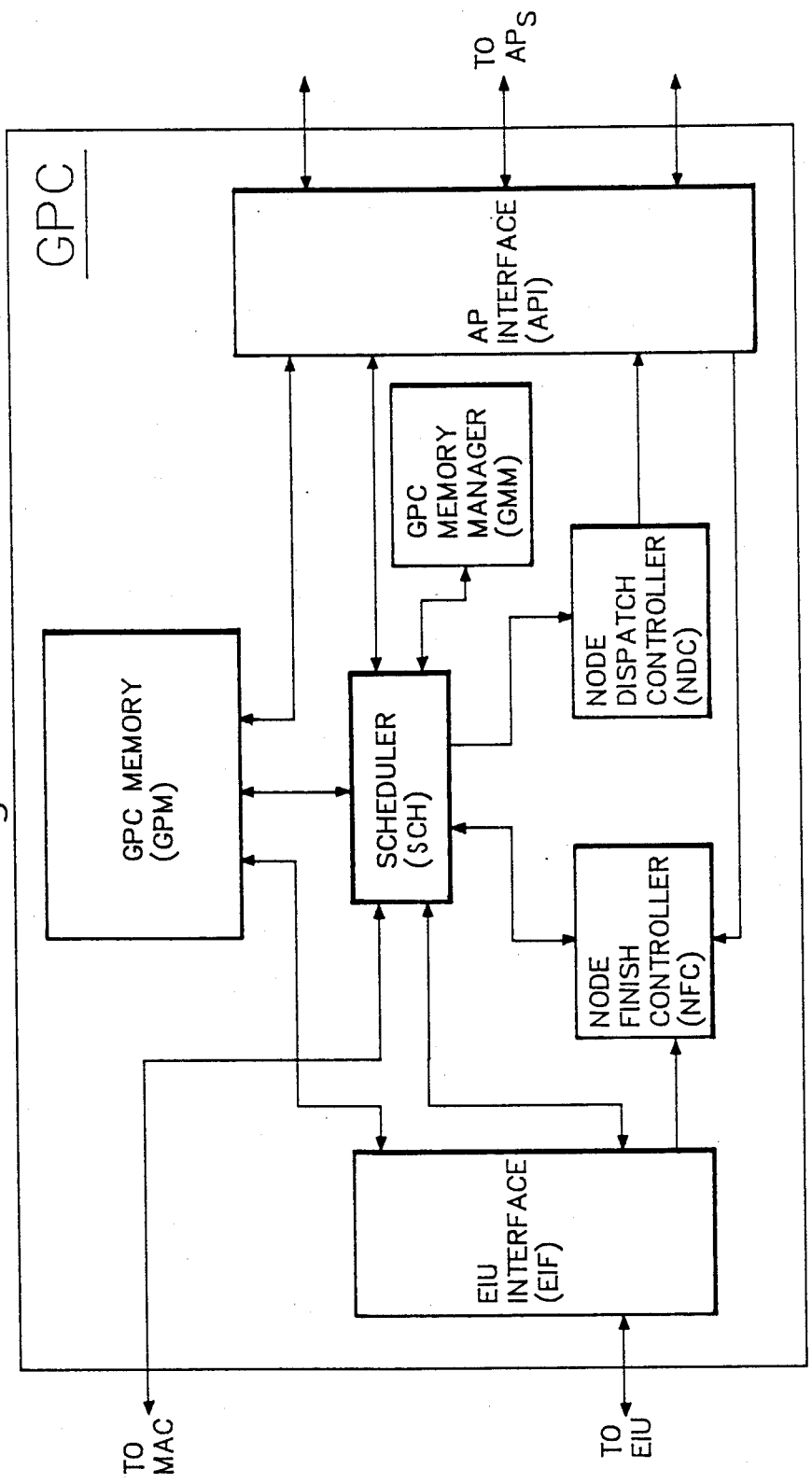
FIG. 8 is a block diagram showing the organization of the graph process controller.

Continuing with macro data flow control, as shown in FIG. 3, the scheduler (SCH) of the graph process controller (GPC) indicates that a node instance is ready for execution by placing an entry on a dispatch queue (D), which is a part of a node dispatch controller (NDC) of the graph process controller, see also FIG. 8. The dispatch queue (D) is polled by an arithmetic processor (AP) whenever that arithmetic processor is idle. When an arithmetic processor finds an entry on the dispatch queue, it removes the entry and executes the indicated primitive. When the primitive execution is completed, the arithmetic processor than places an entry on a finish queue within a node finish controller (NFC), see FIG. 8, and returns to polling the dispatch queue (D). The finish queue is polled by the scheduler (SCH). When the scheduler finds an entry on the finish queue, it processes the node completion which, in turn, triggers other node instances.

The finish queue and the dispatch queue are implemented in the node finish controller (NFC) and the node dispatch controller (NDC), respectively. The use of the hardware queues makes the arithmetic processor and the scheduler operations asynchronous and helps reduce node scheduling overhead while relieving the scheduler from the task of assigning a node to an available arithmetic processor. Single instruction stream, multiple data stream processing is handled entirely by hardware. Nodes capable of single instruction stream, multiple data stream operation are assigned the same node group identifier at graph start time. This identifier is passed to the node dispatch controller (NDC) when a node instance is ready for execution. Hardware combines node instances of the same node group and dispatches the multiple instances of those arithmetic processors which have two arithmetic elements. Therefore, the utilization of two arithmetic processors does not create any additional burden to the graph scheduling function.

The global memory is the focal point of this unique architecture. It is used to store data queues and graph variables. The high bandwidth (288 MHz) of the global memory achieved by the use of time division multiplex registers which prevents bottlenecks and eliminates memory contention. As the global memory, being partioned, is equally accessible to all arithmetic processors, the scheduling algorithms never have to account for data accessibility when assigning tasks to the arithmetic processors.

Simulation of the adaptive beam form (ABF) bench mark on this data flow signal processor architecture, using a hardware register level scheduler simulation, indicated performance of the graph control hardware and software and accounted for the precise scheduler overhead. The results indicate that the scheduler keeps the arithmetic processors 98% busy and 86% of the arithmetic processor utilizations use the two arithmetic element's single instruction stream multiple data stream capability of the arithmetic elements of each of the arithmetic processors. A statistical summary chart of a simulation run is given in Table III. The detailed traces of the adaptive beam form graph executions show that the presteer nodes use two arithmetic elements heavily.

TABLE III
STATISTICS ON RUNNING ABF BENCHMARK

| Statistics on Running ABF Benchmark - | 100 Beams, 40 Hydrophones |
|---|---|
| Total Running Clock | 4736435 |
| Total Number of Node-Instances | 5061 |
| Number of Arithmetic Processors in System | 12 |
| Node Waiting Time on Ready Queue | |
| Average Waiting Time | 33319. |
| Maximum Waiting Time | 75113. |
| Standard Deviation of Waiting Time | 12616. |
| Node Waiting Time on Finish Queue | |
| Average Waiting Time | 2959. |
| Maximum Waiting Time | 14062. |

TABLE III-continued
STATISTICS ON RUNNING ABF BENCHMARK

| | |
|---|---|
| Standard Deviation of Waiting Time | 3381. |
| *Ready Node Processing Time* | |
| Average Processing Time | 383. |
| Maximum Processing Time | 1903. |
| Minimum Processing Time | 77. |
| Standard Deviation of Processing Time | 410. |
| *Finish Node Processing Time* | |
| Average Processing Time | 561. |
| Maximum Processing Time | 8826. |
| Minimum processing Time | 69. |
| Standard Deviation of Processing Time | 1288. |
| *Average Processor Loadings* | |
| OPC Scheduler | 68.3259% |
| Arithmetic Processor | 98.3098% |
| Arithmetic Processor ZAE Utilization | 89.3139% |
| Statistics on Running ABF Benchmark - | 20 Beams, 40 Hydrophones |
| Total Running Clock | 3000129 |
| Total Number of Node-Instances | 1061 |
| Number of Arithmetic Processors in System | 3 |
| *Node Waiting Time on Ready Queue* | |
| Average Waiting Timer | 141380. |
| Maximum Waiting Time | 198689. |
| Standard Deviation of Waiting time | 68278. |
| *Node Waiting Time on Finish Queue* | |
| Average Waiting Time | 927. |
| Maximum Waiting Time | 9771. |
| Standard Deviation of Waiting Time | 1933. |
| *Ready Node Processing Time* | |
| Average Processing Time | 268. |
| Maximum processing Time | 1256. |
| Minimum Processing Time | 77. |
| Standard Deviation of Processing Time | 345. |
| *Finish Node Processing Time* | |
| Average Processing Time | 496. |
| Maximum Processing Time | 8986. |
| Minimum Processing Time | 82. |
| Standard Deviation of Processing Time | 1187. |
| *Average Processor Loadings* | |
| OPC Scheduler | 13.6626% |
| Arithmetic Processor | 98.5375% |
| Arithmetic Processor ZAE Utilization | 88.9009% |

A static assignment of functions to processors at compile time, as done in prior art processors, restricts the ability of the system to respond to degraded operations. As a consequence, this data flow signal processor provides for a dynamic allocation of resources at run time to accommodate degraded operation modes as the natural result of a strategy that optimizes resource utilization. These dynamic resource utilizations are handled by various first in/first out systems and queues to achieve asynchronous operation. The simulation result (see Table III) shows that reducing both the number of arithmetic processors and beam number does not have a noticeable effect on the efficiency of resource utilization.

Figure 6:
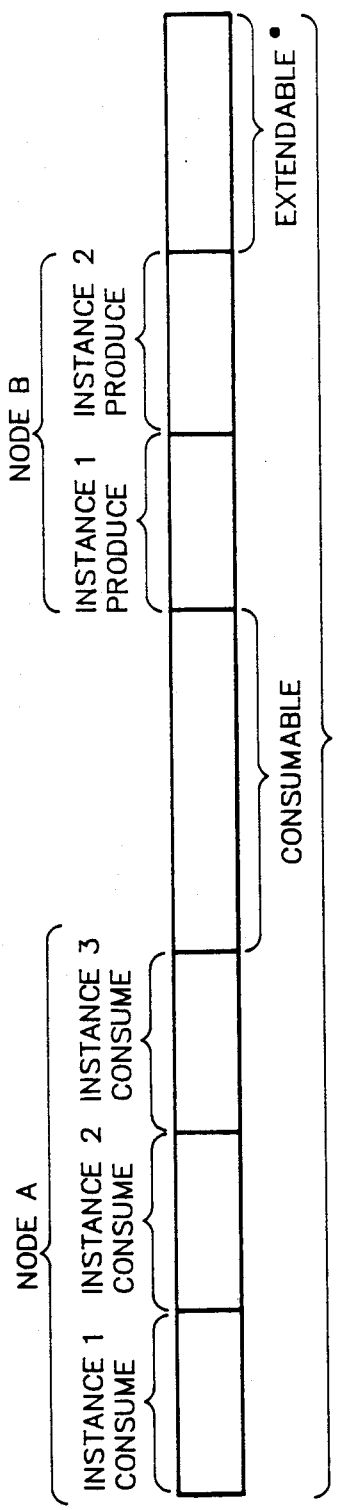
FIG. 6 illustrates a configuration of a data queue.

The memory access controller (MAC) dynamically allocates and deallocates space in the global memory. The design is driven by the macro data flow control overhead but also makes the macro data flow control shell easier to design and implement. The memory access controller presents the arithmetic processors with a queue oriented interface that maps a different queue into separate and logically contiguous address spaces in the global memory. FIG. 6 shows the configuration of a data queue as viewed by the macro data flow control shell software. The graph process controller (GPC) interfaces with the memory access controller (MAC) to create, delete, extend and reduce queues. All of the memory access controller processing is performed in parallel with the arithmetic processors (AP) and the graph process controller (GPC).

The external interface unit (EIU) inputs (or outputs) data from (or to) external sources into (or from) the appropriate queues in the global memory. No special attention from the macro data flow control's shell software is required to manage the input and output of data. Hence, the macro data flow control scheduler hardware and software treats the input/output queues identically to graph internal data queues.

In macro data flow control, the arithmetic processors execute primitive nodes asynchronously. This execution helps to insure that the maximum possible data throughput of a data flow signal processor configuration can be obtained without the overhead penalty usually paid when using an asynchronous scheme. There are no compile time assigned processor/ primitive node pairs except for any optional special processors. Therefore, the arithmetic processor load balancing is automatically achieved by the graph control hardware and software and the bottlenecks caused by unbalanced processor loading are eliminated.

Command programs are executed in a standard computer functioning as the command element (CE) of the data flow signal processor. Specific requests, such as start graph, or wait on trigger queue, are passed from the command element to the graph process controller where the actual graph control functions are performed.

Graph Process Controller

Figure 7:
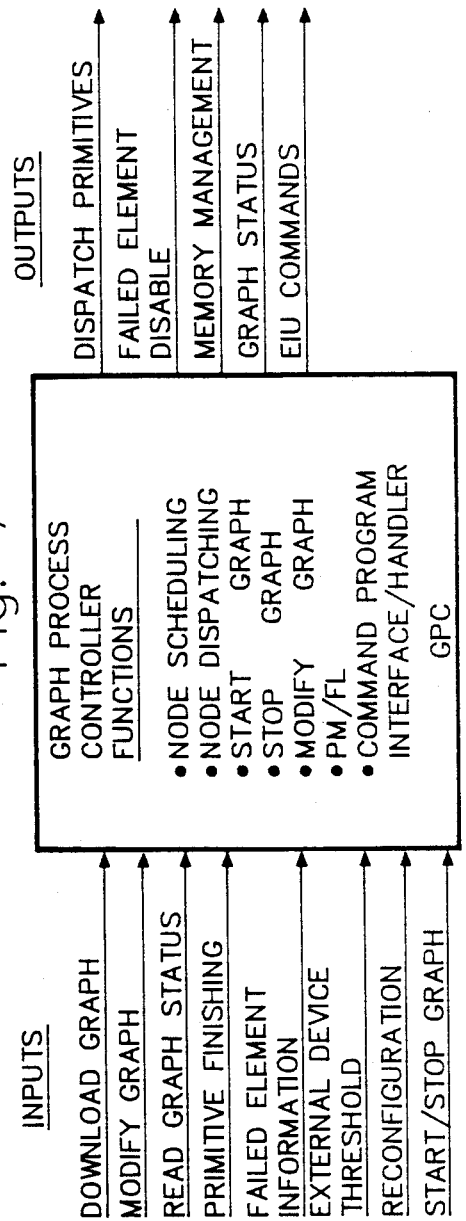
FIG. 7 shows the functions of the graph process controller of FIG. 1.

Graph service requests made by the macro data flow control command program are effected by modifications to graph data structures stored in the graph processor memory (GPM) or by updating the node finish queue. The graph process controller (GPC) is a high-speed programmable controller which executes the data flow signal processor common operational software graph representations (macro data flow control) and determines the allocation of signal processing primitives to the hardware resources. The functions of the graph process controller (GPC), together with its inputs and outputs, are shown in FIG. 7.

The graph process controller (GPC) performs all functions necessary to transform the graph data structure into primitive executions. Once it has been initialized by the command element (CE), the graph process controller controls all operational functions within the data flow signal processor, with no intervening action being required. The graph process controller (GPC) interfaces with the arithmetic processors (AP), see FIG. 2, for the dispatching of primitives, with the memory access controller (MAC) for dynamic management of the global memory (GM) and with the external interface unit (EIU) for the sensor and input/output channel communications and the command element communication.

The macro data flow control's graph in the graph process controller (GPC) is in the form of graph data structures that describe each node, data queue, and peripheral of the graph. During graph execution, the graph process controller (GPC) uses the data structures to generate dynamic graph node instance data structures which represent a distinct instance in time, or, uses the data structures in parallel processing channels. The dynamic data structures are constantly being destroyed as the graph node instances are dispatched and finished.

The graph process controller utilizes a decentralized control architecture which allows different aspects of the graph process of the macro data flow control to occur concurrently. The functional elements of the graph process controller (GPC) are designed to optimize the graph node scheduling and dispatching functions and to prevent single point failures. The scheduling and dispatching processes are separate and decentralized. The scheduling is done totally asynchronously with respect to dispatching and primitive execution.

The architecture of the graph process controller allows for dynamic application of a graph to available resources. All control of the graph is done at run-time by modifying the data structures. This is done by commands to either start, stop, or modify the executing graph or graphs issued by the command element.

The graph data structure loaded into the graph processor controller (GPC) includes the data on which the scheduling algorithm operates. The graph process controller (GPC) is programmable by changing these data structures or by direct command from the command element. For example, the graph process controller can be directed to run the scheduling algorithm, down-load the arithmetic processor internal memories, modify the graph or graphs and run fault-detection software, all of which are instructions given to the graph process controller by the command program which is located in the command element (CE).

The graph process controller interfaces with the arithmetic processors for the dispatching and finishing of primitives during graph execution. Initialization of the arithmetic processors is accomplished by down-loading the arithmetic processor's internal memories with data that was previously sent to the graph process controller by the command element (CE). Once the arithmetic processor is initialized, primitives can then be dispatched thereto. The graph process controller can also interface with special purpose processors, such as a beamformer or a filter, using the established interface communication protocol.

The graph process controller interfaces with a memory access controller (MAC) to provide dynamic management of the global memory (GM). Part of the graph process controller's graph node scheduling algorithm is to use the memory access controller to manage address space in the global memory and data queue definition.

The graph process controller interfaces with the external interface unit (EIU), for both command program communication with the command element (CE) and for internal external interface unit operations. All graph process controller initialization and program downloading operations are accomplished by the command element (CE) via the external interface unit (EIU). The graph process controller (GPC) can also access the global memory (GM) through the external interface unit.

The graph process controller (GPC) is programmable at the system level by the graph data structures and by commands from the resident command program in the external computer. The graph process controller performs two progammable functions. These are graph node scheduling and command program/command processing. Graph node scheduling utilizes the data structure in the graph process control memory (GPM), to control primitive execution in the arithmetic processors (AP). The graph process controller (GPC) also performs input/ output primitive operations directly, such as programming external device interface parameters.

The architecture of the graph process controller is decentralized. Because of this, no single point failure can cause the entire graph processor controller to fail. There are at least two of each functional element in the graph process controller which operate during normal graph execution. If it is determined that a functional element has failed, the failed element is disabled and the remaining functional element takes over or continues with the ongoing task. This feature serves to enhance the overall reliability of the graph process controller, together with its maintainability. Fault location is facilitated due to the multiple functional elements creating multiple data and control paths by which to isolate faults.

The function of the graph process controller, together with its organization and the way in which it accomplishes the described function, will be better understood by reference to FIG. 8, illustrating its architecture. The graph process controller concurrently performs all functions necessary to initialize and maintain control of graph execution without external action. It uses a decentralized control design.

The graph process controller architecture is designed to perform the graph node scheduling function quickly and efficiently. The graph process controller consists of seven functional elements which internally interface with each other and which minimize scheduling overhead to provide the required processing operations. By reference to FIG. 8, it will be seen that the graph process controller includes a graph processor memory (GPM), a scheduler (SCH), a graph process controller memory manager (GMM), a node finish controller (NFC), a node dispatch controller (NDC), an arithmetic processor interface (API), and an electronic interface (EIF) which interfaces with the external interface unit (EIU).

The graph processor memory (GPM) stores the graph data structures that have been down-loaded thereto from the command element (CE) via the external interface unit (EIU) during the initialization operation. The graph data structures are used to define the graph structure which is forwarded to the graph process controller (GPC) and are in the form of tables that describe each node, the data, and the trigger queue. The signal processing primitives, which are in the process of execution in the arithmetic processors, read parts of these tables after a node has been dispatched thereto by the graph process controller to obtain parameters for primitive execution.

During initialization, the graph processor memory (GPM) serves as a data path and buffer to allow arithmetic processor primitives to be successively downloaded from the command element (CE), via the external interface unit (EIU) and the interface (EIF), into the graph processor memory (GPM) and then to the arithmetic processor via the interface (API). The command element (CE) also downloads the initial graph data structures for storage in the graph processor memory (GPM). These data structures define the static (initial) state of the graph and will be read and operated upon by the scheduler (SCH) during the execution of its node scheduling algorithm.

Figure 9:
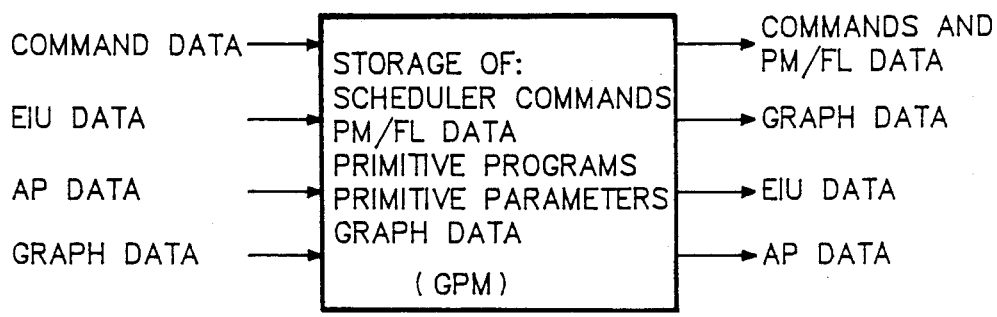
FIG. 9 illustrates the functions of the graph process controller memory.

During graph execution, nodes are scheduled and dispatched to arithmetic processors by providing them with address pointers to the locations in the graph processor memory (GPM) where the assigned node instance data structures will be found. An arithmetic processor can access the graph processor memory (GPM) through the interface (API) to read the data structures of the node dispatched to them, and to read and write primitive input and output parameters. Completion of a primitive operation by an arithmetic processor is made known to the graph process controller by returning the graph process controller (GPC) address pointer to the location of the completed node instance data structure in the graph processor memory (GPM). During the graph execution, commands from the command element (CE) to the scheduler (SCH) travel via the external interface unit (EIU) and the interface (EIF) and are buffered in the graph processor memory (GPM) by loading the command into memory and providing the scheduler (SCH) with the address pointer to the command. The command element (CE) can also access the graph processor memory (GPM) via the same data path to perform dynamic graph reconfiguration during graph execution. The functions of the graph processor memory (GPM) are shown in FIG. 9.

Figure 10:
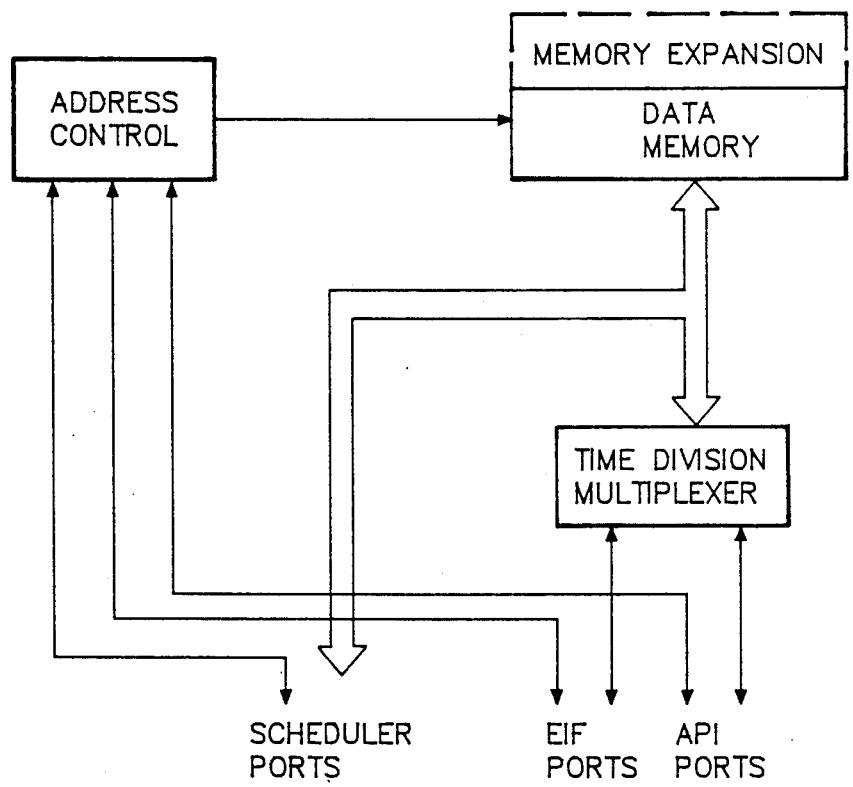
FIG. 10 illustrates functional sub-elements of the memory of the graph process controller.

The graph processor memory (GPM) is composed of three functional sub-elements: the data memory, address control, and time division multiplexer (TDM), as shown in FIG. 10, to which the scheduler (SCH), external interface unit (EIU), and interface (API) all have access. Data memory is expandable and can be configured to hold from 512K up to 4 million words in random access memory (RAM). Both the external interface unit (EIU) and the arithmetic processor interface (API) access the graph processor memory (GPM) through the time division multiplexer (TDM) while the scheduler (SCH) accesses the data memory directly. The time division multiplexer (TDM) is expandable to interface up to 34 ports including dual interfaces (EIF) (for redundance) and 32 interfaces (API) for interfacing up to 32 arithmetic processors (AP) or special processors. The address controller contains the access priority arbitration and address data path circuitry as well as the controlling hardware necessary to select redundant memory bits when requested and to lock out any failed functional element attempting to access the graph processor memory (GPM).

The data memory is constructed for four parallel words to be accessed per clock cycle in a two clock cycle access time slot, i.e., eight words for each two clock cycle access. The data memory has separate input and output data paths for minimum delay in performing read and write operations. The scheduler (SCH) interfaces the data memory directly to access all eight data words in parallel in its access time slot to help minimize the node scheduling overhead time. The interface (EIF) and interface (API) utilize the time division multiplexer (TDM) to interface to the input and output data paths of the data memory. The time division multiplexer (TDM) performs the parallel to serial and serial to parallel operations required to allow the arithmetic processors (AP) and external interface units (EIU) to transfer single data words.

Figure 11:
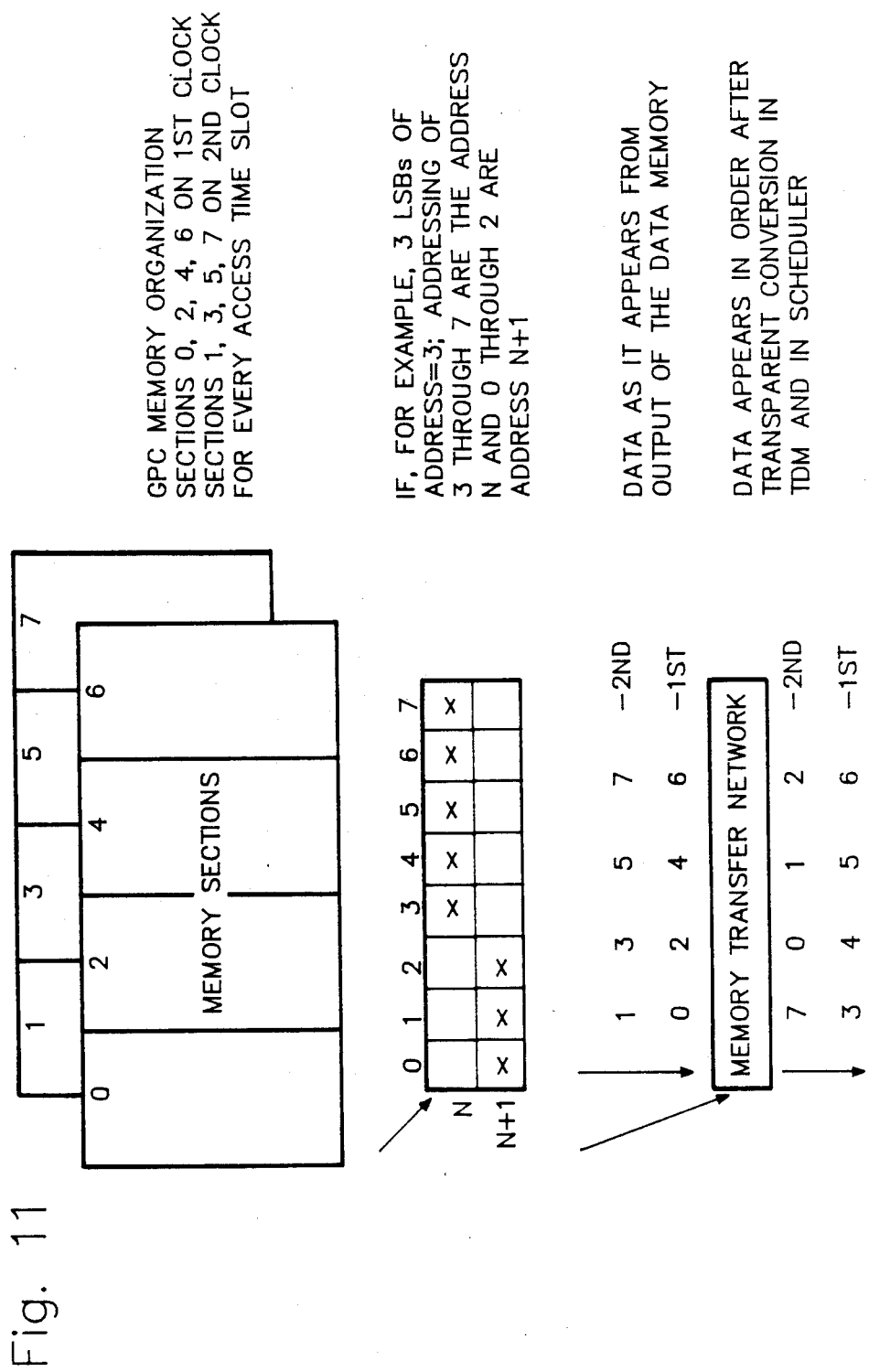
FIG. 11 depicts the organization of the memory of the graph processes controller.

In order to provide totally random access to the graph processor memory (GPM), a switching network is supplied to allow access to words in any location transparent to the scheduler (SCH) operation. This process is shown in FIG. 11. The example shown indicates the switching and conversion that takes place when a non-eight word multiple address is given. For the interfaces (EIF and API), this operation is performed within the time division multiplexer (TDM). The scheduler (SCH) contains its own conversion hardware.

The graph processor memory (GPM) may be accessed by the scheduler (SCH) and the interfaces (API and EIF) in a priority order. The scheduler (SCH) has the highest access priority to maximize the efficiency of the graph node scheduling operation. The interface (API) relays the access requests from the arithmetic processors on a first come, first served basis. The arithmetic processors (AP) need access to the graph processor memory when initiating primitive execution to obtain node parameters. The interface (EIF) has lowest graph processor memory access priority to the graph processor memory.

The graph processor memory (GPM) data is distributed by the scheduler (SCH), interfaces (API and EIF) where error detection and correction (EDC) logic is utilized for single bit error correction and multiple bit error detection. The error detection and correction (EDC) hardware is distributed to include the time division multiplexer (TDM) and interfaces for memory reliability.

The scheduler (SCH), see FIGS. 12–16, in the graph process controller is the controller that performs the node scheduling operation using the data structure representation of the graph stored in the graph processor memory (GPM). The scheduler (SCH) is microprogrammed with a graph process controller portion of the macro data flow control's shell software. The scheduler (SCH) interfaces with all other graph process controller functional elements and with the memory access controller, FIG. 16. Command program commands are carried by the scheduler for graph manipulation, PM/FL operations and other command and control functions.

Figure 12:
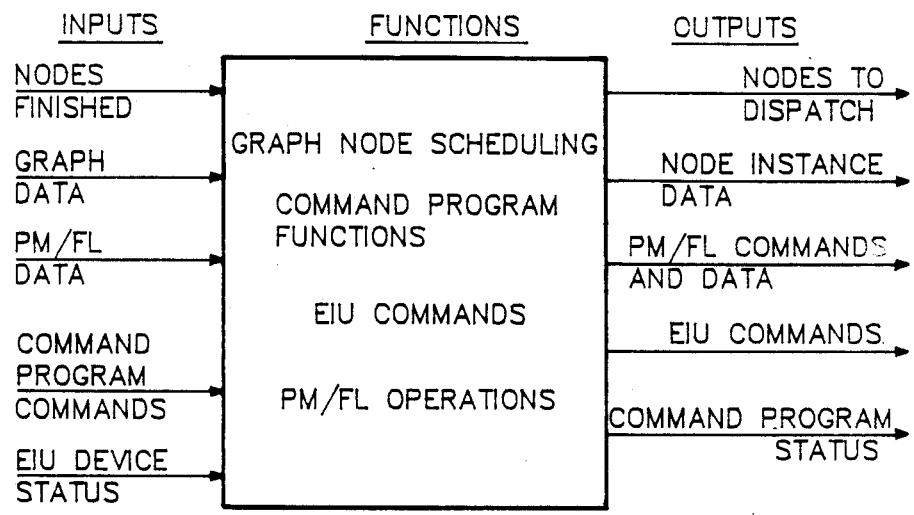
FIG. 12 depicts the functions of the scheduler.

To schedule graph node instances, FIG. 12, the scheduler obtains finished node IDs from the node finish controller (NFC) to update the status of pending dynamic node instances tables. Finished node IDs identify nodes that have been executed by the arithmetic processor but which have not been recognized as complete by the graph process controller. The scheduler (SCH) then executes the macro data flow control's shell node scheduling algorithm using the data structures in the graph processor memory (GPM) to obtain graph information and the memory access controller (MAC) for global memory management. The scheduler (SCH) then issues node instance IDs to the node dispatch controller (NDC) for subsequent primitive execution. Node instance IDs identify nodes and the associated parameters which are to be dispatched to an available arithmetic processor for execution. Dedicated hardware in the node dispatch controller performs the node dispatching function for any available arithmetic processor within the node's dispatch class. The node scheduling function is performed asynchronously with the node dispatching function and the subsequent primitive execution for reduced macro data flow control's overhead.

In greater detail, the scheduler (SCH) is a high-speed microprogrammable controller which utilizes the graph data structures in graph process controller memory (GPPM) to schedule graph nodes for execution and implement command program requests. The scheduler (SCH) microprograms implement the instruction set of the graph process controller (GPC). The schedulers firmware and software execute the graph node scheduling algorithm and command program requests. It interfaces to the command element (CE) through the external interface unit (EIU) for command program communication. Internal to the graph process controller (GPC), the scheduler (SCH) interfaces to all of the other graph process controller functional elements and externally to the memory access controller (MAC) to provide dynamic management of the global memory (GM).

The key to efficient graph node scheduling is provided by the node finish controller (NFC) and node dispatch controller (NDC), which operate asynchronously with the scheduler (SCH) to off-load time consuming interface servicing and to eliminate scheduler program interruption. The scheduler (SCH) uses the node finish controller (NFC) to queue pending graph process controller operations and uses the graph process controller memory manager (GMM), graph process controller memory (GPM) and memory access controller (MAC) during graph node scheduling operations. These pending operations indicate node IDs that have completed primitive execution, node IDs that have reached their word count threshold from the external device interface, and command program requests. The scheduler (SCH) functions are shown in FIG. 12.

Figure 13:
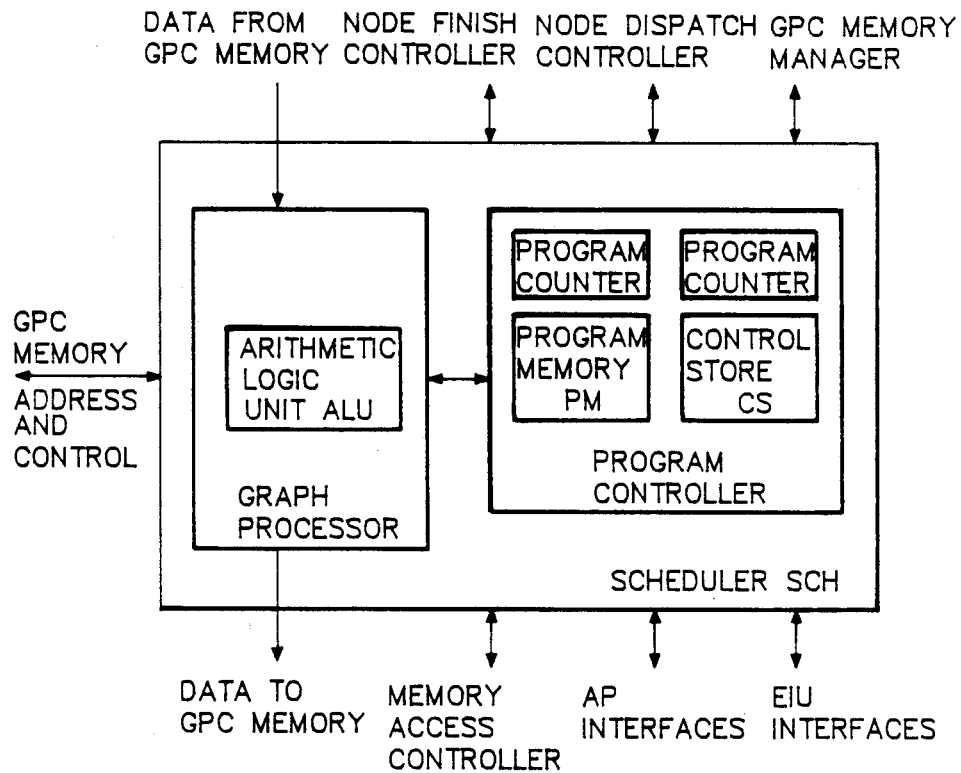
FIG. 13 illustrates the scheduler architecture.

The scheduler (SCH) is composed of two functional sub-elements as shown in FIG. 13. These are the graph processor and the program controller.

The program controller is the microprogrammable portion of the scheduler (SCH), which supplies all controls to the other sub-element, the graph processor. Together they provide microprogram and control store memories as well as the registers, counters, and arithmetic and logical operation capability for control.

The graph processor is a parallel pipelined device which provides high speed graph processing and scheduling. It provides the scheduler (SCH) with the capability to process all required graph data during both node scheduling and PM/FL operations using its internal arithmetic logic unit (ALU). The graph processor also contains the addressing capability to the graph process controller memory (GPM). During graph execution, dynamic node instance data structures in the graph process controller memory (GPM) are created by copying parts of static node and queue data structures utilizing the efficient parallel data transfer capability of the graph processor. Data transfer efficiency is facilitated due to address register and switching capability in the graph processor. Data to and from the graph process controller memory (GPM) utilizes single bit error detection and correction and multiple bit error detection logic to improve reliability.

During graph execution, the scheduler (SCH) interfaces to the graph process controller memory (GPM) to access the graph data structures stored there. The command program uses the graph process controller memory (GPM) as an intermediate buffer to store system command data for scheduler communication. The scheduler (SCH) has separate read and write data buses to the graph process controller memory (GPM), and accesses all four memory ports simultaneously. This parallel data transfer serves to increase the memory transfer bandwidth to four times that of a single data transfer. Data is transferred to/from the graph process controller memory (GPM) through the scheduler graph processor sub-element.

Within the graph process controller (GPC), the scheduler (SCH) interfaces to the graph process controller memory manager (GMM) to obtain information regarding the graph process controller memory (GPM) utilization. The scheduler (SCH) used the memory manager (GMM) to keep track of usage of the graph process controller memory (GPM), relieving itself of the task of storing the free and active memory addresses. To create dynamic node instance data structures, the scheduler (SCH) commands the GPC memory manager (GMM) to allocate memory space. This active space utilization is stored by the memory manager (GMM). When node instance primitive execution is completed, the memory space is deallocated by the graph process controller memory manager (GMM) under the scheduler's command. The graph process controller memory manager (GMM) is slaved to the scheduler (SCH) for all commands, initialization, and PM/FL operations. Scheduler-to-memory manager commands with associated parameters are shown in Table IV.

Figure 14:
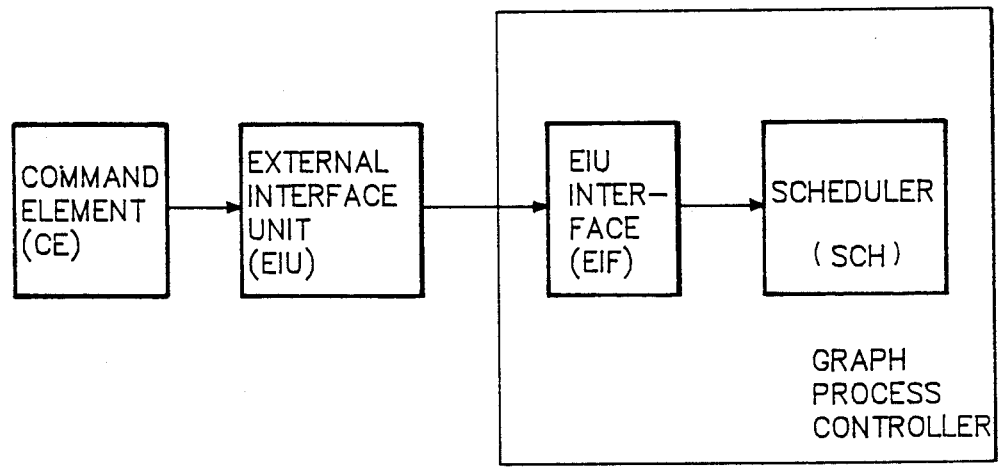
FIG. 14 shows how the scheduler is initialized.

As seen in FIG. 14, the scheduler (SCH) interfaces to the graph process controller's interface (EIF) for command program and external interface unit (EIU) communication. During initialization, the command element (CE) downloads the scheduler (SCH) program controller internal memories via the external interface unit (EIU) and then through the graph process controller's interface (EIF). This is also the data path used by the command element (CE) for the scheduler's (SCH) PM/FL operations. The scheduler's operation is then started by the command element (CE). It executes the graph process controller's macro data flow control shell to obtain tasks for subsequent node scheduling and command operations. This loading procedure is shown in FIG. 14. The scheduler (SCH) also provides direct external interface unit (EIU) commands to be issued by the interface (EIF) to load external device interface (DI) parameters, enable or disable DI, read DI status, etc.

Figure 15:
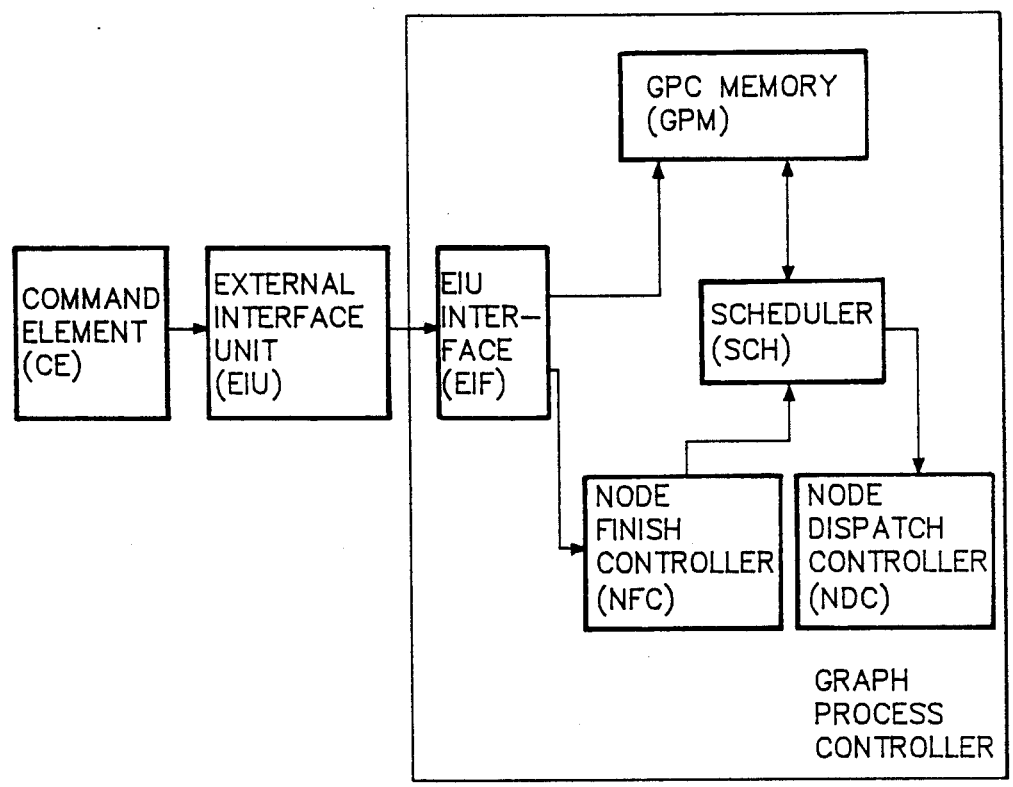
FIG. 15 illustrates scheduler communication.

Once the scheduler (SCH) has begun program execution, the command element (CE) commands must be loaded into the graph process controller memory (GPM) and the address pointer to the command then sent to the node finish controller (NFC). The node finish controller (NFC) sends the address pointer to the scheduler (SCH), which uses the address to access the command data from the graph process controller memory (GPM). The address pointer from the node finish controller (NFC) is passed into the graph processor, which then retrieves the data from the graph process controller memory (GPM). This operation is shown in FIG. 15. The scheduler (SCH) also receives address pointers to node instance data structures in the graph process controller memory (GPM) that have finished primitive execution from the node finish controller (NFC). The scheduler (SCH) can reload the node finish controller (NFC) with the pointer if after reading it, it determines that processing of that particular node instance is at that time premature.

TABLE IV

SCHEDULER-TO-GRAPH PROCESS
Controller Memory Manager Commands

| Command | Inputs | Outputs |
| --- | --- | --- |
| Initialize GMM | | |
| Allocate Page | | Address |
| Deallocate Page | Address | |
| Get Space | Length | Address |
| Return Space | Length Address | |

The scheduler (SCH) interfaces to the node dispatch controller (NDC) to dispatch graph node instances for primitive execution in the arithmetic processors (AP). The scheduler (SCH) loads the node dispatch controller (NDC) with the address pointer of primitive parameters from the graph process controller memory (GPM), the required processor type to execute the node, the priority with which to dispatch the node, and the node group constant which the node dispatch controller (NDC) uses to determine possible combining of node instances for single instruction multiple data (SIMD) operation. This data path is also shown in FIG. 15.

The scheduler (SCH) also interfaces to the arithmetic processor interface (API) within the graph process controller (GPC) to download the arithmetic processor internal memories and for PM/FL operations. The scheduler can take the arithmetic processor (AP) "off-line" by command to the arithmetic processor interface (API), and then perform any download of data and reading of memories, registers, and counters by direct access to the arithmetic processor (AP) for the PM/FL operations. During graph execution, the scheduler (SCH) does not access the arithmetic processors (AP), except when executing a performance monitoring graph. The arithmetic processor program data in the graph processor controller memory (GPM) was previously loaded by the command element (CE).

The memory access controller (MAC) is interfaced to the scheduler (SCH) to provide the capability for the dynamic management of the global memory (GM). The memory access controller (MAC) is slaved to the graph process controller (GPC), and receives commands for allocation and deallocation. These commands are broken down into more useful forms for more efficient dynamic data queue and graph variable management. The commands can adjust allocation of produce and consume amounts of data for each queue. The scheduler (SCH)-to-memory access controller (MAC) commands with associated parameters are shown in Table V.

Figure 16:
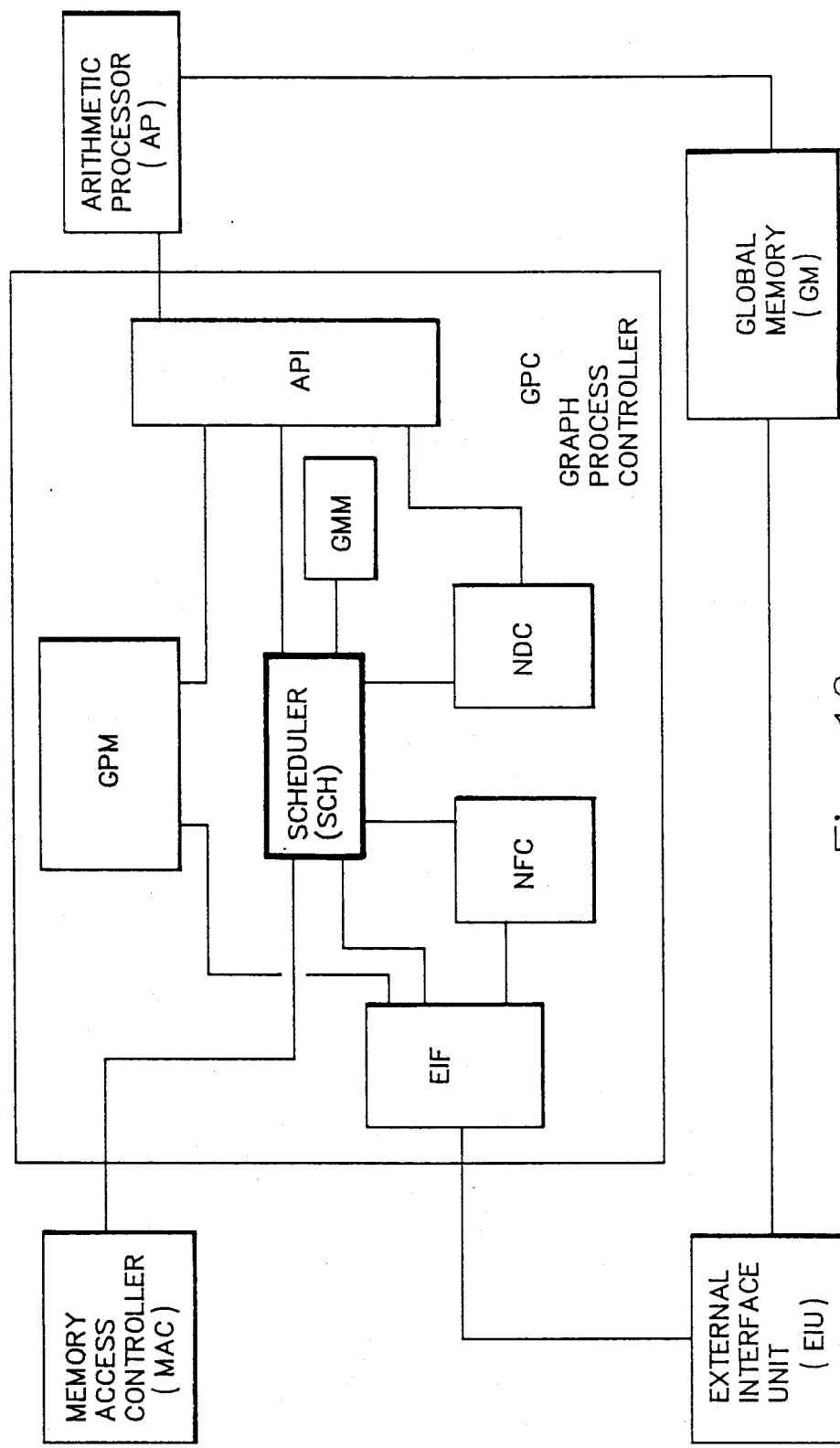
FIG. 16 illustrates performance monitoring/fault location operations of the scheduler.

Within the data flow signal processor architecture, the scheduler (SCH) is also the key for performance monitoring/fault location (PM/FL) functions and operations. Once the scheduler (SCH) has been verified by the accessing of data paths, memories, and controls by the command element (CE), the scheduler (SCH) can take over verification of the rest of the graph process controller (GPC) and much of the rest of the data flow signal processor. For fault detection purposes, PM/FL programs and data are loaded into the graph process controller memory (GPM) by the command program for the scheduler (SCH) to perform either fault detection or fault localization diagnostics as shown in FIG. 16. The scheduler (SCH) can verify the arithmetic processors (AP) via the graph process controller's arithmetic processor interface (API), and can verify the operation of the memory access controller (MAC) directly. The graph process controller (GPC) then goes on to verify the internal operation of the external interface unit (EIU), which then allows the accessing of the global memory (GP) to verify the data processing transfer paths interfacing the arithmetic processors (AP), memory access controller (MAC), global memory (GM) and the external interface unit (EIU). The only areas untestable by the graph process controller (GPC) are the command element (CE) and the external interfaces of the external interface unit (EIU).

TABLE V

SCHEDULER-TO-MEMORY ACCESS CONTROLLER COMMANDS

| Command | Inputs | Outputs |
| --- | --- | --- |
| Initialize MAC | | |
| Create Queue | | Queue ID |
| Destroy Queue | Queue ID | |
| Create Produce | Queue ID<br>Produce Amount | Produce Block ID<br>Start Page<br>Start Offset |
| Reduce Produce | Produce Block ID<br>Produce Amount | |
| Release Subset | Subset Block ID | |
| Adjust Produce | Produce Block ID<br>Length | |
| Create Consume | Queue ID<br>Consume Amount | Consume Block ID<br>Start Page<br>Start Offset |
| Remove Consume | Consume Block ID | |
| Read Queue Start | Queue ID | Start Page<br>Start Offset |
| Reduce Queue | Queue ID<br>Reduce Amount | |
| Create Graph Var | Length<br>Link Address | |
| Destroy Graph Var | Length<br>Link Address | |

The function of the node finish controller (NFC) and the node dispatch controller (NDC) is to provide the buffering of command and control data to the scheduler (SCH) for the command program and node dispatching functions. This allows the scheduler to finish an actual test, such as scheduling a node for execution, and subsequently to monitor the status of the node finish controller (NFC) asynchronously with arithmetic processor primitive execution and execution of the command program of the command element. The node finish controller (NFC) interfaces with both the arithmetic processor interface (API) and the external interface unit interface (EIF), while the node dispatch controller (NDC) interfaces only with the arithmetic processor interface (API) for distribution of control functions.

The arithmetic processor interface (API) provides the data path for the arithmetic processor (AP) to access the memory (GPM) of the graph process controller for retrieval of primitive parameters, and, the control path for the arithmetic processor (AP) access the node dispatch controller for node dispatching. The arithmetic processor interface (API) also interfaces with the scheduler (SCH) to allow access to the arithmetic processor memories for initialization and diagnostic software purposes.

The external interface unit interface (EIF) provides the graph process controller (GPC) with the path for command program communication. This path is also used to down-load graphs to the memory (GPM) of the graph process controller during system initialization. Additionally, it is used to make dynamic changes to graph data structures by the command program during graph execution. The external interface unit interface (EIF) provides a control path directly to the node finish controller (NFC) to buffer communications directed to the scheduler (SCH) during graph execution. This allows the scheduler to complete a task in progress without interruption before processing the command program requests.

Figure 17:
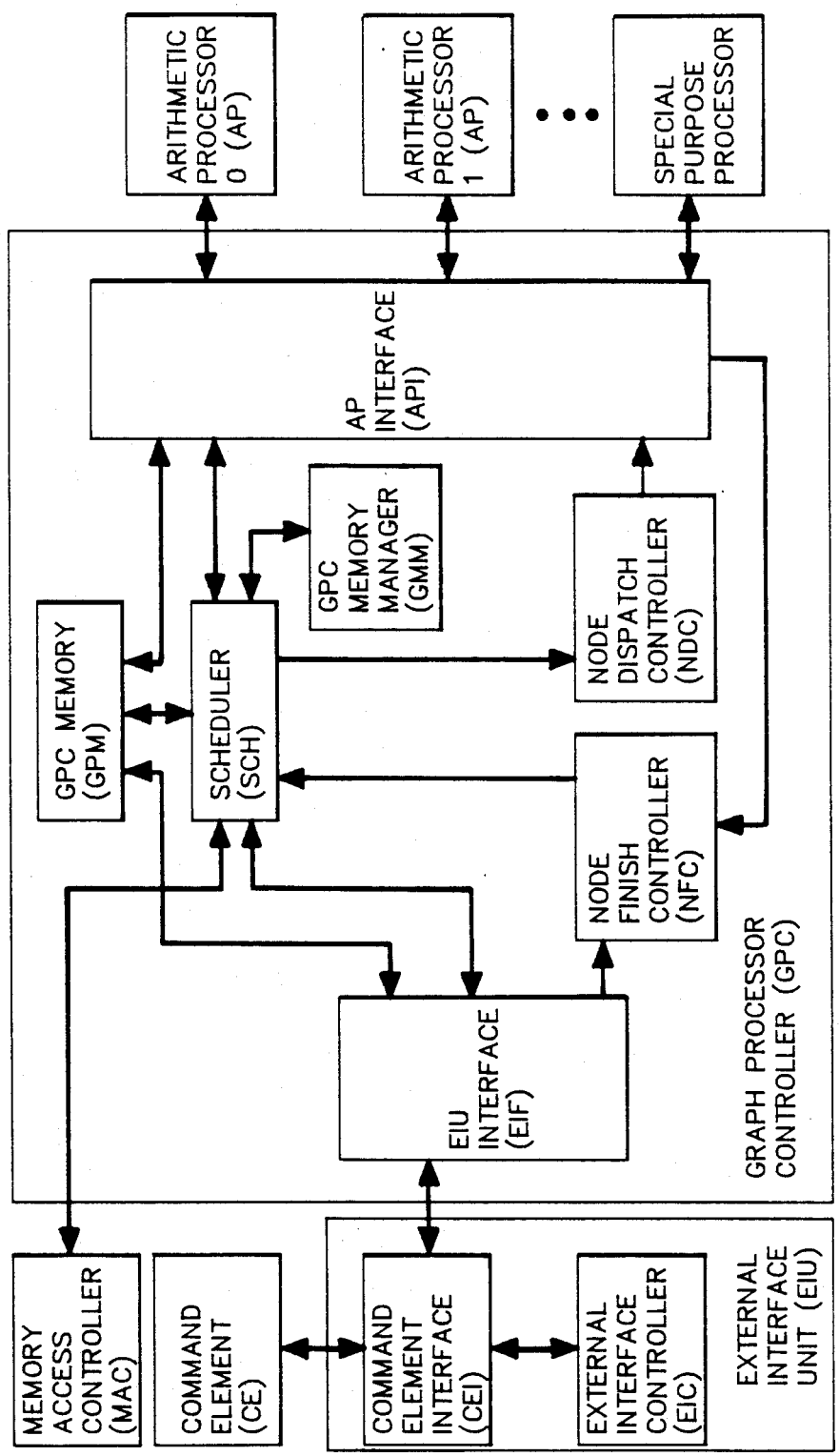
FIG. 17 is another block diagram of the improved data flow signal processor showing the interfaces of the graph process controller.

FIG. 17 is a further development of the graph process controller showing the connections with the external interface unit (EIU) and the arithmetic processors (AP) together with a special purpose processor. This will be useful in connection with a discussion of the graph process controller operations which follows. The graph process controller functional elements have architectures optimized to perform graph node scheduling and dispatching quickly and efficiently and to execute command program requests for total control of the graph processing function. In this respect, the graph process controller provides direct control to the external interface unit (EIU), the memory access controller (MAC), and the arithmetic processors (AP) under the direction of the command element (CE). The graph process controller performs initialization functions, node scheduling, node dispatching, command element interfacing, and PM/FL operations. The graph process controller is initialized by the command element (CE). The graph processor controller then initializes the external interface unit (EIU), the memory access controller (MAC) and the arithmetic processors (AP) under the command of the command element (CE). The graph process controller (GPC) performs the graph node scheduling operation using the memory access controller (MAC) for dynamic management of the global memory (GM) and internal graph processor controller functional elements which contain the graph representation. The dispatching of graph node instances utilizes special purpose hardware in the graph process controller which relieves the node scheduling function of the task of monitoring primitive executions in multiple arithmetic processors. The graph process controller receives command requests from the external interface unit (EIU) for graph control and PM/FL operations.

Figure 18:
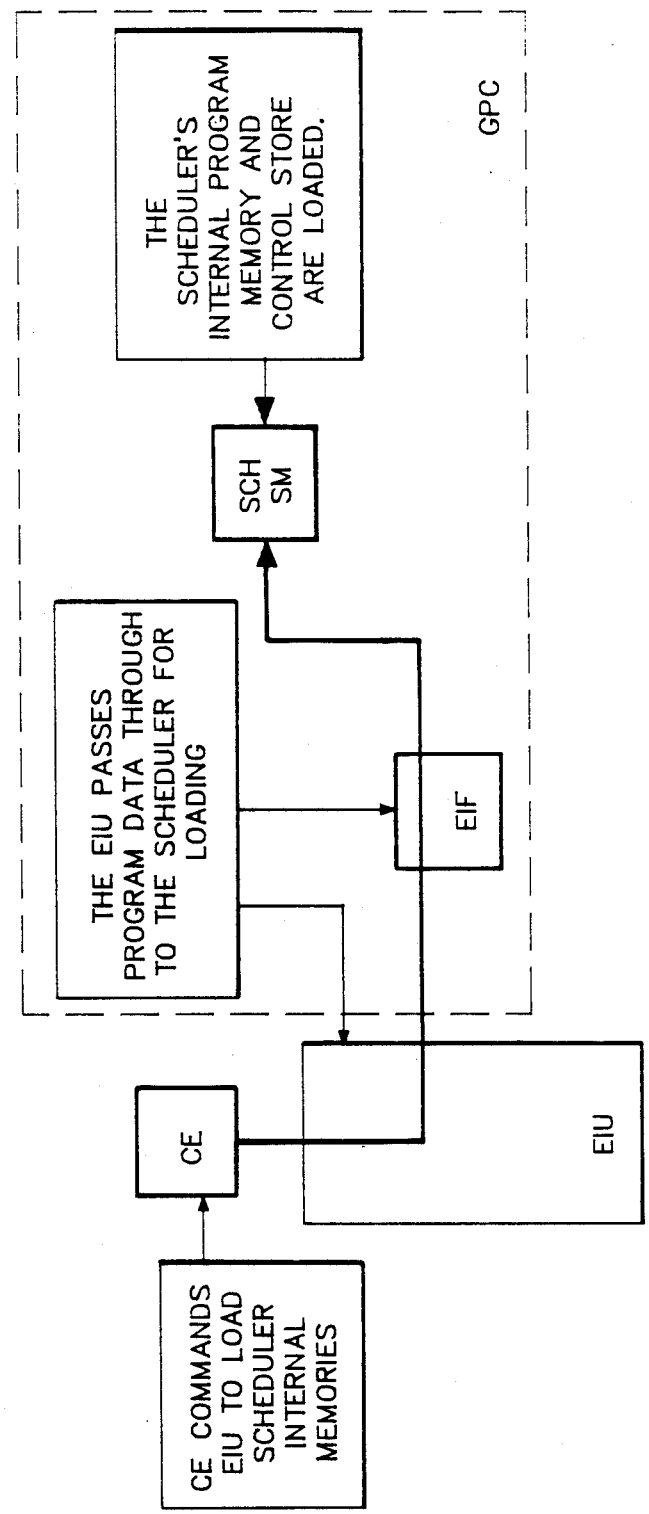
FIG. 18 illustrates the data flow in down-loading the program to the scheduler of the graph process controller.
Figure 19:
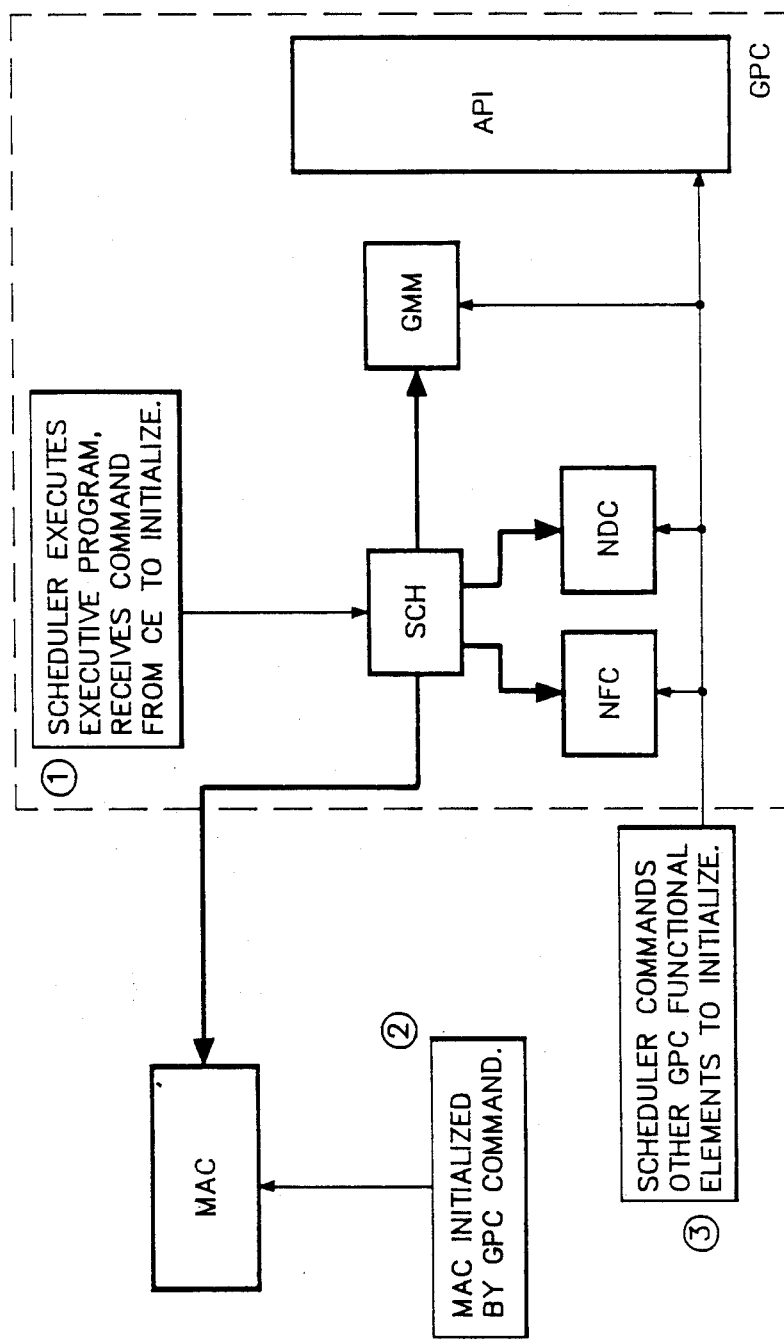
FIG. 19 illustrates the initialization of functional elements of the graph process controller following the loading operation of the scheduler of FIG. 18.

At the time of system start-up, the internal program and control store memories (SM) of the scheduler (SCH) of the graph process controller must be loaded. This is accomplished by the command element (CE) on command of the command element. Data is passed through the external interface unit (EIU) to the electronic interface (EIF) which directly loads the memories of the scheduler (SCH). The system and sequence whereby the initial program is loaded into the scheduler memory (SM) is shown in FIG. 18. Once loaded, the command element commands the scheduler (SCH) to initialize the other graph process controller functional elements. The scheduler (SCH) remains in an executive program loop until it receives a task to perform from the node finish controller (NFC). The graph process controller functional element initialization sequence is shown in FIG. 19.

Figure 20:
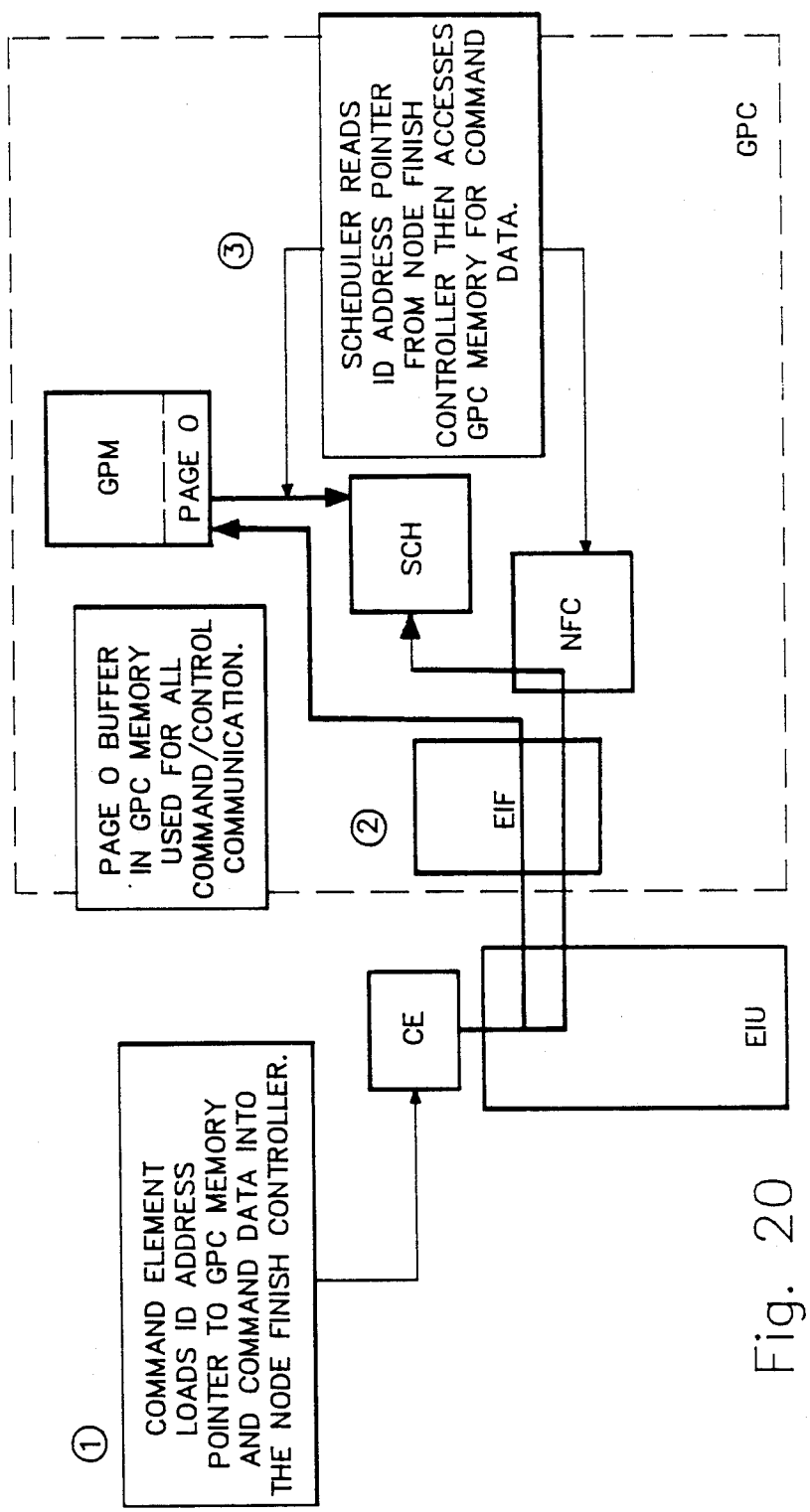
FIG. 20 shows communication paths from the command element to the scheduler and the graph processor memory of the graph process controller.

After initialization of the graph process controller, complete communication between the graph process controller, and the command element is operational. To command the scheduler (SCH), the command element (CE) first loads the command data into the memory (GPM) of the graph process controller. It then sends the ID address pointer for the data to the node finish controller (NFC). The graph processor memory is divided into pages of memory, each of which contains 2,048 data words. Addresses 0 through 2,047 define page 0, which is the command, and control buffer for the graph process controller. The scheduler (SCH) uses the command identification address pointer from the node finish controller (NFC) to access the graph processor memory (GPM) for command data. The communication sequence between the command element and the scheduler is shown in FIG. 20.

Figure 21:
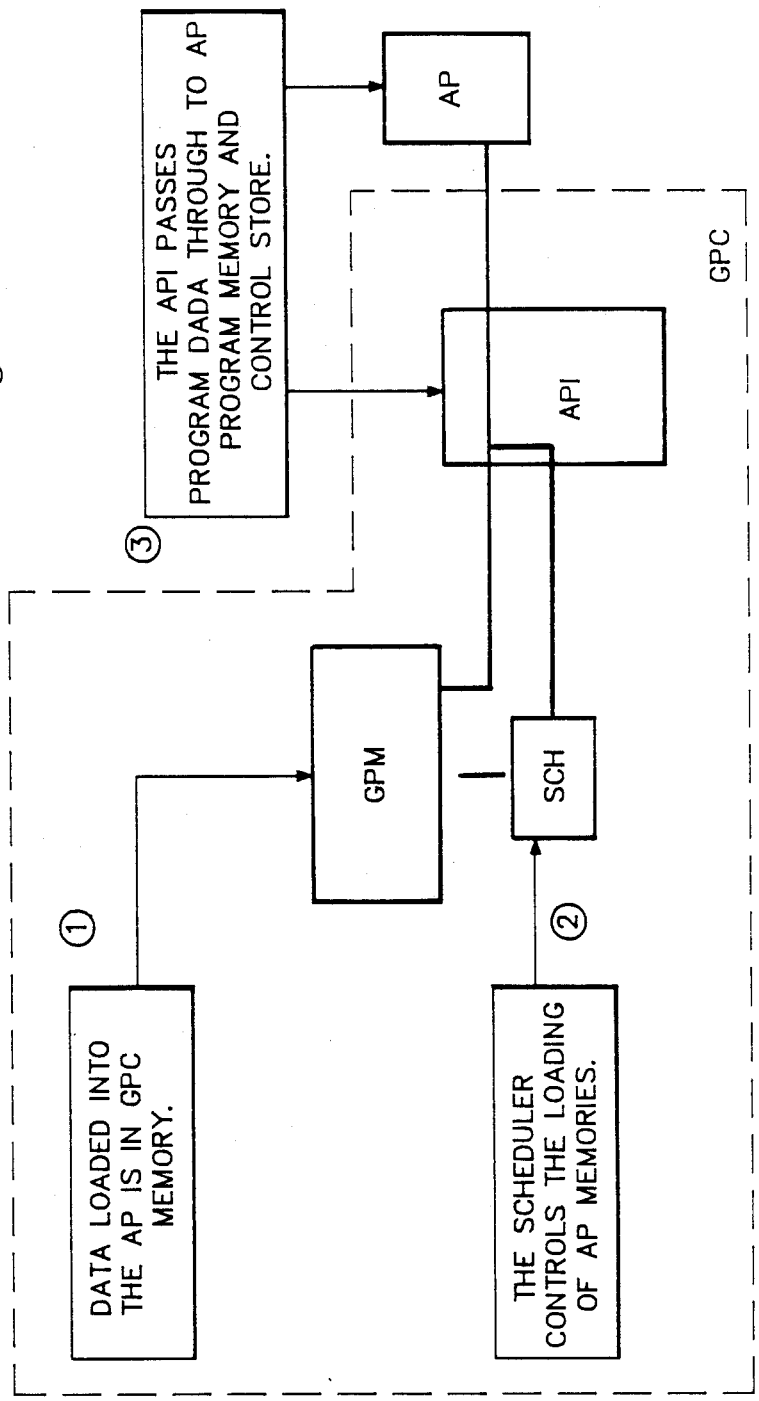
FIG. 21 illustrates program down-loading to the arithmetic processors.

After initialization of the graph process controller (GPC), arithmetic processor primitive program data must be down-loaded to the arithmetic processor program and control store memories. The arithmetic processor program down-loading sequence is shown in FIG. 21. The command element (CE) accomplishes this task by down-loading the data into the graph processor memory (GPM) and commanding the scheduler (SCH) to perform the arithmetic processor internal memory loading operation. Data is passed from the graph processor memory (GPM) through the graph process controller's arithmetic processor interface (API) to the arithmetic processors.

Figure 22:
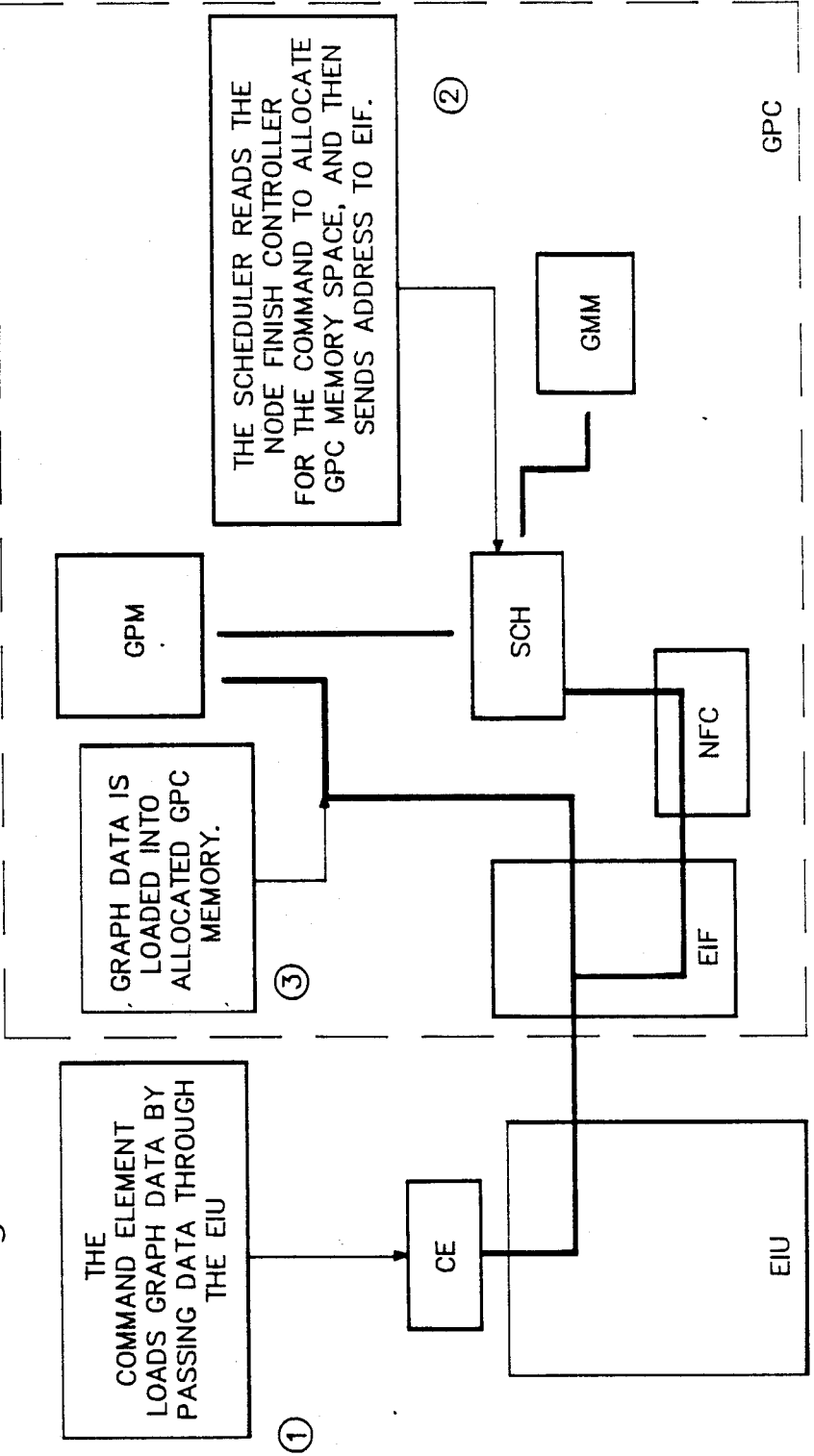
FIG. 22 illustrates the initial graph down-loading operation.

After the internal memories of the scheduler (SCH) and the arithmetic processor (AP) have been loaded, graph initialization begins. The command element (CE) commands the scheduler (SCH) to allocate space in the graph processor memory (GPM) using the graph memory manager (GMM). The allocated graph processor memory space is loaded with graph data structures which define each node and data queue of the graph. The initial graph down-loading sequence is shown in FIG. 22.

Figure 23:
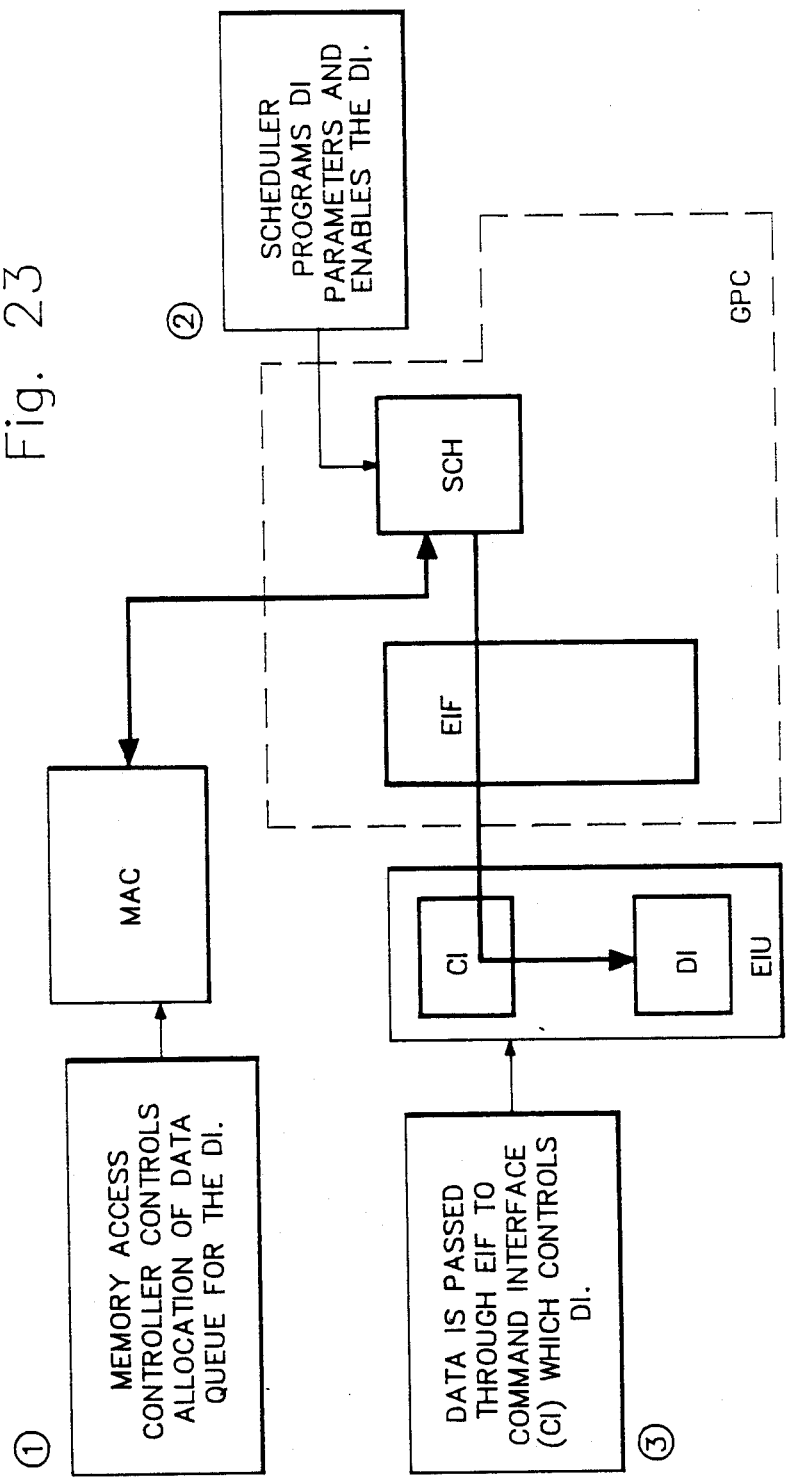
FIG. 23 illustrates the sequence for initialization of external devices.

At this point, the external device interfaces must be initialized to load sensor data to the global memory (GM) for subsequent arithmetic processor primitive processing. The initialization sequence is shown in FIG. 23. To initialize an external device, global memory space is allocated by the memory access controller (MAC) under the command of the scheduler (SCH) and is programmed into the external interface unit (EIU), along with the word count threshold parameter. Data is passed from the scheduler (SCH) through the electronic interface (EIF) to the external interface unit (EIU). The external interface unit (EIU) passes the parameter data through the command interface (CI) which controls the device interface (DI).

Figure 24:
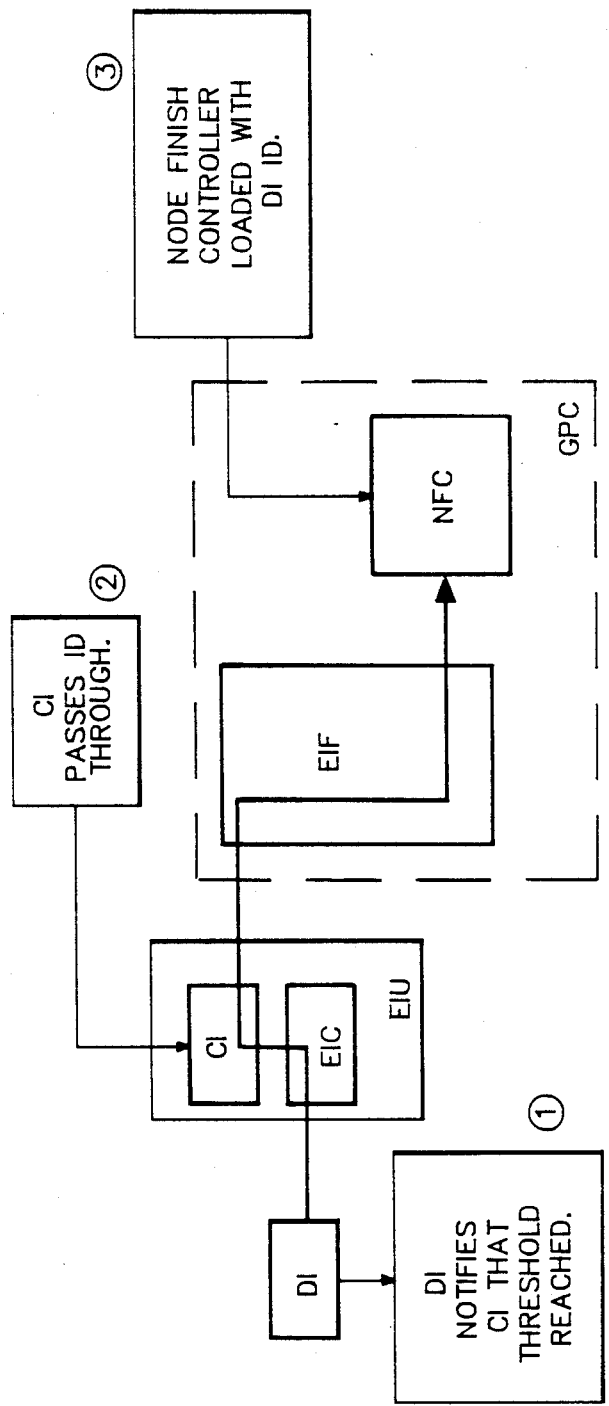
FIG. 24 illustrates data flow for initiating signal processing when the threshold of a device interface has been reached.

Actual graph execution signal processing begins when sufficient data has been loaded into the global memory (GM) to execute the first graph node instance. When the word count threshold of the device interface (DI) is crossed, the graph process controller (GPC) is notified by the electronic interface unit (EIU). The sequence followed after the crossing of an external device threshold is shown in FIG. 24.

The device interface node identification address pointer, for the graph process or memory node data structure that describes the device interface node, is passed through the electronic interface (EIF) to the node finish controller (NFC). This pointer is loaded into an internal queue, not shown, within the node finish controller (NFC) to be accepted upon the completion of any task which is already in progress.

Figure 25:
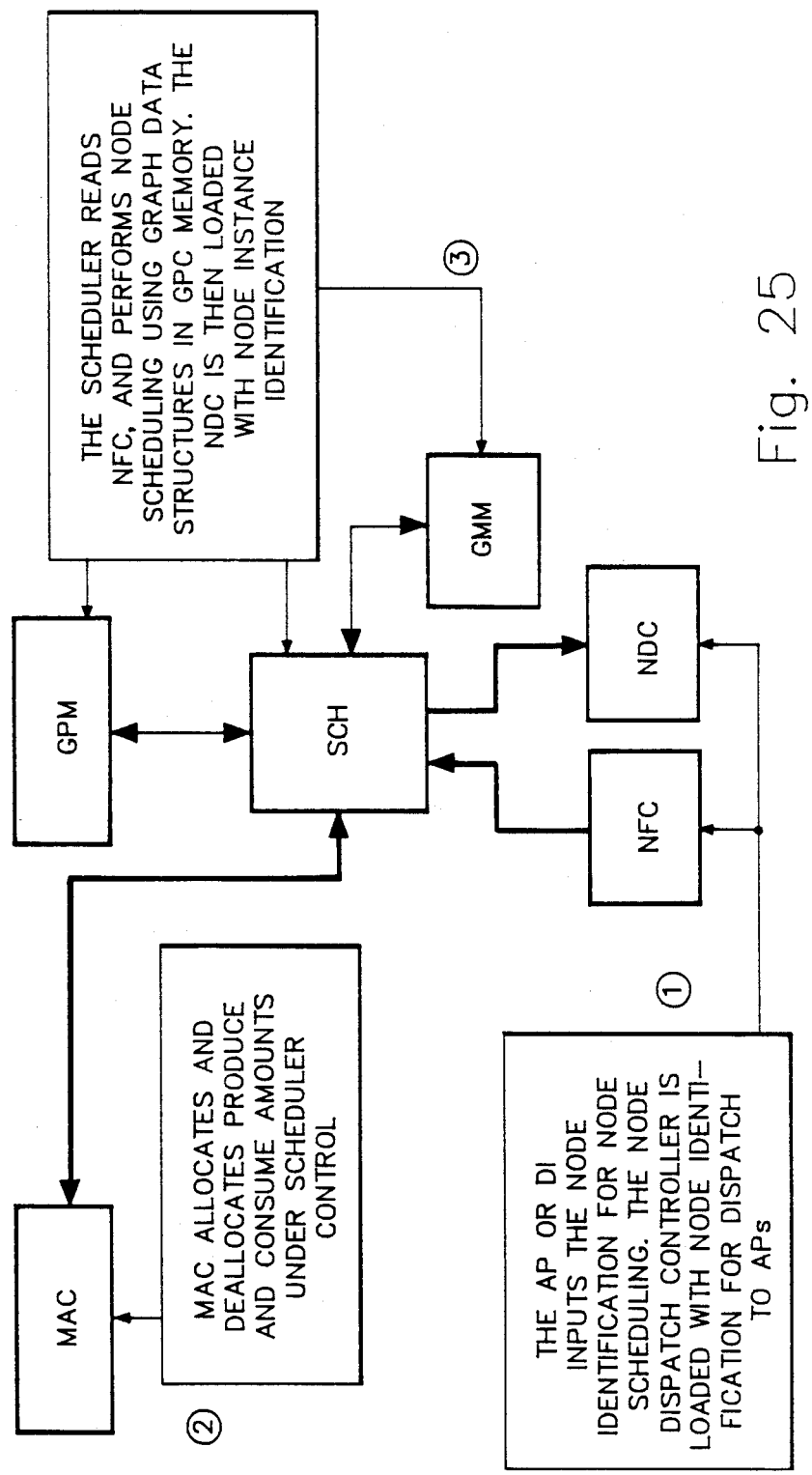
FIG. 25 illustrates the graph node scheduling process.

The graph node scheduling operation is shown in FIG. 25. A graph node scheduling function begins when the scheduler (SCH) receives the node identification to obtain a graph processor memory address pointer for the node data structure, from the node finish controller (NFC) relative to the status of an external device interface in the external interface unit (EIU), or the pointer for a previously scheduled and dispatched primitive which has finished. The graph processor memory address pointer obtained, if any, points to a unique data structure in the graph processor memory (GPM). The scheduler (SCH) reads the data structure from the graph processor memory (GPM) and determines the definition or meaning of the data which is either a node, a queue, or a command from the command element (CE). Each node identification is a single node instance. If the data structure pertains to a node, the scheduling algorithm knows that a primitive has finished execution in an arithmetic processor (AP) and the appropriate data structures in the graph processor memory (GPM) are then updated with this node instance completion information. If the data structure definition pertains to the status of a queue, the scheduling algorithm takes appropriate action with management of produce and consume amounts of the data queue using the memory access controller (MAC) while updating the dynamic data structures in the graph process controller memory (GPM) to which the queue relates.

The graph processor memory address pointer obtained from the node finish controller (NFC) could also be a command from the command program in the command element (CE) via the external interface unit (EIU). The scheduler (SCH) reads the command data from the graph processor memory (GPM) and takes whatever action is defined by that command.

After receiving the node identification from the node finish controller (NFC) to determine the necessary action, the scheduler (SCH) has done any required update of the data structure in the graph data structures in the graph processor memory (GPM). If the finished node read was the only thing preventing the next node's execution, then the next node is dispatched by passing the graph's processor memory address pointer of the graph node instance data structure to the node dispatch controller (NDC). Once all possible nodes have been dispatched and all pointers and values in appropriate descriptive blocks have been updated, the scheduling algorithm is completed and then returns to the node finish controller (NFC) to receive a new task.

The graph node scheduling function can schedule sequential nodes in the graph or multiple node instances which represent distinct instances in time or in parallel processing channels. Not all nodes can be combined due to inherent nonparallel characteristics. However, many nodes lend themselves to parallel processing of data. The combining of these node instances is done dynamically during the node dispatching function for efficient parallel primitive execution in the arithmetic processors (AP).

Figure 26:
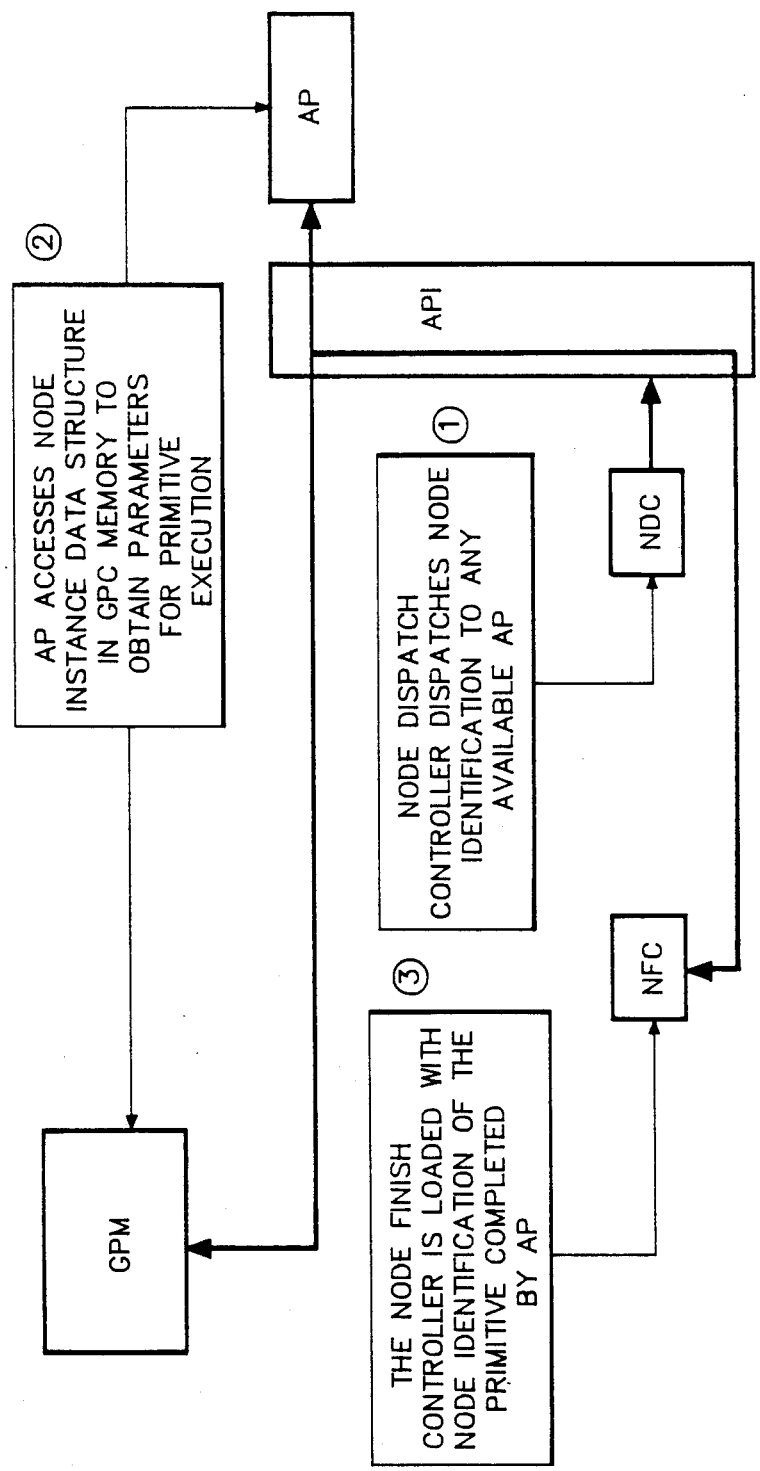
FIG. 26 illustrates the use of an available arithmetic processor under the control of the dispatching and finishing node controllers for data processing purposes.

Node dispatch and finish operations are shown in FIG. 26 any available arithmetic processor (AP) can be used to process primitives under control of the node dispatch controller (NDC) and the node finish controller (NFC). This operation occurs asynchronously with node scheduling and command program execution.

In node dispatching operations, see also FIG. 17, the graph process controller (GPC) uses the node finish controller (NFC), the node dispatch controller (NDC), the arithmetic processor interface (API), and the functional elements of the graph processor memory (GPM). Three functional sub-operations are involved in the graph process controller, node dispatching process. The node dispatching controller (NDC) is read by the arithmetic processor interface (API) which then dispatches the node which has been used to the appropriate arithmetic processor by supplying the graph processor memory address pointer of the node instance data structure to the arithmetic processor (AP). The arithmetic processor interface (API) also sends the node finish controller (NFC) the pointer upon primitive execution completion by the arithmetic processor (AP). After a node has been dispatched, the primitive reads the graph processor memory (GPM) for the required input parameters. The arithmetic processor interface (API) relays the graph processor memory access request from the arithmetic processors (AP) and also resolves contention between them on a first come/first served basis.

During graph execution, the command element (CE) and the graph processor controller (GPC) execute the major portion of the macro data flow control's shell. To provide the user and command program interface to the graph, the command element (CE) and the graph process controller (GPC) must be able to communicate directly. This is accomplished by direct commands to the scheduler (SCH), or, indirectly, by utilizing the graph processor memory (GPM) and the node finish controller (NFC). Both methods of communications require interfacing through the electronic interface (EIF) of the graph process controller (GPC).

Global Memory

Figure 27:
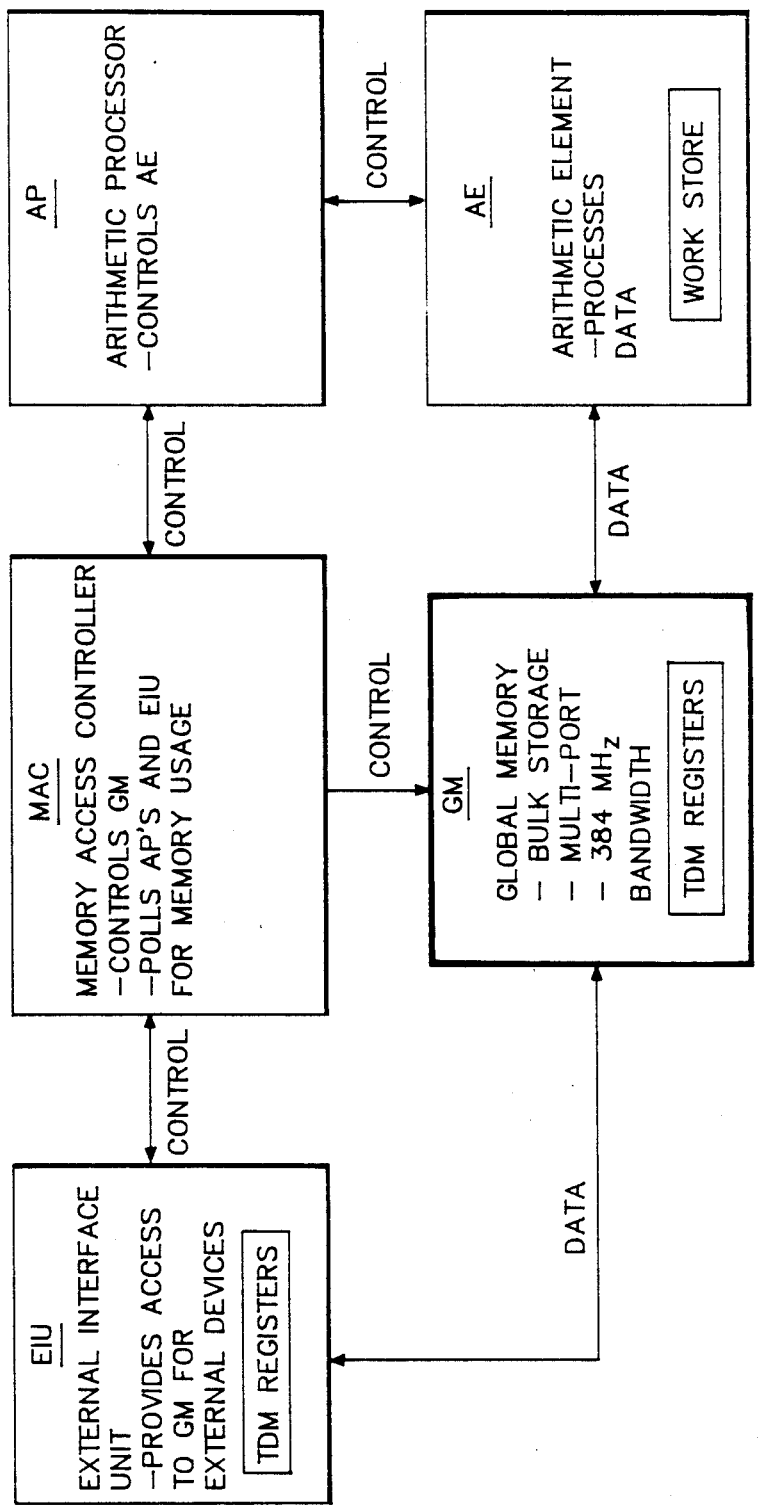
FIG. 27 illustrates interconnections of the global memory with other elements of this improved data flow signal processor.

An overview of the global memory showing its interconnections with other elements of the data signal processor will be useful in further understanding the function of the system. The global memory (GM) is a high-speed, partitioned multi-port bulk memory which provides multiple arithmetic elements (AE) and the external interface unit (EIU) with simultaneous use of data in the memory. The global memory, shown in FIG. 27, provides data storage for queues used in the macro data flow control's representation of signal processing functions. These queues are available to all arithmetic elements (AE) of the arithmetic processors (AP) and the external interface unit (EIU). The global memory provides up to 64 input/output ports. Each of these ports operate at the system clock rate of 6 MHz. These ports provide a maximum global memory bandwidth of 384 million words per second.

Figure 35:
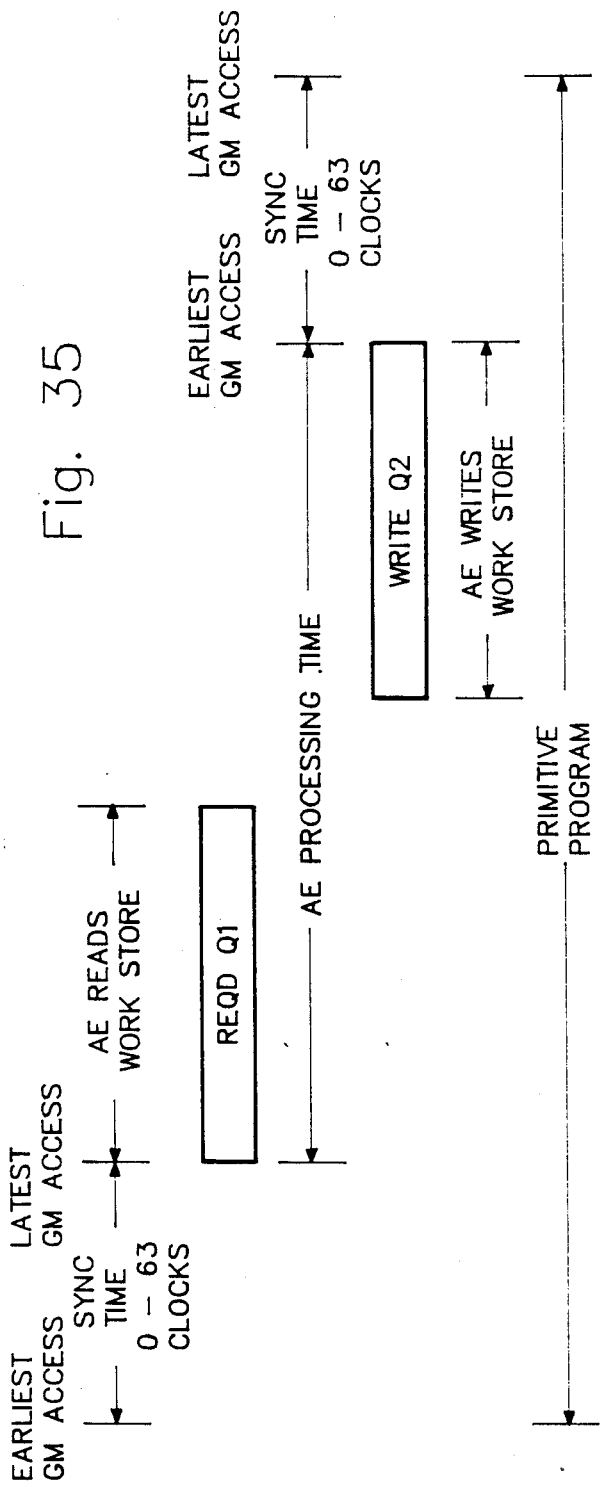
FIG. 35 illustrates a primative execution process of an arithmetic element.

Access to the global memory (GM) is time shared between the arithmetic elements (AE) and the electronic interface unit (EIU), with each arithmetic element (AE) assigned a fixed repetitive (every 64 clocks) memory access time slot (see FIG. 35). During its assigned access interval, an arithmetic element can access any 64 consecutive words in the memory. The memory access controller (MAC) interfaces with the global memory (GM), the arithmetic processors (AP), and the external interface unit (EIU) to control memory usage. The memory access controller (MAC) polls each arithmetic processor (AP) to determine whether one or more of its arithmetic elements (AE) are going to use their assigned access time slots. If an arithmetic element is planning on using its assigned time slot, its controlling arithmetic processor transfers a memory address and the number of words requested to the memory access controller (MAC). The memory access controller uses this information to control the data transfer between the global memory (GM) and the requesting arithmetic element (AE). If an arithmetic element does not require use of its assigned time slot or if the access time slot is unassigned, the memory access controller polls the external interface unit (EIU) to determine whether the external interface unit can use the open time slot. If the electronic interface unit does not request the open time slot, it transfers a memory address and the number of words requested to the memory access controller. The memory access controller uses this information to control the data transfer between the global memory (GM) and the external interface unit (EIU).

The global memory, in one embodiment of this invention, is partitioned into sections of 256K words each. These sections can be combined to construct memories or various sizes (memories as small as 512K words or as large as 128 million words). Each of these sections has an input/output port connecting it to associated time division multiplex registers (TDM) (see FIG. 28). Each arithmetic element accesses its own set of time division multiplex registers in the global memory, which are used to access multiple parallel (usually 32) memory sections during a 2-clock arithmetic element access time slot which spans two clock cycles and to temporarily store the accessed data while it is serially transferred between the time division multiplex registers (TDM) and the work store of the arithmetic elements.

Any unassigned access time slot or any time slot not used by its dedicated arithmetic element, shall be available for memory refresh or for use by the external interface unit (EIU). The external interface unit (EIU) provides external devices access to the global memory (GM). The external interface unit (EIU) also uses a set of time division multiplex registers (TDM) to access up to 32 memory sections during an available access time slot.

All of the data within the global memory, including data through the time division multiplex registers (TDM), consists of 22 data bits, 6 error detection/ correction check bits (EDC), and 3 "hot spare" bits. These spare bits shall be used only when a failure occurs in one of the 22 data bits. The global memory and the time division multiplex registers are bit sliced so that failures cause the loss of only a single bit of a word (a single bit from all words in memory). The 22 data bits plus the 6 error detection correction check bits form a modified Hamming code. This code has the property that any single bit error that occurs anywhere in the 28-bit code can be corrected and that any double-bit error can be detected.

Global Memory Functional Elements

Figure 28:
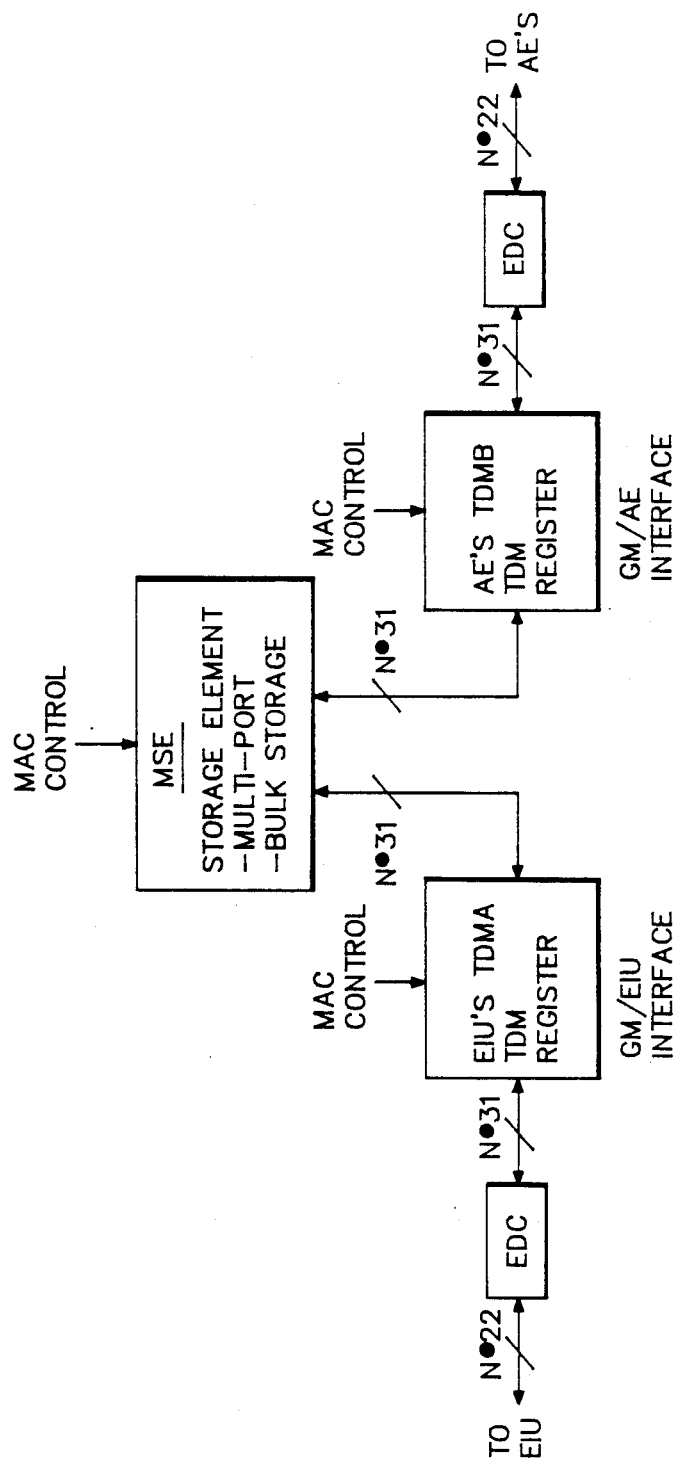
FIG. 28 is a block diagram showing the organization of three functional elements of the global memory.

The functional elements of the global memory (GM) are shown in FIG. 28. The global memory provides high bandwidths through the use of multiple ports, each of which operates at a 6 MHz rate. The global memory comprises three functional elements: a memory storage element (MSE) and two-time division multiplex registers (TDMA and TDMB). The time division multiplex register TDMA is the interface between the global memory (GM) and the external interface unit (EIU). The time division multiplex register TDMB is the interface between the global memory and the arithmetic element. The memory access controller controls all of these functional elements to transfer data to or from the global memory, from or to the arithmetic processors and the external interface unit. Parallel ports, each of which contains 31 bits, in this example, connect the global memory storage elements to the time division multiplex interface registers TDMA and TDMB.

The global memory storage element is of modular design which allows the memory to be assembled in various sizes. This memory can vary from one-half million to 16 million words with the capability to expand to 128 million words in steps of 16 million. The size of the memory, the number of its ports, the number of arithmetic elements (AE), and the memory bandwidth are all interrelated. Choosing a particular number of memory ports fixes the size of memory (256 K/port). Each fixed number of memory ports is associated with a corresponding number of memory access time slots. The number of arithmetic elements must be equal to or less than the number of access time slots. Table VI is useful in determining the possible number of memory access ports, the number of assignable access time slots, and the memory size and memory bandwidth.

TABLE VI
PARALLEL MEMORY PORTS TABLE

| Number of Ports | Number of Usable Memory Access Slots | Global Memory Size | Global Memory Bandwidth |
|---|---|---|---|
| 1. 2E(N) OR | 2E (N−1) | 256K/port | 6 MHz/access slot |
| 2. 2E(K)*3 | 2E (K+1) | 256K/port | 6 MHz/access slot |

For eq. 1 use N = 1, 2, 3, 4, 5 or 6
For eq. 2 use K = 1, 2, 3, or 4
NOTE: For the data flow signal processor maximum performance, envelope, k = 4 is used. This results in 49 [(2**4) * 3] memory ports, 32 [2**(4+1)] usable access slots, a memory size of 12 million [32*6 MHz]. If a memory of only 8 million words is required, N = 5 is used. This results in 32 [25] memory ports, 16 [2(5−1)] usable access slots, a memory size of 8 million [32*256K] words, and a memory bandwidth of 96 MHz [16*6 MHz].

The two time division multiplex registers (TDMA and TDMB) which respectively function as the interfaces between the memory storage element (MSE) and the arithmetic element (AE), and, the memory storage element (MSE) and the external interface unit (EIU), are used to transfer data between the storage element in the memory and the multiple arithmetic elements, as well as the external interface unit. These interfaces utilize time division multiplex registers to perform this function. The time division multiplex registers are programmable as to the number of memory ports they can access during a parallel data transfer. The number of memory ports accessed is always equal to the number of usable memory access time slots in a particular system. The number of sets of time division multiplex registers, there being one set per arithmetic element in one of these interfaces, is always equal to or less than the number of usable access time slots. The number of sets of time division multiplex registers (one set/serial input-/output channel) in a global memory to electronic interface unit interface must always be equal to or less than the number of usable access time slots. This implies that there are two sets of time division multiplex registers for each usable access time slot. One set is the arithmetic elements set of time division multiplex registers which have the highest priority to the use of the memory access time slot and the other set is the external interface unit set of time division multiplex registers which can use the time slot if the arithmetic elements do not.

The memory access controller (MAC) controls which ports are to be accessed during a memory access time slot and which set of time division multiplex registers are used to achieve parallel transfer of the data. The memory access controller also provides memory accesses to transfer 64 words to an arithmetic element every 64 clock cycles, regardless of the number of memory ports. A system with 32 usable access time slots transfers 64 words (2 words/port) between the access ports and a set of time division multiplex registers in one memory access time slot (2 clocks) every 64 clock cycles. In a system where N=4 (see Table IV), there are 32 ports containing 8 million words and 16 usable access time slots. In this system, when an arithmetic processor (AP) or the external interface unit (EIU) requests 64 words of data every 64 clocks cycles, the memory access controller transfers 32 words in parallel between the global memory storage elements and a set of time division multiplex registers and then transfers the remaining 32 words 32 clock times later. Thus, the arithmetic element receives 64 words in 64 clock intervals or cycles. This operation is transparent to the arithmetic element (AE) or to the external interface unit (EIU) and all serial transfers between the global memory and those access devices which have identical timing. The second transfer of 32 words occurs automatically without the arithmetic processor (AP) or the external interface unit (EIU) being required to generate a second request. In other systems, the number of words which are transferred in parallel during a single access, is multiplied by the number of automatic transfers to always equal 64 words in 64 clock cycles (if 64 words are requested).

The three functional elements of the global memory are partitioned into 31-bit slices, as shown. This means that no part or no card contains more than 1-bit from a data word. All data paths, including the time division multiplex registers (TDMA and TDMB) are bit-sliced. The global memory is partitioned in this manner so that any single part failing or any single card which is removed from memory causes the loss of only a single bit from a group of data words. This lost bit of data is automatically reconstructed by the use of an error-correcting code.

The 31 bits consist of 22 bits of data and 6 check bits to create a 28-bit coded data word and 3 hot spare bits. As noted hereinabove, this code (modified Hamming) has the ability to self-correct any single bit error occurring anywhere in the 28-bit code word. Error detecting circuits (EDC) are shown, for this purpose, between the respective time division multiplex registers and the elements to which they are connected. Once a bit slice of memory has failed (when two bits have failed in one word), one of three spare bit slices of global memory can replace the failed bit slice. These three spare bit slices are in place within memory but are only activated when a failure occurs as detected by the error detecting circuits.

Time Division Multiplex Reister (TDMB)

Figure 29:
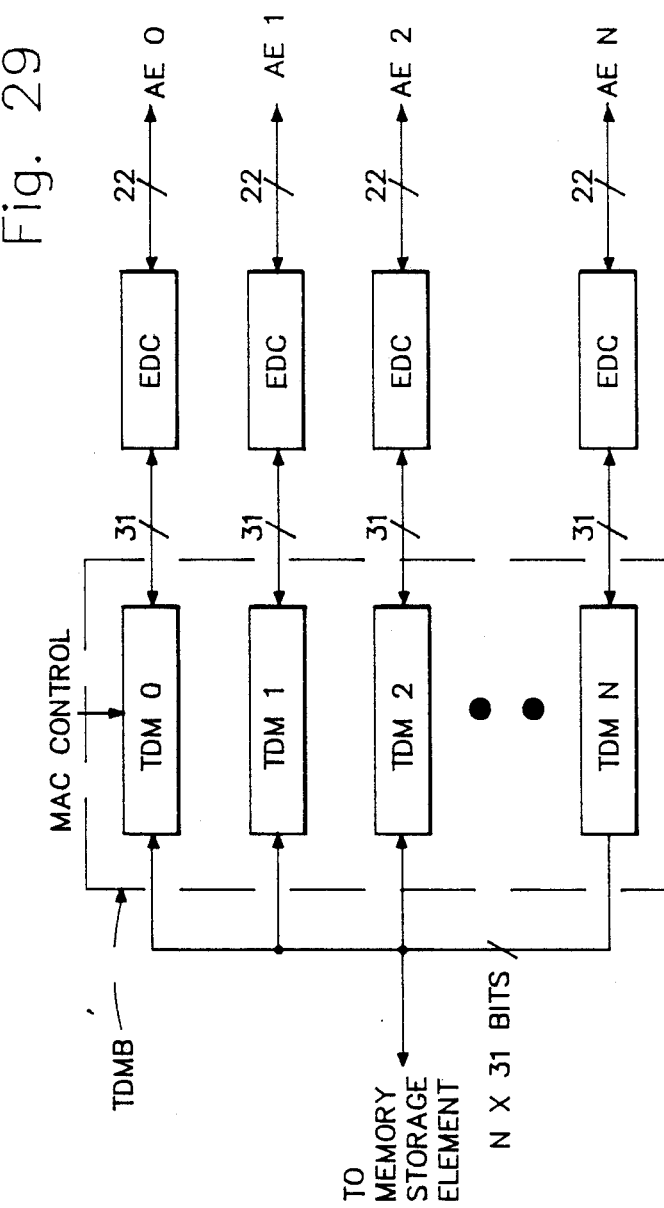
FIG. 29 is a block diagram of the interface element of FIG. 28 which couples the global memory and the arithmetic elements.

Details of the time division multiplexer (TDMB), together with the details of its operation, are discussed herebelow in connection with FIG. 29. This time division multiplexer functions as the interface between the global memory (GM) and the arithmetic elements (AE). This interface register provides multiple arithmetic elements with contention free access to data memory.

The time division multiplexer (TDMB) allows up to 32 arithmetic elements to have simultaneous access to the global memory (GM). Each arithmetic element in the system is assigned a memory access time slot during which it has access to multiple parallel sections of the memory. This interface uses sets of time division multiplex registers, one for each arithmetic element, to convert the serial data transfer of an arithmetic element to a parallel transfer during its assigned access time slot. These sets of time division multiplex registers (TDMB) are identified TDM-O through TDM-N.

The number of arithmetic elements in a system and the number of memory sections accessed during a memory access time slot depends upon the size of the global memory. The global memory/arithmetic element interface (TDMB) can be programmed to operate in four different modes, one of which is used for each corresponding configuration of the global memory (GM). These modes are:

(1) 4 memory sections accessed per access slot with a maximum of 4 arithmetic elements in the system;

(2) 8 memory sections accessed per memory slot with a maximum of 8 arithmetic elements;

(3) 16 sections accessed per memory slot with a maximum of 16 arithmetic elements; or (4) 32 sections accessed per memory slot with a maximum of 32 arithmetic elements.

The global memory must always have more memory sections than the number of sections accessed by the global memory/arithmetic element interface (TDMB) during an access time slot.

A 5-bit synchronizing control signal generated by the memory access controller (MAC) defines the 32 possible access time slots and defines when control signals from the memory access controller are valid for a particular set of time division multiplex registers for an arithmetic element. To execute a read operation in the global memory, the memory access controller (MAC) generates a parallel write command directed to a particular set of time division multiplex registers. The data currently on the global memory bus is loaded into that set of time division multiplex registers for the first of two parallel data transfers during a memory access, time slot. As that set of time division multiplex registers are loading the second parallel data transfer, the registers automatically begin to serially transfer data into the error detection correction circuit (EDC) of that arithmetic element. When this set of registers has serially transferred the last word of a memory access, the same arithmetic element's next access time slot becomes available and a new set of data can be loaded in parallel into the registers.

To perform a write operation in the global memory, the memory access controller (MAC) generates a serial write command directed to a particular set of time division multiplex registers. The registers serially load the data coming from the error detection circuit (EDC) of the associated arithmetic element circuit until the registers are full. As the last serial word is being clocked into the time division multiplex registers, the memory access controller (MAC) generates a parallel read command that loads the first half of the stored data onto the parallel global memory bus. On the next clock cycle, the last half of the data is loaded onto to the parallel bus, while simultaneously the first word of a serial data transfer can be clocked into the register for the next memory write operation. The serial transfer of data for each arithmetic element must be synchronized so that the last word is loaded into the registers in time for its assigned memory access time slot. A 5-bit synchronizing control signal (access time slots) is generated by the memory access controller (MAC) and sent to the arithmetic processors (AP) for this purpose.

In order to sequence the order of the serial data transfer so that the first word in or out of a set of time division multiplex registers in the set TDMB, is the first word requested by an arithmetic process, the memory access controller generates a 6-bit word pointer during the existence of the serial write or the parallel read command. This is used by the control logic associated with each set of time division multiplex registers to sequence the serial data transfer from the registers or to latch the serial data into the appropriate parallel channel for a memory write operation.

The 28-coded data bits transferred out of a set of time division multiplex registers during a memory read operation, pass through an error detection circuit (EDC) before reaching an arithmetic element. The coded data word allows the error detection circuit to correct any single bit error and flag any such errors to the data by the error detection circuit (EDC) before moving into a set of time division multiplex registers. Three spare bit-slices parallel the global memory/arithmetic element interface data path TDMB and are used to replace any failed bit-slices in the 28-bits of coded data.

Time Division Multiplex Registers (TDMA)

Figure 30:
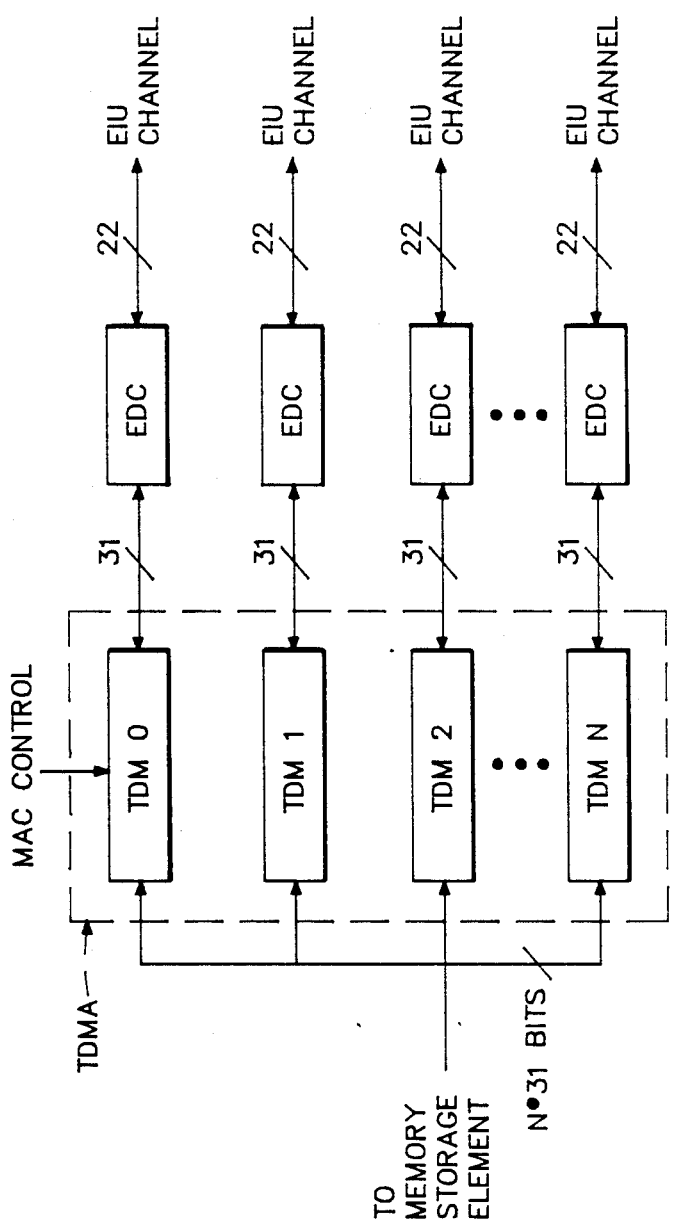
FIG. 30 is a block diagram of the interface element of FIG. 28 which couples the global memory and the external interface unit.

The details of the time division multiplex register (TDMA), together with its detailed operation, are discussed in connection with FIG. 30. This set of time division multiplex registers functions as the interface element between the global memory (GM) and the external interface unit (EIU) and provides up to 32 asynchronous serial data channels for the external interface unit to access the global memory.

This interface circuit is essentially identical to the one previously discussed in connection with FIG. 29. The differences are in the methodology with which control signals are generated by the memory access controller (MAC). This global memory/external interface unit interface (TDMA) is programmed to match the mode of operation of the interface (TDMB) for the global memory/arithmetic elements (4, 8, 16 or 32 channels). For each set of time division multiplex registers in the interface circuit (TDMB) of FIG. 29, there is a corresponding set of time division multiplex registers in this interface circuit (TDMA) of FIG. 30. When arithmetic elements (AE) are assigned dedicated memory access time slots, the serial channels of the external interface unit (EIU) use the global memory asynchronously whenever an open memory access time slot occurs. In the interface for the global memory/arithmetic elements (TDMB), the 5-bit synchronizing control signal is used to select sets of time division multiplex registers in sequence.

In operation, the memory access controller (MAC) signals the external interface unit (EIU), a select number of clock cycles [~74] before an open access time slot is available for the external interface (EIU) unit to use the memory. The external interface unit (EIU) then responds with a memory address, the number of words requested (less than or equal to 64), which set of time division multiplex registers are to be used, and a read/write control signal. For a memory read operation, the electronic interface unit (EIU) selects one of its set of time division multiplex registers that will be free for use [~74] later. During the open access time slot, the memory access controller (MAC) generates the required control signals to place data on the global memory (GM)/external interface unit (EIU) parallel bus and generates a parallel write command to the selected set of registers. The data is latched into the selected time division multiplex registers and then serially transferred to an error detection circuit (EDC) on that external interface unit's serial channel.

For a memory write operation, the external interface unit (EIU) selects a set of time division multiplex registers that is currently free. [~10] clock cycles after the external interface unit (EIU) was granted an open memory slot and requested a memory write operation, the memory access controller (MAC) generates a serial write command signal directed to the selected registers. The electronic interface unit serially outputs from 1 to 64 words into the selected channel at this time. Sixty-four clock cycles after the memory access controller (MAC) has generated this serial write request signal, it generates a parallel read command signal. This causes the selected time division multiplex registers to execute two 32 parallel (for a 48 or 64 port system) data transfers into the memory sections of the memory (GM) selected for access by the memory access controller. As in the case of the interface for the global memory/arithmetic element (TDMB of FIG. 29) serial data must be formatted coming out of a set of time division multiplex registers so that the first word out is the first word that the external interface unit (EIU) requested, and that data which is serially transferred in is placed in the proper parallel channel. To perform this function, the memory access controller (MAC) generates a 6-bit word pointer directed to the selected set of time division multiplex registers during a parallel write operation or a serial write command. As stated previously, this interface element between the global memory and the external interface unit (EIU) always has the same number of time division multiplex registers as the interface element (TDMB) between the global memory and the arithmetic elements. This number is equal to the maximum number of arithmetic elements in the system configuration. The external interface unit does not have to use all the serial channels these registers provide. As in the case where the system may contain less than the maximum number of arithmetic elements, the external interface unit uses only enough of the serial channels to provide the required system input/output rate.

Figure 31:
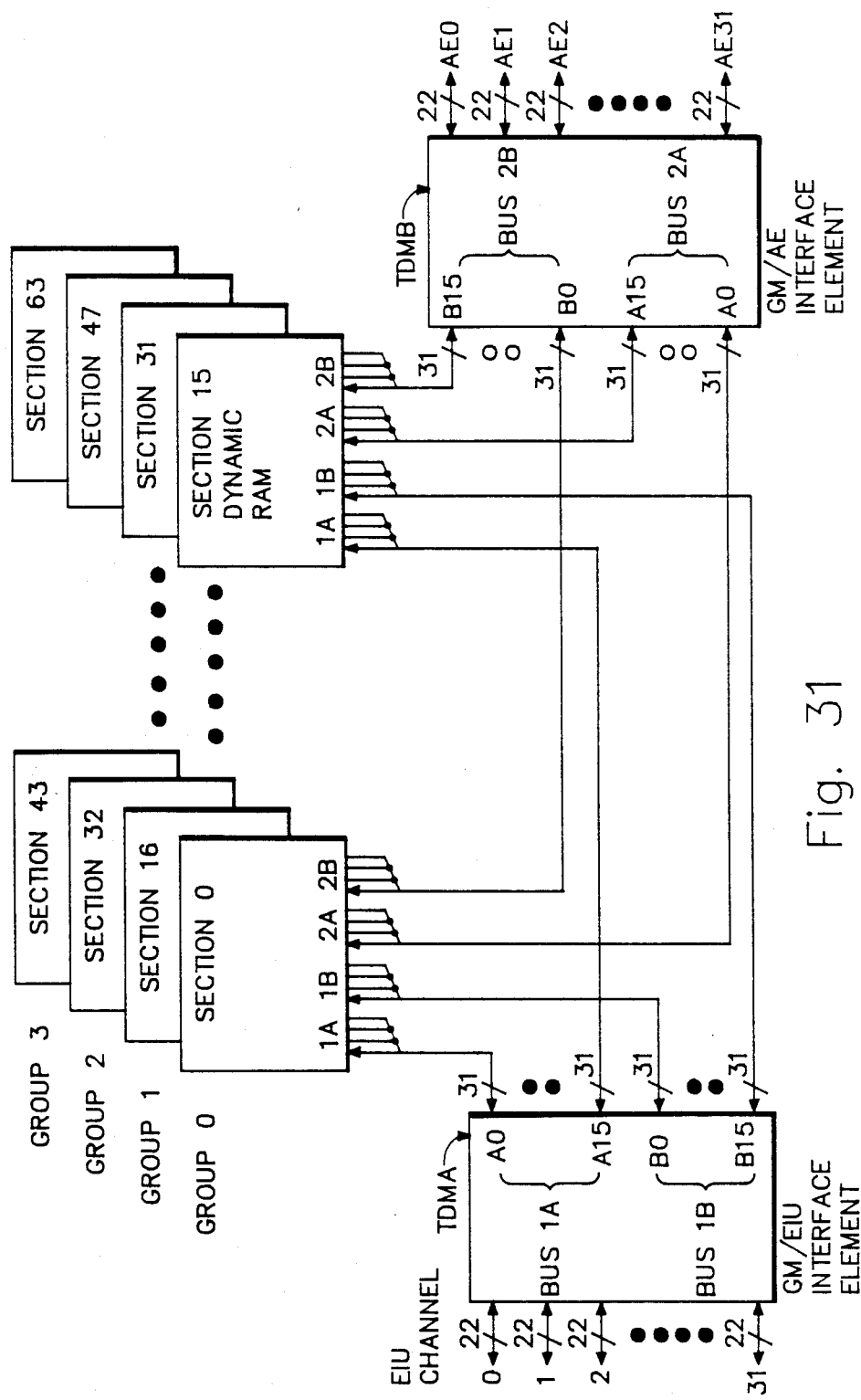
FIG. 31 is a functional diagram of the global memory.
Figure 32:
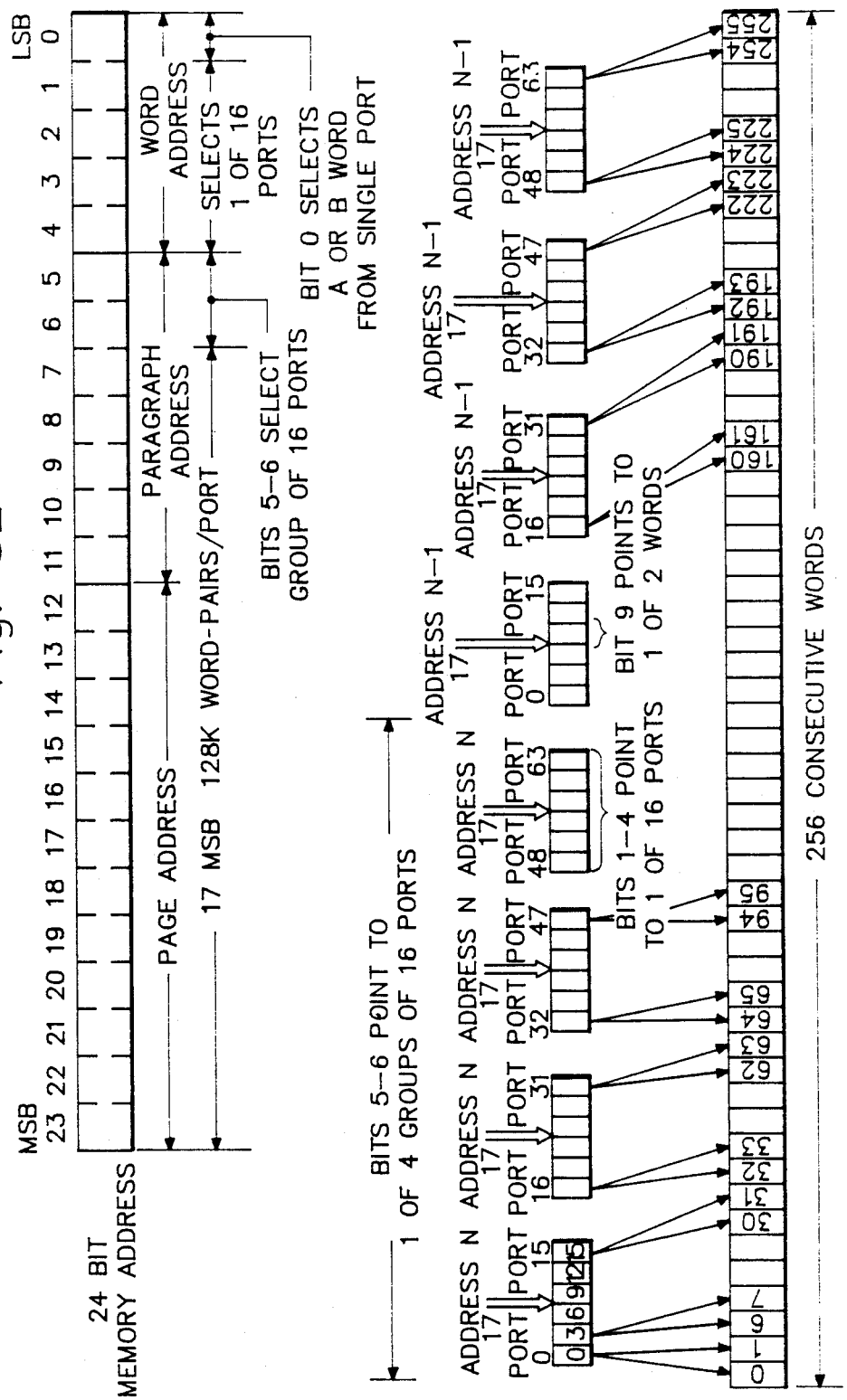
FIG. 32 illustrates the functional organization of a 64-port global memory.

The operation of the global memory will be further understood in connection with discussions relating to FIGS. 31 and 32.

The storage element of the global memory (GM) provides the function of physically storing data queues used in macro data flow control's representation of signal processing functions.

The memory storage element is divided into sections of equal size (256K). These sections are further partitioned into single bit-slices and stacked to create a data word. A total of 31 bit-slices are used to create each section comprising 22 data bits, 6 parity check bits, and 3 "hot" bits. Each section uses a 17-bit address, FIG. 32, (on a 9-bit time multiplexed bus) to address 128K word-pairs. Two overlapping memories operating at 3 MHz each are used to implement a single 6 MHz memory. This overlapping results in two words, A and B, FIG. 31, located at each 17-bit address.

Each global memory section has a multiplexed input/output port that provides one of four data paths for transferring data between that memory section and other elements in the global memory. Two of the 4-bit directional data paths are connected to the interface element (TDMB) between the global memory and the arithmetic element (AE). The other two data paths are connected to the interface element (TDMA) between the global memory (GM) and the external interface unit (EIU). A 2-bit multiplexing control signal generated by the memory access controller (MAC) determines which of the four data paths is active (the others are tri-stated) for a data transfer.

Each memory section's memory chips are controlled by a dynamic memory controller. This device generates signals required for 64K dynamic random access memories. It performs automatic memory refresh operations (at direction of the memory access controller). It latches all addresses and controls from the memory access controller (MAC) and provides the four multiplexed data paths for each section. The control signals required for each section consist of a 17-bit address, a 2-bit operation code, a 2-bit multiplexing control signal, and a coded write/enable control. The operations code (OP) controls the basic operation of the section-read write refresh, or, no operation. The multiplexing control selects the active data path. The coded write enable control is used to prevent over-write of data during a memory write operation and to tri-state non-accessed sections during a memory read operation.

The size of the global memory is determined by combining sections to reach the desired configuration. Sections are organized into "groups" (for a basic system, 16 million words). All memory sections in a group share the same 17-bit address, the operation code, and the multiplexing control. The coded write enable controls allow sections within a group to be deactivated. The four data paths of each section are connected to the four paths of a corresponding section in the other groups (see FIG. 31). The four paths of the section in Group 0 are connected to the four paths of Section 0 in Group 1 (and Section 0 in Group 3 and in Group 4). The four paths of Section 1 in Group 0 are connected to the four paths of Section 1 in Group 1. This organization continues for all of the sections in a group.

In order to describe the organization of data storage in the global memory, a particular configuration of this data signal processor of 64 sections partitioned into 4 groups of 16 sections each will be used, FIG. 31.

When an arithmetic processor (AP) or the external interface unit (EIU) requests data, the requesting device generates a 24-bit address, FIG. 32, (for a basic system) and the number of consecutive words requested (less than or equal to 64). FIG. 32 shows the organization of 256 consecutive words stored in the memory element. If a device requests words 0 to 63, the memory access controller applies the 17 most significant bits of the 24-bit address to Groups 0 and 1. Bits 5 and 6 of the 24-bit address are decoded by the memory access controller to activate one of the two data paths connecting the sections in Group 0 to the requesting device's interface (an arithmetic element (AE) or the external interface unit (EIU)). The memory access controller activates the other data paths for the sections in Group 1. Thus, the 32 accessed memory sections each have a separate data path connecting these memory sections to the requesting device. Two words are transferred from each accessed memory section during a 2-clock cycle access time slot. When a device requests words 112 through 175, in this case, the memory access controller applies the 17 most significant bits of the 24-bit address to Group 3. It adds 1 to the 17-bit address and applies it to Groups 0 and 1. Bits 1 through 6 of the 24-bit address are decoded by the memory access controller to activate only memory sections 8 through 15 of Group 3 onto the interface, for activating memory sections 0 through 15 of Group 0 onto the second data path and to activate Sections 0 through 7 of Group 1 onto the first data path. Again, the 32 accessed memory sections each have a separate data path connecting them to the requesting device.

Global Memory Timing

Figure 33:
FIG. 33 illustrates the access time slots in a typical global memory cycle.

The access timing of the global memory is illustrated in FIG. 33. This timing provides the data flow signal processor with multiple independent ports, providing contention-free data transfers between it and the external interface unit (EIU) and the arithmetic elements (AE).

Access to the global memory is time shared with each arithmetic element (AE) being assigned a dedicated memory access time slot during which it can access any 64 consecutive words in the global memory. The access time slot of each arithmetic element repeats once every 64 clock cycles. Any unassigned or unused memory access time slot becomes available for use by the external interface unit (EIU).

Figure 34:
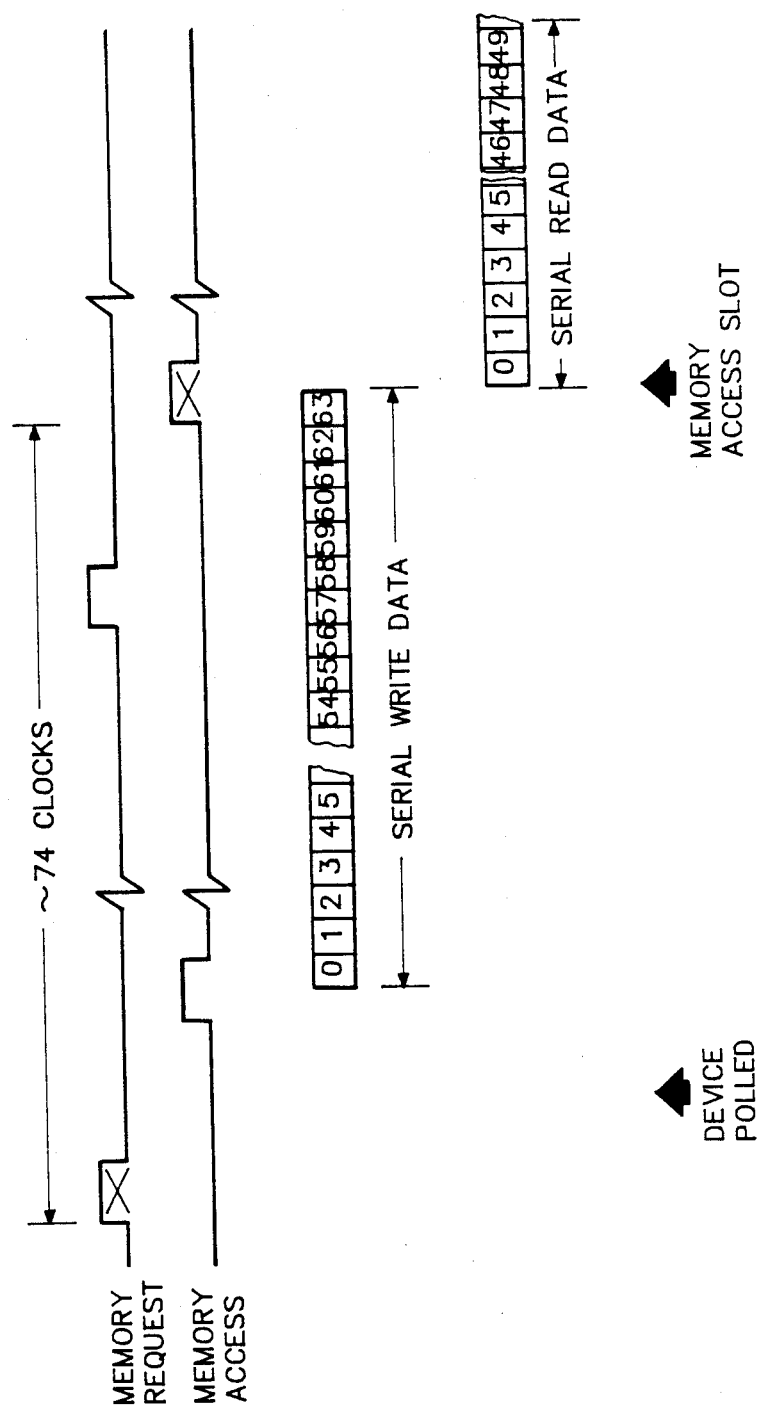
FIG. 34 illustrates global memory timing.

An arithmetic element's controller (an arithmetic processor (AP)) is polled approximately 74 clock cycles before each access time slot (see FIG. 34) to determine what action the arithmetic element is going to take, that is, whether it will be a read or a write operation or no operation. For a memory write operation, 64 or fewer words are serially clocked into the arithmetic element's time division multiplex registers (TDMB) from the arithmetic element's word store during the 64 clock cycles preceding the memory access time slot, FIG. 35. For a memory read operation, 64 or fewer words are serially clocked out of the time division registers of the arithmetic element's work store during the 64 clock cycles following the access time slot.

The execution of a primitive by an arithmetic element, as seen in FIG. 35, involves reading data from the global memory into the work store of the arithmetic element, processing the data, and writing the processed data from the arithmetic element's work store into the global memory. The work store of the arithmetic element can load data from the global memory, while that same work store is also being used by the arithmetic element. The arithmetic element provides hardware synchronization at the start of each primitive execution to synchronize the arithmetic program to the global memory cycle (64 clock cycles). Usually, the processing interval of the arithmetic element requires more time than the time to read the global memory. The macro code program for the arithmetic elements is designed to access the global memory as rapidly as possible and uses the work store of each arithmetic element as a buffer to hold the data until it is required for processing. Thus, synchronization during execution does not become a problem. The data is written back into the global memory in a similar manner.

Memory Access Controller

Figure 36:
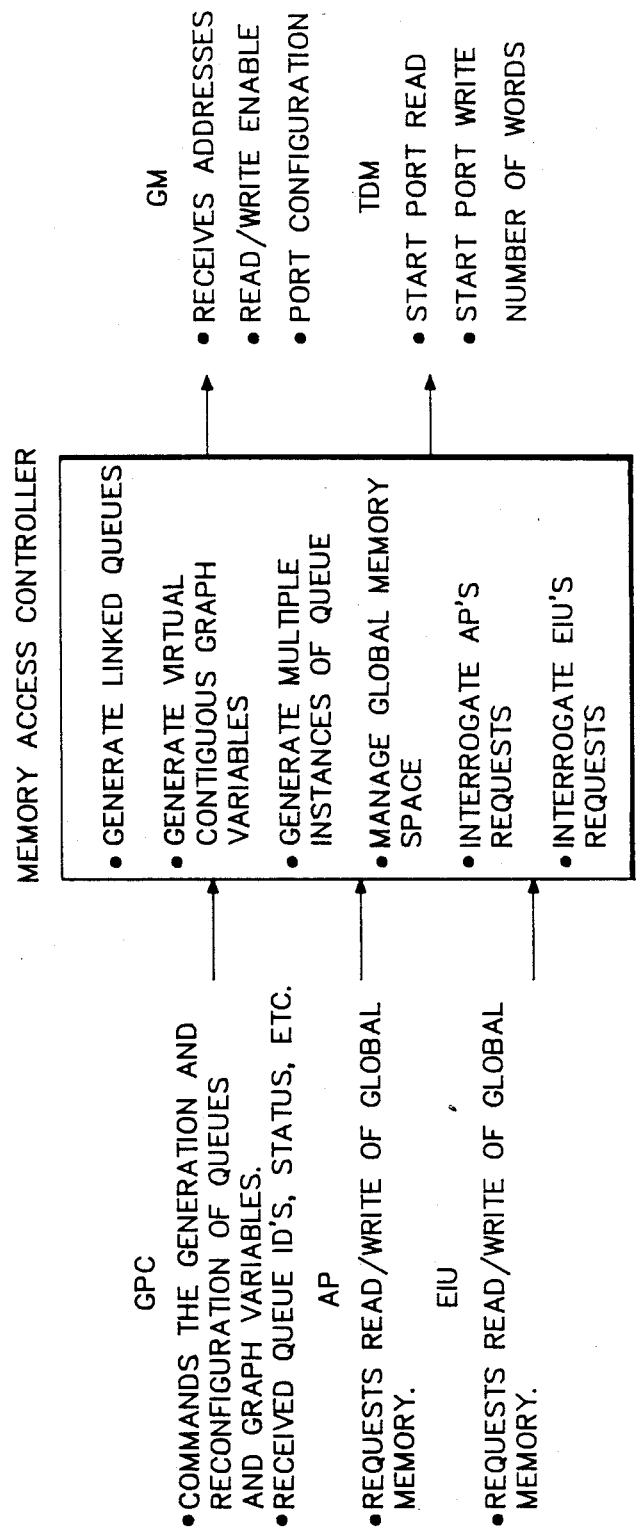
FIG. 36 presents the interfaces and functions of the memory access controller.

An overview of the memory access controller (MAC) is provided in connection with FIG. 36. The memory access controller manages the global memory (GM) configuration for the graph process controller (GPC) and the global memory (TDMB) and (TDMA) interfaces for the arithmetic processor and the external interface unit (EIU), respectively.

The memory access controller (MAC) provides the capability to manage the global memory (GM) and to interface the arithmetic processor (AP) and the external interface unit (EIU) with respect to the global memory. The memory management approach assembles the global memory into virtual contiguous blocks called "queues" and "graph variables" under the command of the graph process controller (GPC). The queues and the graph variables, once created, are made available to the arithmetic processor and the electronic interface unit as read/write blocks within the global memory.

The graph process controller (GPC) controls the queue and the graph variable allocations and deallocations as well as dimensions and attributes (in the case of queues). The memory access controller allows the assignment of multiple consume blocks to any queue in order to facilitate multiple node instances (the use of the same queue by more than one arithmetic processor or electronic interface unit). The graph process controller extends and reduces queues, as required, in order to make efficient use of the global memory.

Figure 37:
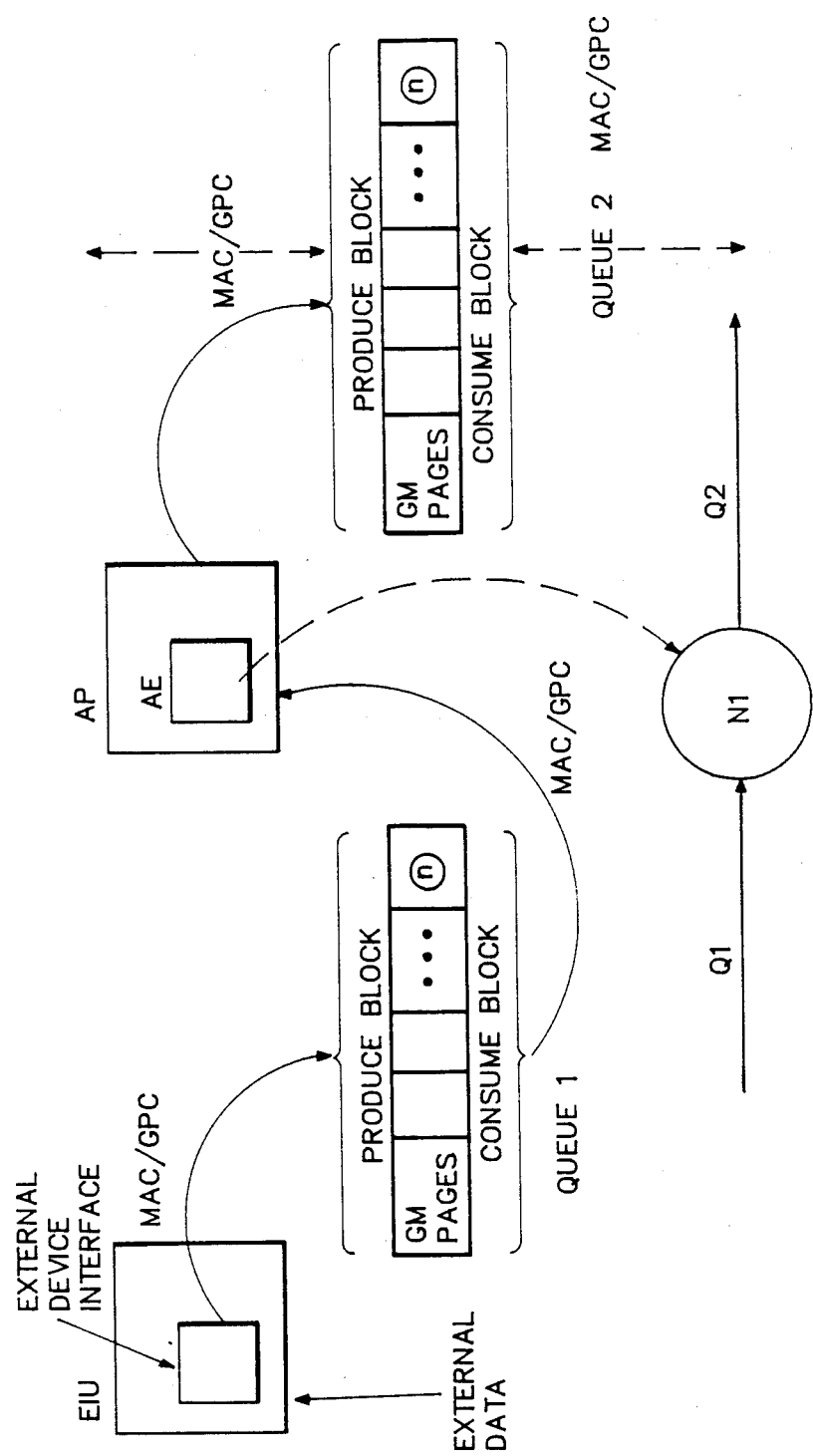
FIG. 37 illustrates the architectural elements and their relationship in a node execution function.

FIG. 37 illustrates the interconnection between the graph process controller (GPC), the arithmetic processors (AP), the external interface unit (EIU), and the global memory (GM) in the execution of a particular node instance. Initially, the graph process controller (GPC) commands the memory access controller (MAC) to create queues "one" and "two." In this example, the "external" data is being introduced and thus, the graph process controller (GPC) next informs the external interface unit (EIU) that QUEUE 1 is the "write" area for its data. The external interface unit inputs its data to the global memory under the control of the memory access controller interface circuitry. Specifically, the memory access controller creates a "produce" block 0 on QUEUE 1 and extends it dynamically only when data is about to be input from the external interface unit. Thus, memory commitment is optimized.

Once informed that the external interface unit data transfer is complete, the graph processor controller assigns node function N1 to an arithmetic element (AE) within the assigned arithmetic processor (AP). The graph process controller (GPC) then informs the arithmetic processor (AP) that the data to be operated upon is in QUEUE 1 and the results of the operation are to be stored in QUEUE 2. Specifically, a consume block is defined over the QUEUE 1 data by the graph process controller via the memory access controller and a produce block is initiated upon QUEUE 2 as above. The graph process controller (GPC) may initiate multiple queue accesses upon QUEUE 1 at this point by creating additionally consume blocks or it may deallocate the associated global memory pages as they are read by the node N1 of an arithmetic element. When sufficient data has been processed by the node N1, the graph process controller (GPC) decommits the associated arithmetic element (AE). Two memory access controllers (MAC) operate in lock step so that if one fails, the other shall operate without loss of data.

Arithmetic Processor

Figure 38:
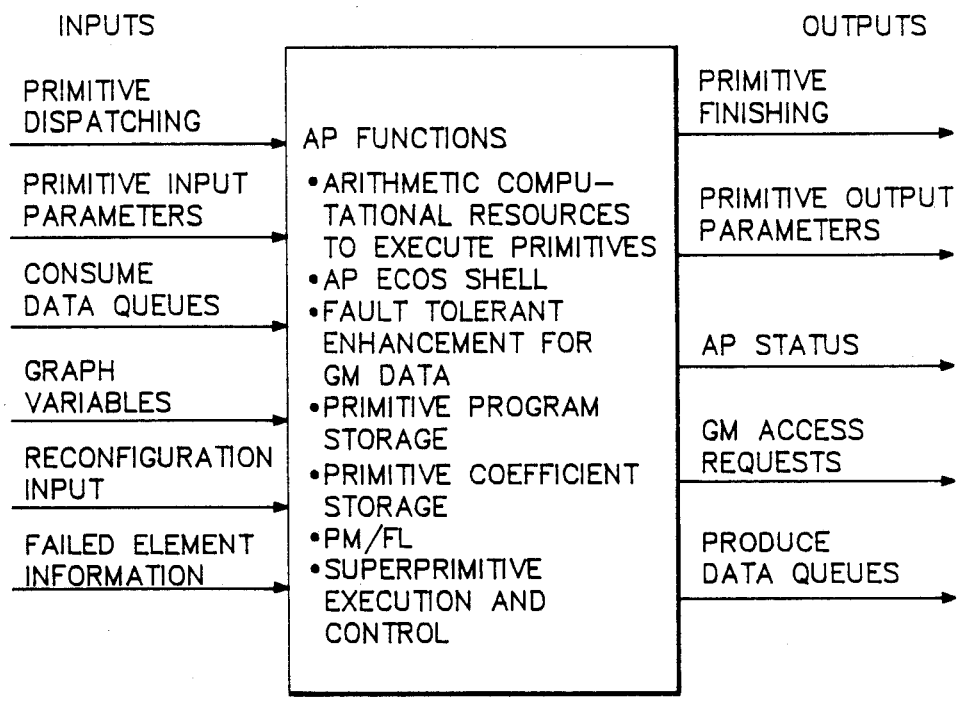
FIG. 38 is an input/output functional diagram of the arithmetic processor.
Figure 39:
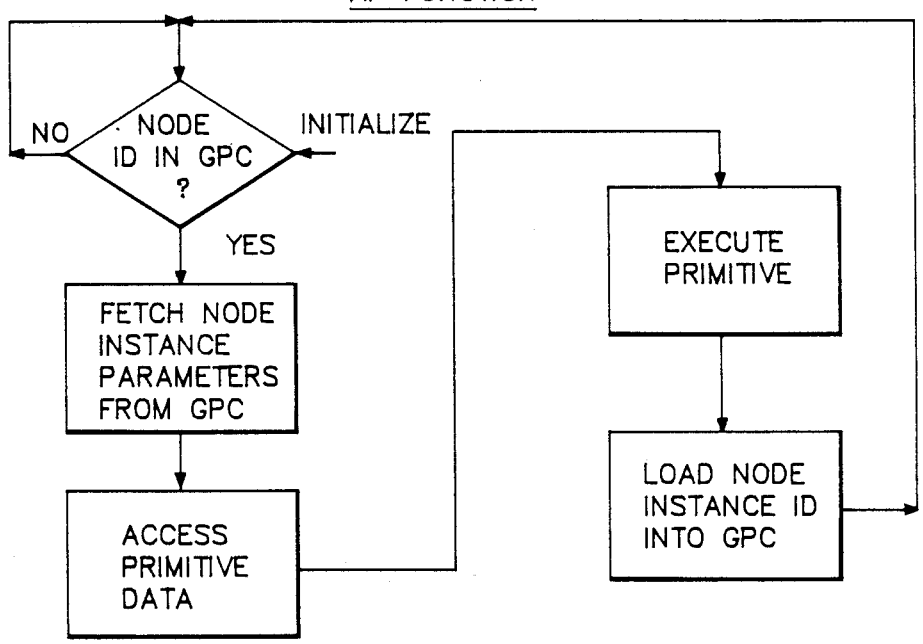
FIG. 39 illustrates the processing strategy of the arithmetic processor.

The arithmetic processor (AP) provides the data flow signal processor with the high speed computational capability to control and execute signal processing primitives asychronously with the graph control function, see FIGS. 38 and 39. It is a high speed computational device which controls and executes the signal processing primitives and superprimitives using either fixed or floating point arithmetic. Both floating and fixed point arithmetic is performed at the same rate. The arithmetic processor (AP) provides a 1:2 multiply to add ratio which can effectively be utilized by all benchmark primitives. The arithmetic processor (AP) is a microprogrammed device and employs pipelining and parallel processing techniques to optimize throughput. High performance is achieved by an efficient modular architecture. The arithmetic processor (AP) supports single instruction stream multiple data stream (SIMD) operations by providing the capability to execute the same processing algorithm on different data streams.

When configured for single instruction stream single data stream (SISD) operation, the arithmetic processor (AP) provides a capability of 12 MHz multiplies and 24 MHz adds. In the single instruction stream multiple data stream (SIMD) configuration, processing capabilities of 24 MHz multiplies and 48 MHz adds are achieved for each arithmetic processor (AP). If originally configured as single instruction stream multiple data stream (SIMD) and one arithmetic element (AE) fails, the arithmetic processor (AP) can still operate in a single instruction stream single data stream mode (SISD), with one arithmetic element (AE).

When data input/output hardware such as the external interface unit (EIU) is configured with the arithmetic processor (AP), then the arithmetic processor is capable of operating in a standalone mode to perform signal processing or general purpose computational tasks. Arithmetic processor functions, inputs and outputs are summarized in FIG. 38.

At the system level, the arithmetic processor (AP) is programmed via "calls" to microprogrammed signal processing or universal primitives. These primitives form the instruction set of the arithmetic processor (AP).

A data flow signal processor configuration may contain from one to thirty-two arithmetic processors. In a multiple arithmetic processor (AP) configuration, all arithmetic processors operate asynchronously with respect to each other. The dispatching of graph primitives or superprimitives to an available arithmetic processor (AP) is controlled by the graph process controller (GPC).

During operation, a primitive or superprimitive is dispatched to an arithmetic processor (AP) by the graph process controller (GPC) hardware. All available arithmetic processors poll the graph process controller (GPC) for the ID of node available for processing (see FIG. 39). When an ID is found that matches the arithmetic processor type (SISD, SIMD, special processor), the arithmetic processor (AP) fetches the node instance parameters which identify the processing characteristics of the primitive or superprimitive which underlies the graph node to be processed. The parameters also identify the data queues by the primitive.

The arithmetic processor (AP) accesses these data queues in global memory (GM) and transfers input data to data memory within the arithmetic processor (AP). At this point, the primitive or superprimitive is executed and controlled entirely by the arithmetic processor (AP) itself. Upon completion, the arithmetic processor (AP) flags the graph process controller (GPC) with the ID of the complete node and the process repeats itself.

Arithmetic processor memories utilize error detection and correction logic to provide single bit error correction and multiple bit error detection for enhanced reliability. Fault localization within the arithmetic processor (AP) is facilitated by the existence of multiple data and control paths by which to isolate faults.

Signal processing primitives are executed in the arithmetic processor (AP). Control of primitive processing is provided by an arithmetic element controller (AEC) and up to two arithmetic elements (AE) will provide the computational capability. To achieve the high speed processing required by signal processing applications, the basic tasks performed by the arithmetic processor (AP) shall be divided into distinct pipelined components which are executed in parallel. These components are:

(1) Generate addresses of data accessed in global memory (GM), graph process controller (GPC) memory, and arithmetic processor (AP) internal data memories. Provide the primitive microcode control and logical decision logic for conditional and nonconditional branching.

(2) Perform the arithmetic and logical operations of the primitive on the data queues.

Figure 40:
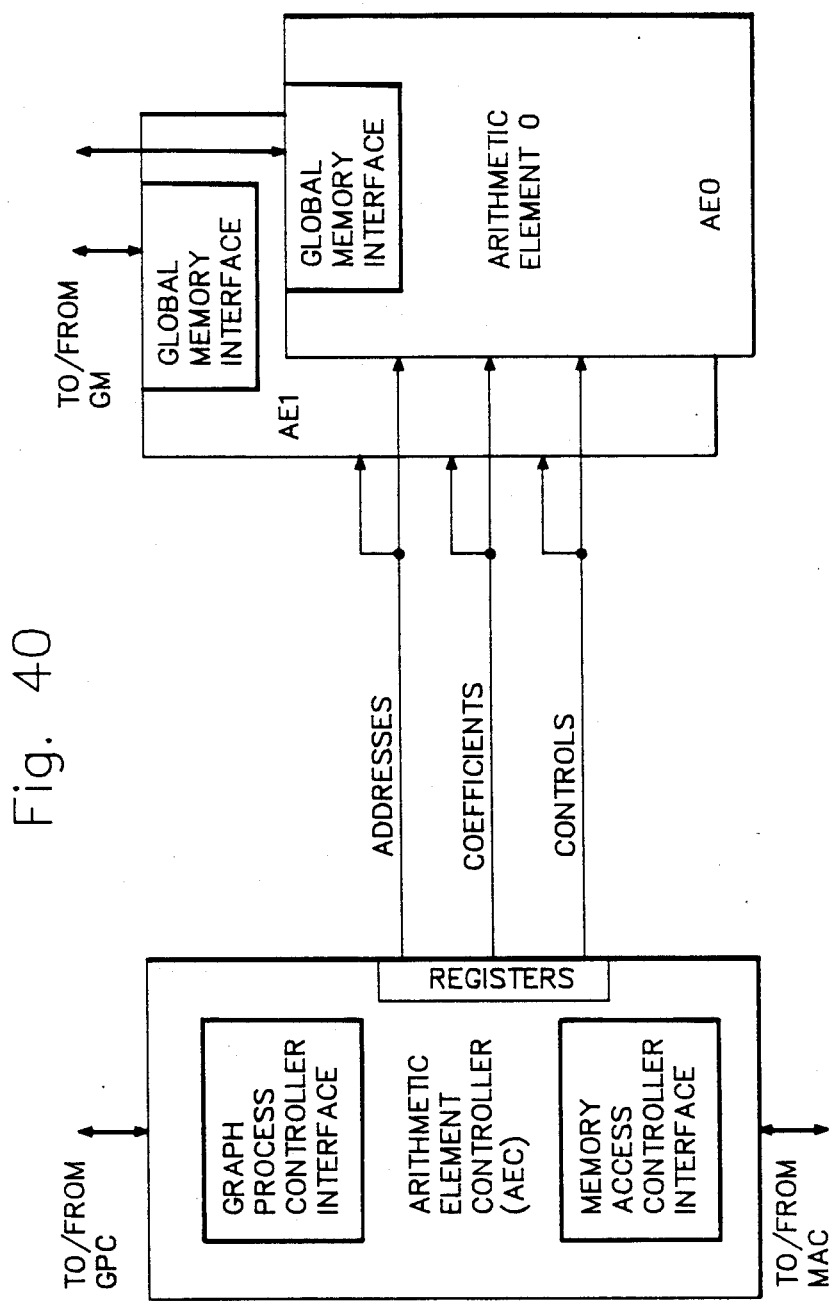
FIG. 40 is a functional element interconnection diagram of an arithmetic processor.

The arithmetic processor functional elements and their interconnection are shown in FIG. 40. By dividing the basic processor into these independent parts, the operations of address generation and primitive microcode control proceed in parallel with arithmetic operations performed on actual data. Each of these parts is pipelined to maximize the overall throughput rate. Delays are inserted between address generation and arithmetic calculation so that the interface between the two components given above becomes pipelined as well to maximize arithmetic processor throughout.

The single-instruction stream multiple-data stream architecture of the arithmetic processor (AP) is implemented in a modular fashion which allows it to be configured to match the requirement of a specific system. As shown in FIG. 40, the two functional elements of the arithmetic processor (AP) are the arithmetic element controller (AEC) and the arithmetic element (AE). The arithmetic element controller (AEC) and the arithmetic element (AE) respectively perform the tasks given in (1) and (2) above.

High arithmetic processor performance is achieved by an efficient modular architecture which supports multiple arithmetic elements (AE). When a configuration includes more than one arithmetic element (AE), the arithmetic processor (AP) becomes a parallel processor and executes the same processing algorithm in each arithmetic element (AE) but on different input data.

The arithmetic processor (AP) comprises 1 or 2 arithmetic elements (AE) which perform identical functions under control on one arithmetic element controller (AEC). Because the arithmetic elements (AE) operate in parallel on different streams of data, the arithmetic element controller (AEC) can be shared by the arithmetic elements (AE) (as opposed to each arithmetic element (AE) requiring a separate arithmetic element controller (AEC)), thus minimizing hardware.

The global memory access scheme allows data input and output to the primitive arithmetic processor (AP) processing. This parallel processing approach provides high throughput while allowing use of simple software control mechanisms.

The arithmetic element controller (AEC) is a microprogrammed machine that performs the addressing and signal processing primitive control functions. The arithmetic element controller (AEC) controls the arithmetic element operations, supplies primitive coefficients to the arithmetic elements, controls the addressing to global memory (GM) via the memory access controller (MAC), to graph process controller memory and queues via the graph process controller (GPC) interface, as well as to the internal arithmetic element controller and arithmetic element memories. Access to the global memory (GM) is handled directly by the arithmetic element (AE) via the global memory interface.

The arithmetic element (AE) provides the computational capability of the arithmetic processor (AP). It is capable of processing data in user selectable fixed or floating point word consisting of a 16-bit significant and a 6-bit characteristic for a 385 dB dynamic range. Floating point processing in a packed format consisting of an 8-bit significant and 3-bit characteristic is also available for selection by the user. Fixed point arithmetic is available using 16 or 11-bit word sizes. User selectable primitive parameters determine the arithmetic operating mode.

The arithmetic element (AE) provides a ratio of 1 multiply to 2 adds (or logical operations). Each multiply and add operate at a 6 MHz rate. Each arithmetic element (AE) provides the capability to perform 2 multiplies and 4 adds/logical operations. The arithmetic element (AE) is configured such that it can operate on two separate data streams, each one processing both in phase (I) and quadrature (Q) data using 1 multiply and 2 adds per channel, or the primitive can configure the multiplier add/logical operation paths to operate on one channel of data.

The arithmetic processor (AP) is programmed at the system level by calls to the arithmetic processor (AP) primitives. These primitives are defined below. Primitives are microprogrammed standalone table driven subroutines. The application user using primitive parameters defines the operational characteristics of these primitives. Primitive execution and usage is also described below.

The arithmetic processor (AP) has the ability to internally control and execute superprimitives. This highly important feature of the arithmetic processor (AP) is described under the heading "Execution and Control of Superprimitives" below.

Execution and Control of Primitives

Signal processing nodes are dispatched by the graph process controller (GPC) to the arithmetic processor (AP) for execution. This effective separation of function helps minimize primitive execution overhead timing.

Data flow signal processing primitives are short, relocatable micro-coded programs resident in the arithmetic processor's program memory (PM). The execution of a particular primitive node is initiated by the graph process controller (GPC). Each primitive performs a general purpose signal processing function (e.g., "vector add", FFT, FIR, etc.), but is tailored for a specific application by a table of parameters (that is, parameter values) resident in the arithmetic processor (AP) control store memory (CS). The concept of table-driven primitives has several advantages:

Since it is usually the parameters in an algorithm (as opposed to the algorithm itself) that forces a security classification on a program, the primitive can be generated in a nonsecure environment.

Since all parameters are kept outside the primitives microcode, a library of general purpose primitives can be established which will have a wide variety of applications.

Since the parameter table is separate from the primitives microcode, the characteristics of the primitive can be dynamically altered in real time by simply modifying one or more of the parameters.

The arithmetic processor macro data flow control shell kernel performs the following tasks for each primitive node (see FIG. 41).

The graph process controller (GPC) ready queue is polled to determine the identity of the next node to be procurred by this arithmetic processor (AP).

Parameters from the node-instance descriptor block are transferred from graph process controller (GPC) memory to the arithmetic process or control store memory (CS) on command from the graph process controller (GPC).

The primitive's global memory-to-word store (GM-to-WS) memory access list (MAL) is passed to the memory access controller (MAC) interface controller.

The primitive's control parameters are loaded into the registers of the arithmetic element controller (AEC) (FIG. 40) from the parameters located in the control store (CS).

The arithmetic processor (AP) starts execution of the primitive and, if necessary, of the global memory, word store, memory access list (GM WS MAL).

After primitive execution is complete, the shell notifies the graph process controller (GPC) and polls the ready queue of the graph process controller (GPC) for the identity of the next node to be executed.

The characteristics of each node are defined by the node descriptor blocks in the graph process controller (GPC) as it controls the execution of the graph. Some characteristics are static; they are set by the programmer at compile time and do not change at any time during the graph execution. However, many characteristics are dynamic in that they change from node to node. A good example of dynamic characteristics are the absolute address of input/output global memory (GM) queues. Both static and dynamic characteristics are combined by the graph process controller (GPC) to form the node-instance descriptor block (see Table VII), which is stored in the graph process controller (GPC) memory. When the graph process controller (GPC) has a node-instance to process, it places the address of the node-instance descriptor block in the ready queue. The shell of an available arithmetic processor (AP) checks the ready queue and reads the address of the oldest node-instance descriptor block capable of being processed by the arithmetic processor (AP). Every block has the general format shown in Table VIII, so that primitives with variable parameter lengths can be handled by the executive. The appropriate data is then read from the graph process controller (GPC) memory into the arithmetic processor's control store (CS) memory by the arithmetic processor (AP). Once the data is in the control store (CS), it can be considered in three different parts: the memory access list (MAL), the queue descriptor blocks, and the primitive parameter table. The memory access list (MAL) is a sequential list of instructions to the memory access list interface controller that directs the flow of data between global memory (GM) and the (SPs) work store memory during primitive execution. One memory access list instruction is executed by the memory access controller (MAC) interface controller every 64 clocks. Memory access list (MAL) instructions operate in one of two modes, burst mode or interrupt mode. Burst mode initiates a global memory, word store (GM WS) transfer of "n" words with one instruction. This is useful in simple primitives when no arithmetic processor interaction is necessary. Burst mode execution is unconditional—once the instruction is reached, the controller is dedicated to completing the transfer for as many time division memory (TDM) slots as it needs. Interrupt mode initiates a global memory, word store (GM WS) transfer conditional on the state of an arithmetic processor flag controlled by the primitive's microcode. This is useful when the timing of the transfer depends on arithmetic processor processing results. The memory access list (MAL) can be set at compile time for each general purpose primitive because the queue descriptor block provides the necessary information (absolute address, produce, consume amounts, etc.) for each queue in a node-instance. The primitive parameter table and the queue descriptor blocks define the precise operating characteristics of the primitive during execution.

Once the parameters are loaded into the control store (CS), the next task of the shell is to pass the address of the memory access list (MAL) and the queue descriptor blocks to the memory access controller interface controller and initialize it prior to execution. This is accomplished by a program memory utility routine called by the shell.

The shell next loads the primitive parameter table and the appropriate data from the queue descriptor blocks into the arithmetic element controller (AEC) registers. This is accomplished by a program memory utility routine called by the shell.

Once the memory access controller (MAC) interface controller and the arithmetic element controller (AEC) registers are initialized, the shell calls the primitive microcode routine. The primitive then initiates the memory access controller (MAC) interface controller (if and when necessary) and performs its function until the consume amount has been processed. The primitive returns to the shell, which then notifies the graph process controller (GPC) that the node-instance processing is completed. The arithmetic processor (AP) shell then checks the graph process controller (GPC) ready queue and the process is repeated.

It is important to note that since the arithmetic processor (AP) shell is table driven, it can be easily programmed to perform repetitive or conditional primitive processing or superprimitive processing in a single node through the use of high order language (HOL).

TABLE VII

NODE-INSTANCE DESCRIPTOR BLOCK error-code
$NODE
$NEXT-NODE-INSTANCE
primitive-code
$CONTROL-VAR
input data queue ID
consume            ⎫ Repeat for
read               ⎬ each input
start-blk          ⎭ data queue.
start-offset
output data queue ID
produce            ⎫ Repeat for
start-blk          ⎬ each output
start-offset       ⎭ data queue.

Execution and Control of Superprimitives

Figure 42:
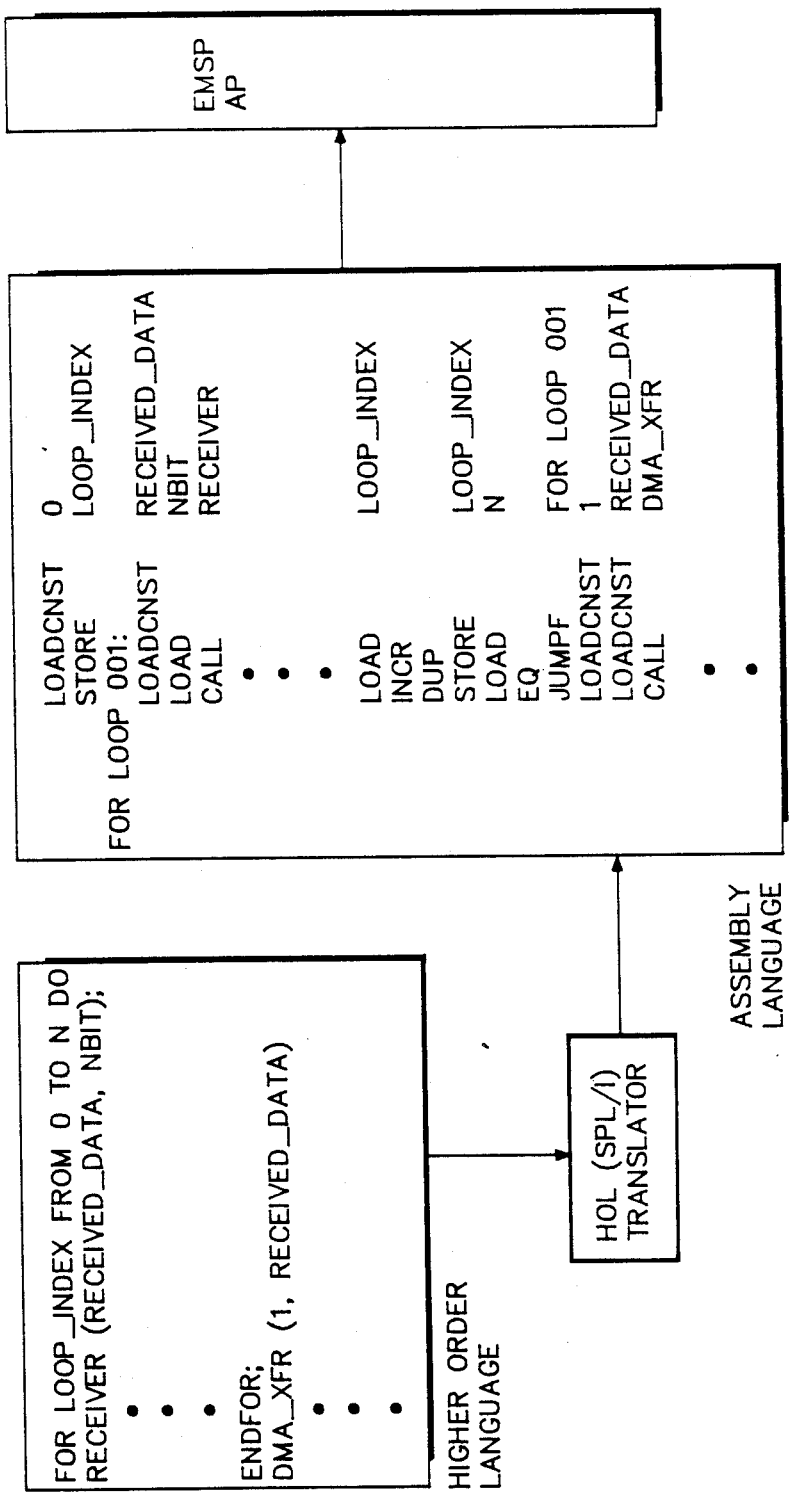
FIG. 42 illustrates the way in which superprimitives are generated;.

A superprimitive is a primitive processing string that is executed within the framework of its associated high order language (HOL) control structure in a single arithmetic processor (AP) without interaction from any other functional element class (see FIG. 42). The use of superprimitives brings three main advantages. First, the superprimitive reduces the node scheduler overhead, as the scheduler is only called once for the superprimitive call. Secondly, it eases the programmer's effort to describe the desired function in graph notation. Finally, the superprimitive reduces global memory usage and access while making efficient use of the arithmetic processor's work store memory (WS).

Superprimitives are structured to appear as single primitives in the parent graph. For example, in the adaptive beam form benchmark, the two contiguous nodes labeled "matrix transform" and "beamform" could be combined into one node incorporating both functions (see FIG. 43). The graph must only control the global memory (GM) input queue to the first node and the global memory output queue from the second node. For this example, there is one less node to schedule and one less queue to manage. In general, if N primitives are incorporated into one superprimitive, then there will be (N-1) nodes for the node scheduler to operate on. This significant reduction in scheduler overhead means higher overall throughput whenever superprimitives are used.

Figure 44:
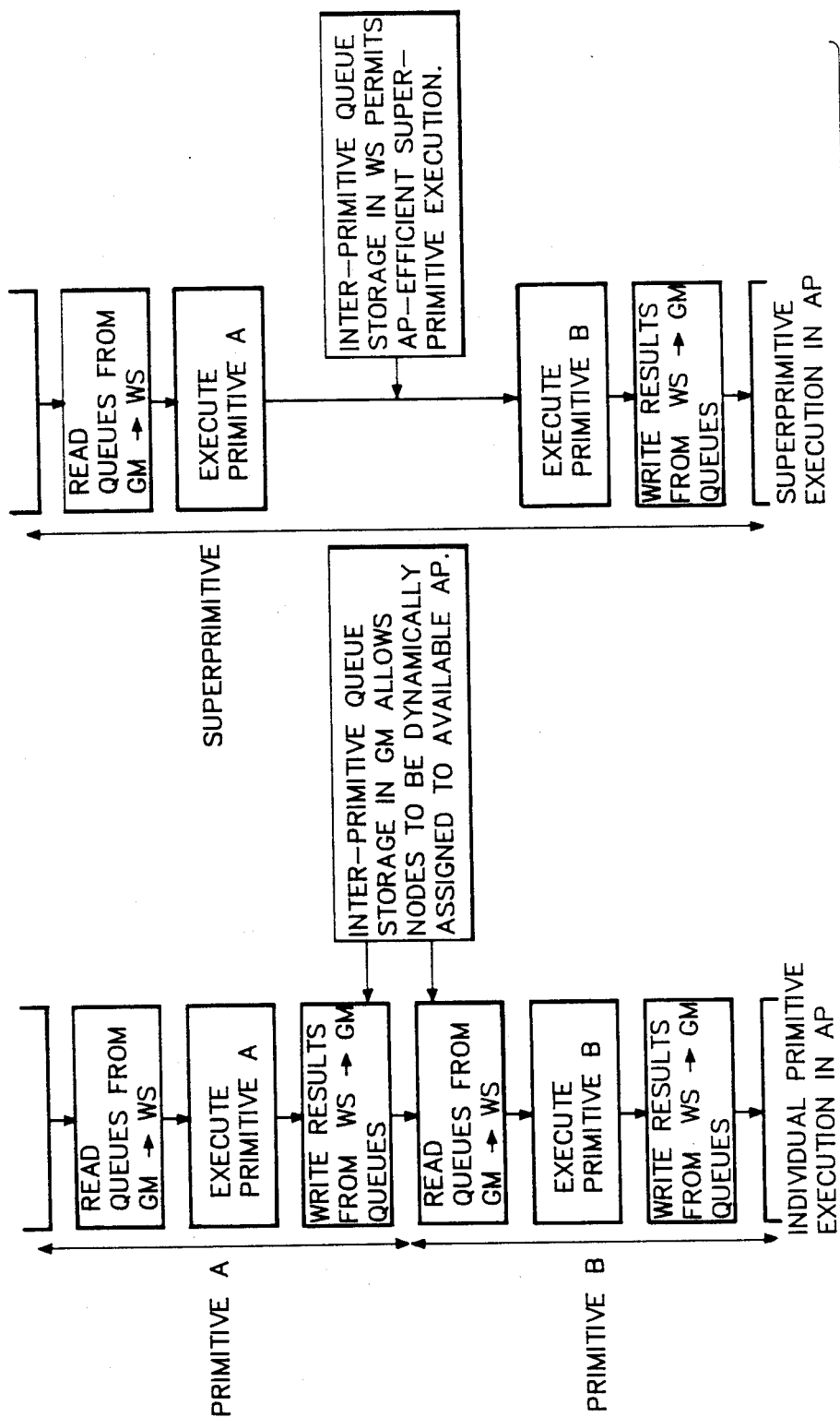
FIG. 44 compares a primitive with a superprimitive.
Figure 45:
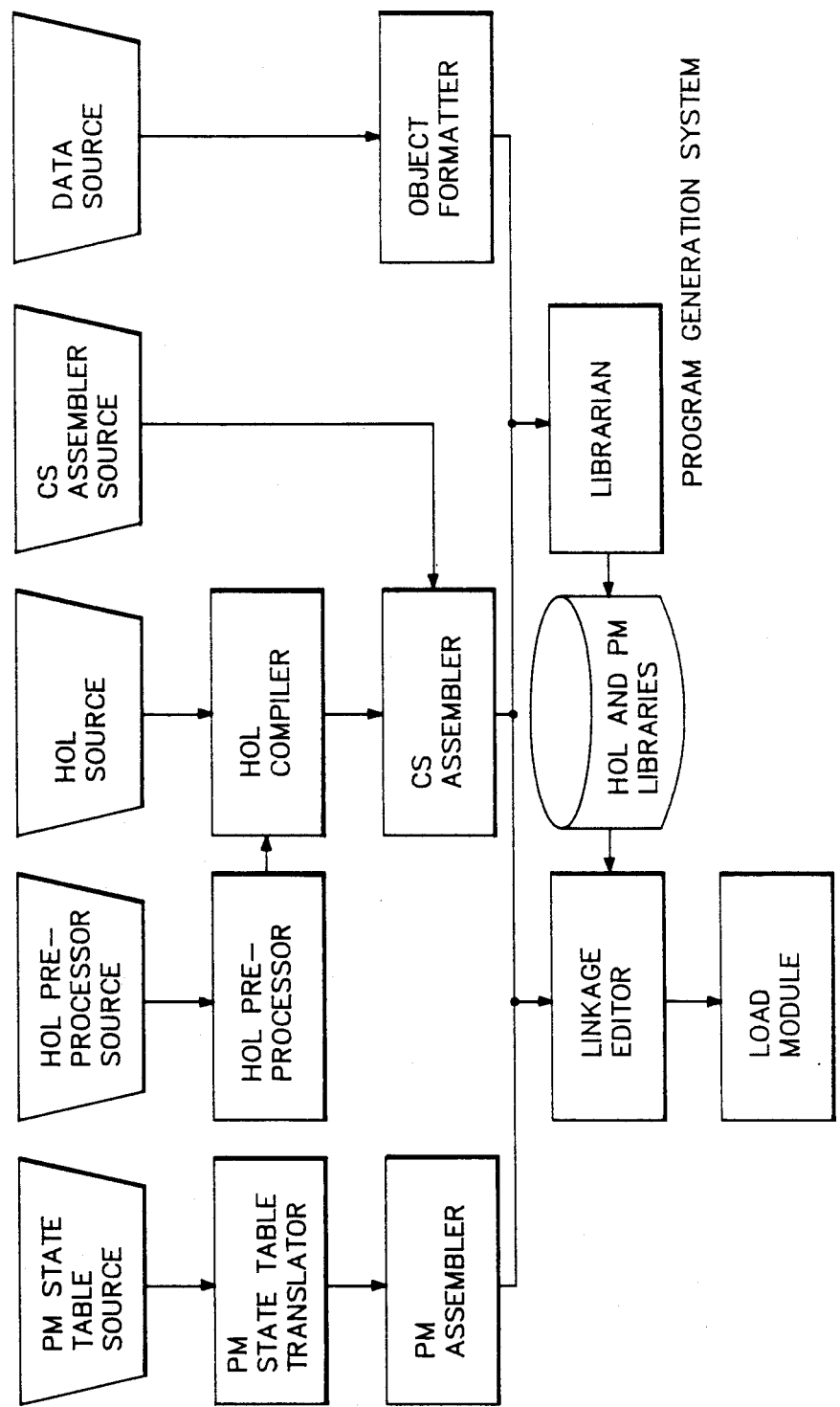
FIG. 45 illustrates the program generation system.

Another advantage to using superprimitives is the reduction in the amount of global memory used as well as the number of global memory accesses to and from the arithmetic processor (see FIG. 44). In a typical signal processing graph, the data queues are resident in the global memory. Each primitive must read its input queues from the global memory, process the data, and write to its output queues back in global memory. Hence, for each primitive that is dispatched by the graph process controller (GPC), two global memory accesses are required. Additionally, storage must be provided in the global memory (GM) for each of the primitives sink queues. While this allows the arithmetic processors to be scheduled to process queues asynchronously, the large number of global memory accesses may exact a time and global memory storage penalty in a heavy loaded scenario. When using superprimitives, internal superprimitive queue and storage control is performed by the arithmetic processor in which the superprimitive is executed. The superprimitive programmer ensures the integrity of interprimitive data contained in the internal arithmetic processor data memory using the arithmetic processor program generation system (PGS) (See FIG. 45) which provides comprehensive arithmetic processor high order language (AP HOL) superprimitive development, linking, debug, simulation and control tools to minimize the programmer's effort.

Figure 46:
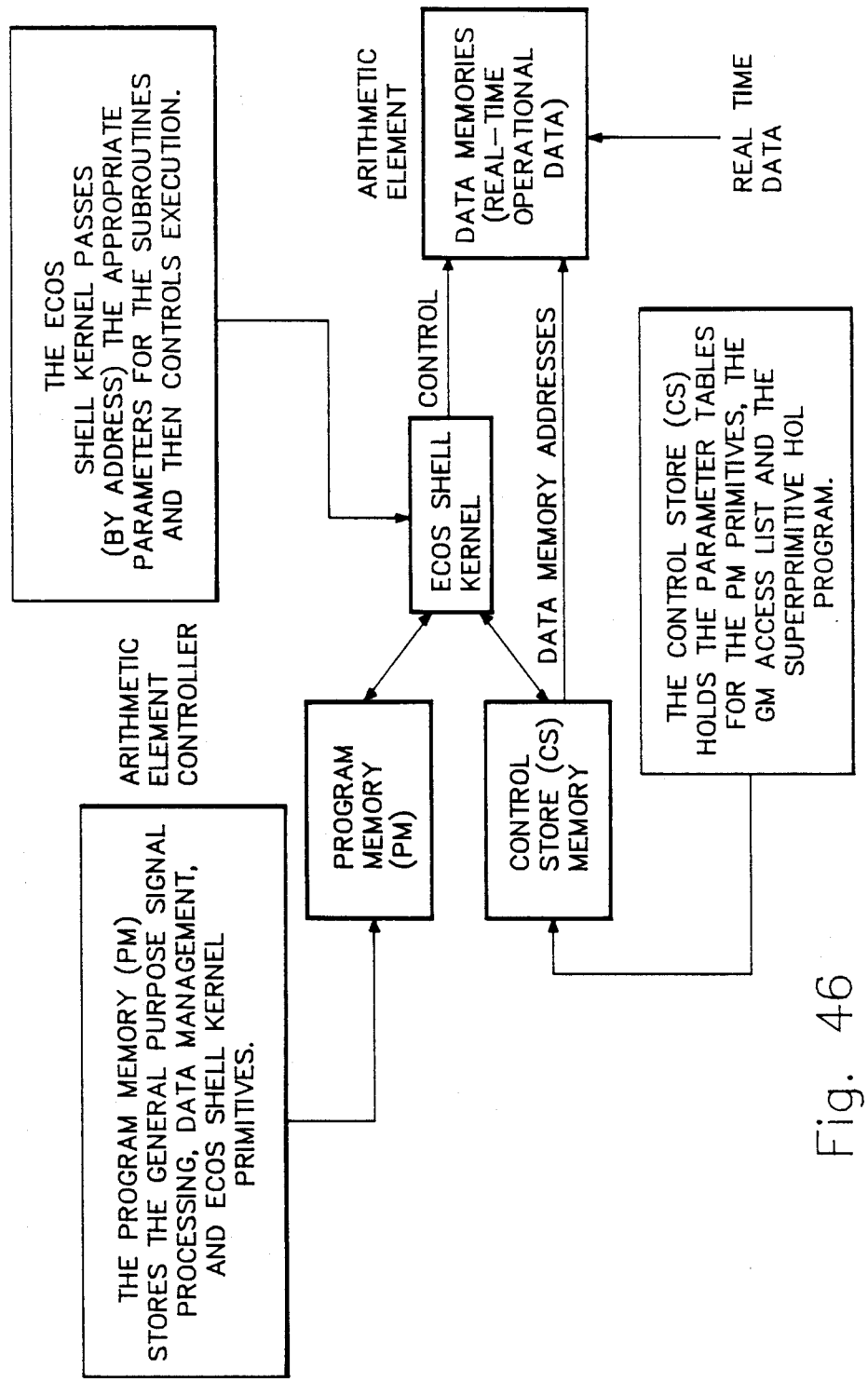
FIG. 46 illustrates the partitioning of software and features providing dynamic program control.

The operational software is partitioned into two distinct categories. (See FIG. 46.) Program memory primitives are short, relocatable, stand-alone programs, that implement individual application and data management algorithms. Control store (CS) programs are concerned with the execution sequence of the program memory primitives and define the signal processing superprimitive to be implemented. The macro data flow control shell kernel which resides in the program memory causes the execution of the program memory primitives which make up the superprimitive using the control store programs as tables defining the execution hierarchy.

Each application and data management primitive in the program memory is table driven, hence, I/O addresses for the data on which the application primitive is operating and other required parameters are included in a table of parameters associated with every call of the superprimitive. These tables are also defined in the control store program.

The high order language (HOL) used to generate control store programs references primitives in the program memory (PM) by their names. Since the program memory subroutines are all stand-alone programs (one program memory primitive may not call another program memory primitive directly), they become "OP codes", or instructions in the control store, high order language that references them (e.g., FFT, FIR7, etc.). Additionally, since the program memory primitives are relocatable within the program memory, these "OP code" references become position independent. This means that the control store, high order language is easily extendable with new OP codes since this entails only the addition of new program memory primitives.

The partitioned software concept thus allows the data flow signal processor to function much like a general-purpose computer, with a writeable control store.

In general, superprimitives reduce graph complexity and the number of global memory (GM) accesses (thus increasing throughput).

Overview of the External Interface Unit

Figure 47:
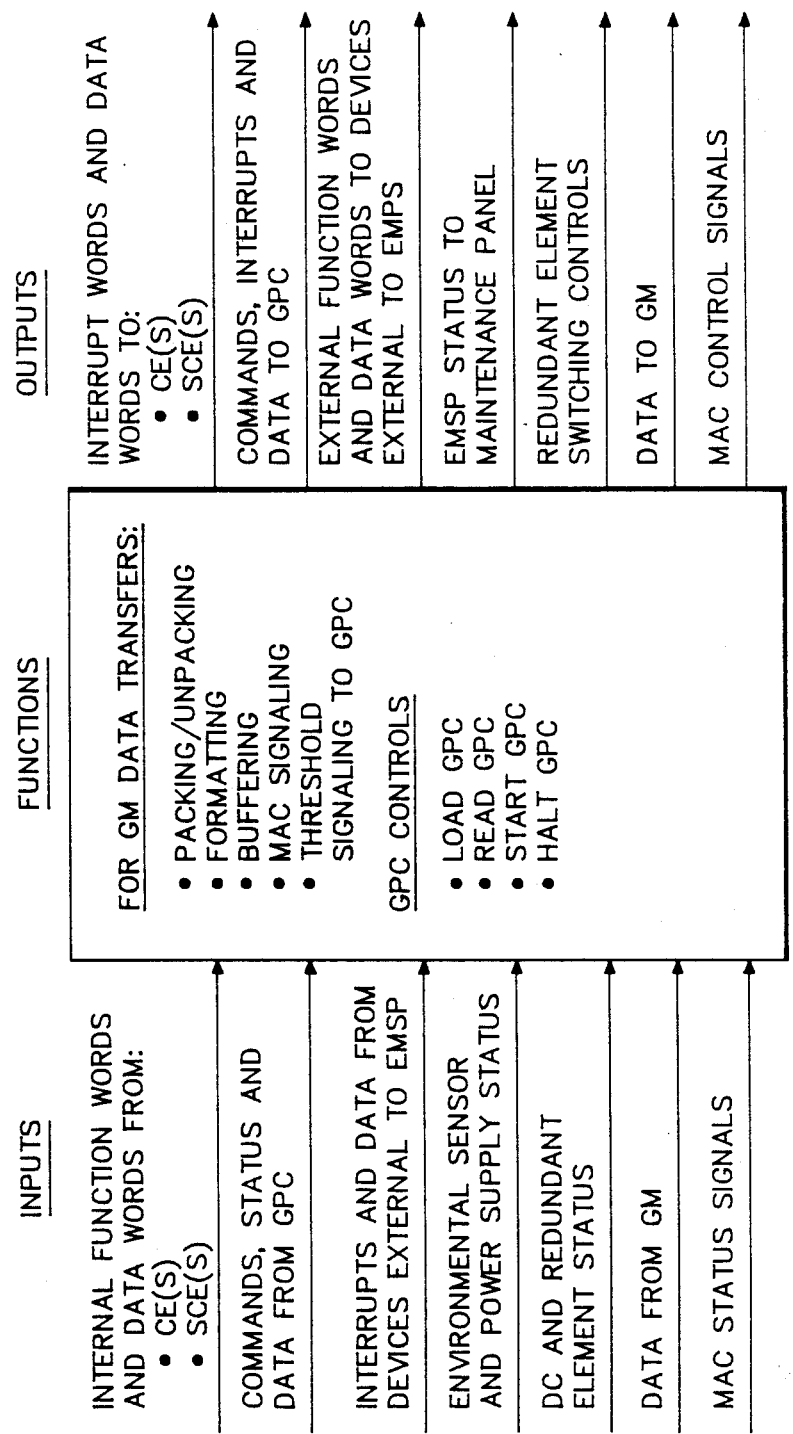
FIG. 47 provides a functional overview of the external interface unit (EIU)

The external interface unit (EIU) provides data buffering, packing and formatting for commands, status, and data transferred between the command elements (CE), the graph process controller (GPC), the global memory (GM), and devices external to the data flow signal processor. In addition, the external interface unit (EIU) provides sundry equipment control and status monitoring functions to assure the proper operation of the data flow signal processor. The external interface unit (EIU) is used to transfer data to and from global memory (GM), from the command element(s) (CE), the graph process controller (GPC), and devices external to the data flow signal processor independent of primitive execution. The external interface unit (EIU) also provides data packing and unpacking capabilities, data formatting, data buffering, and all the interactions with the memory access controller (MAC) necessary for the data transfers. The major functions of the external interface unit (EIU), and inputs and outputs are shown in FIG. 47.

The data packing, unpacking and formatting provides for the converting of data between the data formats and word size of external devices, and shall provide one of the four global memory word formats. The four global memory word formats are 16-bit fixed point, 22-bit floating point with a 6-bit exponent and a 16-bit mantisa, packed fixed point with two 11-bit fixed point numbers packed into a single 22-bit global memory word, and packed floating point with two 11-bit floating point numbers each with a 3-bit exponent and an 8-bit mantisa packed into a single 22-bit global memory word. This allows data to be stored in the global memory (GM) efficiently for data processing and to reduce the amount of global memory required for a particular application.

The data buffering and memory access controller interactions provide the following operations: temporary storage of data to prevent loss of data, efficient data transfer to be blocking for both the external device and for global memory, generation of the necessary address and control information for the memory access controller (MAC), and indications to the graph process controller (GPC) when a specified number of words have been transferred. This eliminates memory contention. This allows the external devices to transfer data asynchronously with respect to the rest of the data flow signal processor and independent of any other functional element class interaction.

Figure 49:
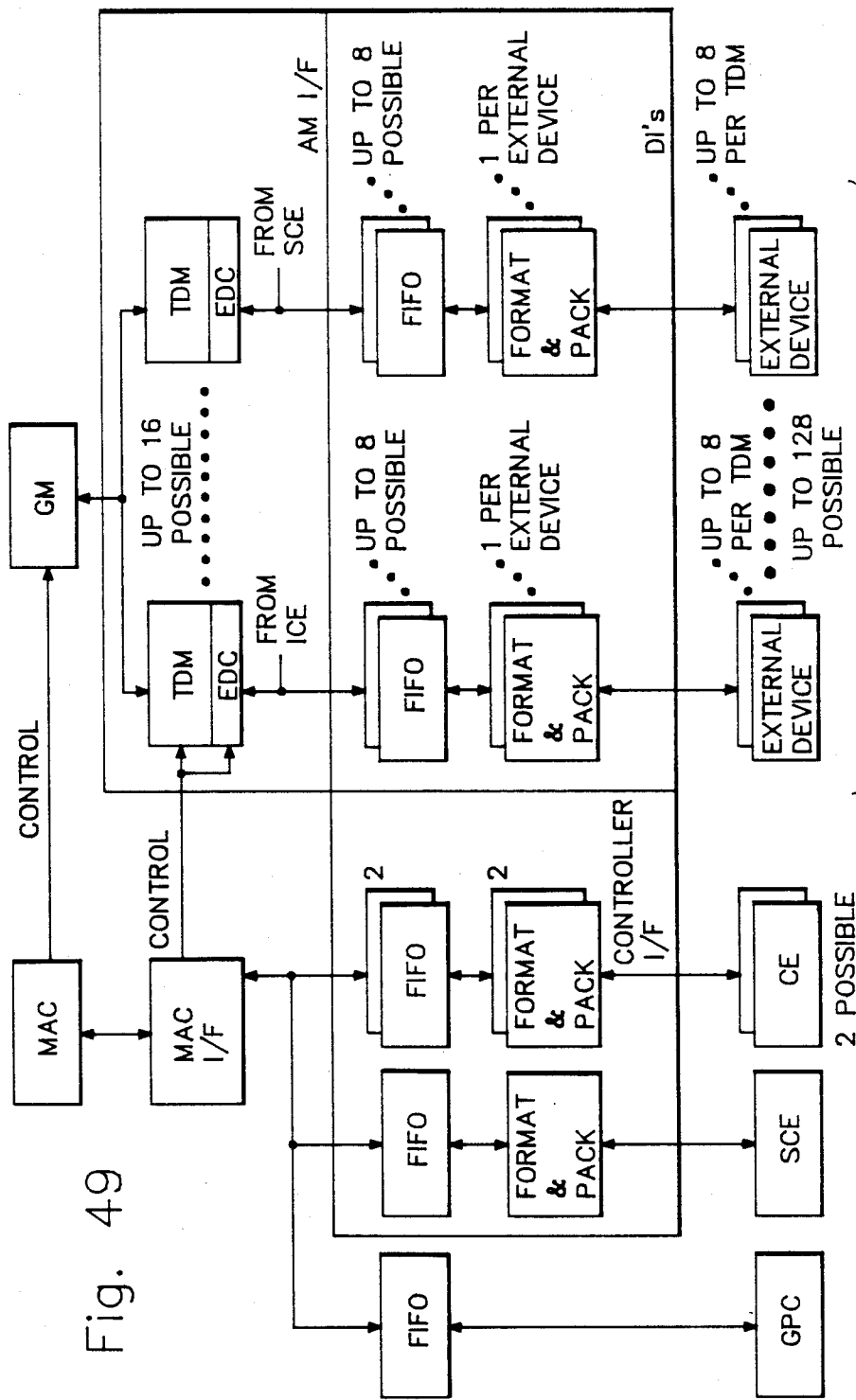
FIG. 49 shows the input/output channels of the external interface unit (EIU)

The external interface unit (EIU) also monitors environmental sensors with the data flow signal processor cabinet, controls redundant element operations within the data flow signal processor, and provides an interface for the command elements, the system command element(s) (SSCE) (FIG. 49), and the maintenance panel (MP) to monitor and control these functions. The system command element(s) (SCE) and the maintenance panel (MP) can also remotely operate the command element's corrective maintenance interface and boot controls.

Redundant element switching includes operations such as selecting which of the two memory access controllers is active, or selecting the operation of redundant elements in the global memory (GM). The central control of all redundant logic in the external interface unit (EIU) coordinates the applicable operations in all the functional element classes.

The functional elements within the external interface unit (EIU) are partitioned in a modular fashion with distributed control to provide a high degree of fault tolerance. Environmental sensor monitoring includes monitoring functions such as cabinet cold-plate temperature, cabinet coolant flow rate, cabinet flooding, and cabinet power supply status.

In addition, the external interface unit (EIU) controls and buffers the transfer of commands between the command elements (CE), the system command elements (SCE) and the graph process controller (GPC). For example: (1) the command element (CE) can download graphs and give commands to start and stop graphs all through the external interface unit interface; (2) the graph process controller (GPC) can signal the command element (CE) on the completion of an operation, an error condition, or to request service; (3) the system command element(s) (SCE) can take over the functions of the command element (CE), or send commands to the command element (CE) and graph process controller (GPC).

The external interface unit functional elements are partitioned in a modular fashion with distributed control to provide a high degree of fault tolerance, high data throughput and highly flexible configurations.

Figure 48:
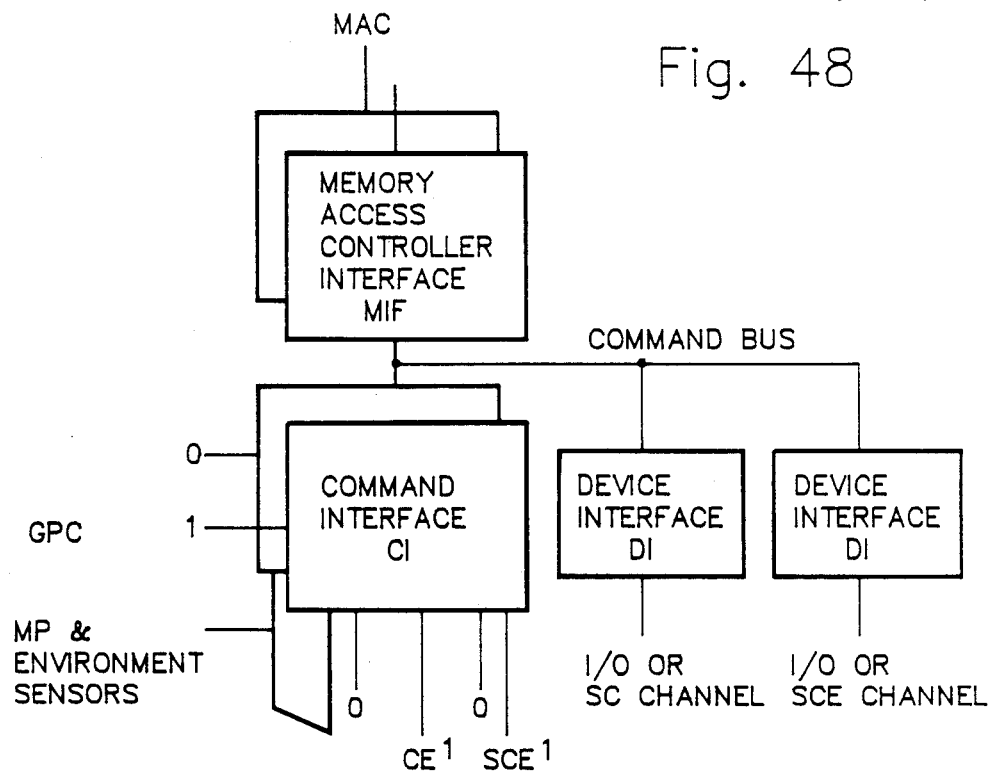
FIG. 48 shows the functional elements of the external interface unit (EIU)

There are three major functional elements within the external interface unit (EIU). Each of these three functional elements provides a specific capability to the external interface unit (EIU) (see FIG. 48). The capabilities of the external interface unit (EIU) can be increased by adding more of a particular functional element. For example, one functional element (the device interface) provides an interface for one external device. By adding several device interfaces, the external interface unit (EIU) can interface to several external devices. In addition, the control functions are distributed among the functional elements. This way, adding additional functional elements also adds the control functions necessary for that added capability. But more importantly, it permits the external interface unit (EIU) to tolerate any single fault since no single element controls all of the external interface unit (EIU).

The memory access controller interface (MIF) provides global memory (GM) address sequencing and access request handling for data transferred between the external interface unit (EIU) and the global memory (GM). It also signals the graph process controller (GPC) each time a specified number of words has been transferred to a global memory (GM) queue.

The command interface (CI) provides signal conversion, signal level protocol control, data packing and unpacking, data formatting, and data buffering for the interface between a command element (CE), a system command element (SCE) (see FIG. 149), the graph process controller (GPC), and the external interface unit (EIU). In addition, the command interface (CI) provides master clock generation and distribution, cabinet environmental sensor monitoring, error logging, fault detection/fault location (FD/FL) control and maintenance panel (MP) interfacing. Multiple command interfaces (CI) can be added to handle more than one command element (CE). There is a redundant command interface (CI) to provide all of the functions should there be a fault in the primary command interface (CI). In addition, for each interface to the command interface (CI), there is a redundant interface so the command interfaces can continue to operate properly should there be a fault in one of the interfaces to the command interface (CI).

The device interface (DI) provides signal conversion (i.e., signal level translation to/from TTL), signal level protocol control (example: handshake control), data packing and unpacking, data buffering and data formatting. Since the device interface (DI) provides signal conversion and signal level protocol, each type is configured for a specific type of I/O channel or signal conditioner channel. Multiple device interfaces can be added of handle up to a maximum of 128 external channels in any combination of I/O channel and/or signal conditioner channel types. However, the device interface (DI) can also be configured to interface to a sensor bus with a capability of handing 64 channels and bandwidth up to 48 million bytes per second. The device interface (DI) can also interface with a system data bus with 64 channels and bandwidth up to 48 million bytes.

The external interface unit (EIU) provides a high bandwidth interface for the transfer of data between the system command element (SCE), the command elements (CE), the graph process controller (GPC), the global memory (GM), and devices external to the data flow signal processor. The external interface unit (EIU) is designed to accommodate all standard input/output channel types and all signal conditioner channel types as well as a bus interface for sensors and for system elements (see FIG. 49). Note: Each bus can handle 64 channels with sufficient bandwidth to replace the 64 standard I/O and 64 signal conditioner channels to reduce the interface connections. External devices transfer/receive data asynchronously into the data flow signal processor. The incoming data is then formatted and packed and loaded into a first in/first out (FIFO) register. Since the data is formatted and packed within the external interface unit (EIU), the external devices can send the data in any form, i.e., bit serial or word serial. The handshake logic provides the capability of using a data input/output rate up to a maximum of 6 million words per second for an external device and up to 128 external devices. The formatting and packing of data is done in the device interface (DI) of the external interface unit (EIU). One device interface (DI) handles all the data transfers for one external channel (see the figure opposite).

Latency (the time interval between the arrival of data at the external interface unit (EIU) and its insertion into global memory) is determined by the priority of the data and by the data flow signal processor architecture.

The channels are assigned priorities to access global memory to resolve which channel gains access when two or more channels request use of global memory. The lower priority channel waits for access until the high priority channel has been granted access. Each channel has a first in/first out register (FIFO) (up to 4096 words) to prevent loss of data while it waits for access.

The data flow signal processor architecture time interval is composed of the time to receive from the external device the words to be transferred each access (note: typically 64 words are transferred each access, but this is selectable down to a minimum of 1 word per access), the time to load the 64 words to the time division multiplexed register (TDM), and the time to gain access to global memory.

The high transfer rate (up to 90 million words per second) between the external interface unit (EIU) devices and the multi-port global memory is achieved by transferring the data stream to a time division multiplexed register which converts the data stream to the multiport format (parallel words). All these words are then placed to global memory in one access. This time interval is approximately 11 seconds.

Global memory access is granted to the external interface unit (EIU) whenever the arithmetic element (AE) is not using global memory. This latency is usually small.

Typically, the latency introduced by the data flow signal processor architecture is less than 13 seconds, this is usually quite low compared to the following signal processing bandwidths.

Memory Access Controller Interface

The arithmetic processor memory access controller interface, when interrogated by the memory access controller, requests data queues by providing the address, the number of words, and the action (read or write). The memory access controller reports back to the arithmetic processor with the next memory page address allowing accesses with no loss in time. The graph process controller (GPC) sends to the arithmetic processor (AP) the physical addresses for all data queues required for processing an instance of a node in an available arithmetic processor (AP). For up to 16 million words of global memory (GM), this involves 24 address bits. It will also send the length of the queue available to the arithmetic processor (AP). The arithmetic processor will not access words beyond the specified length, which provide memory protection.

The arithmetic processor, when interrogated by the memory access controller (MAC), sends the current physical address and the number of words requested to the memory access controller. The memory access controller determines if the required word crosses a page boundary, and if it does, it will fetch the next page from the next page link memory. The memory access controller sends back to the arithmetic processor the updated page to be used for the next access of this queue.

Figure 50:
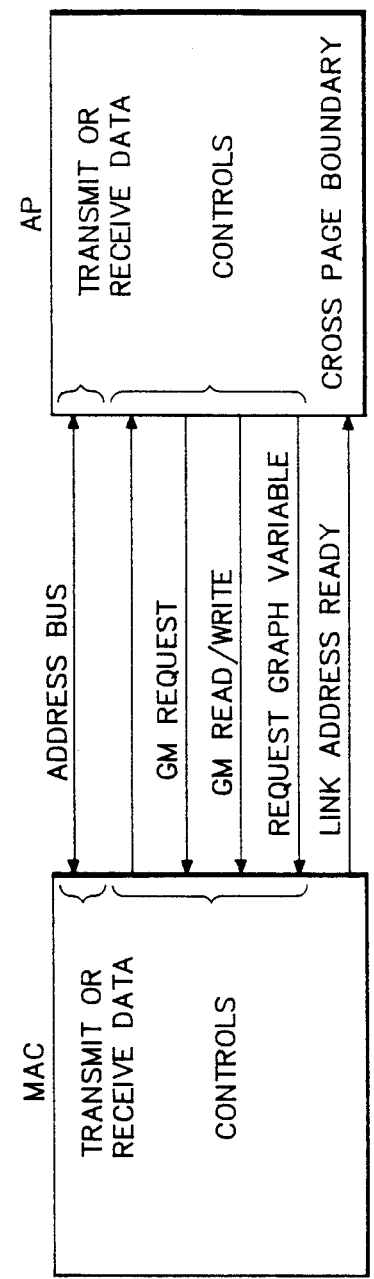
FIG. 50 shows the interface channels between the memory access controller (MAC) and the arithmetic processor (AP)

FIG. 50 shows the memory access controller interface function. A global memory request signal is used to indicate which arithmetic processor is to use global memory when its available time slot arrives, once every 64 clocks. At this time, the arithmetic processor signals whether to read or write in the memory, and places the first of two words on the address bus. The first word is the physical global memory address. On the second clock, the arithmetic processor places on the address bus the number of words requested during the access cycle. The sync word defines the 16 available access slots for the arithmetic processors.

The graph variable request is used in conjunction with a global memory request by an arithmetic processor to indicate if an arithmetic element (AE) is requesting a graph variable. The address for a graph variable is a symbolic rather than a physical address.

The link address ready is used by the memory access controller to indicate that the next page address is ready to be transferred to the arithmetic processor. When this page address is received by an arithmetic processor, it replaces its arithmetic element's memory pointer with the updated page.

Graph Process Controller Interface

The arithmetic processor asynchronously obtains commands for primitive/superprimitive execution from the graph process controller and asynchronously places finished node status in the graph processor controller to reduce overhead.

Figure 51:
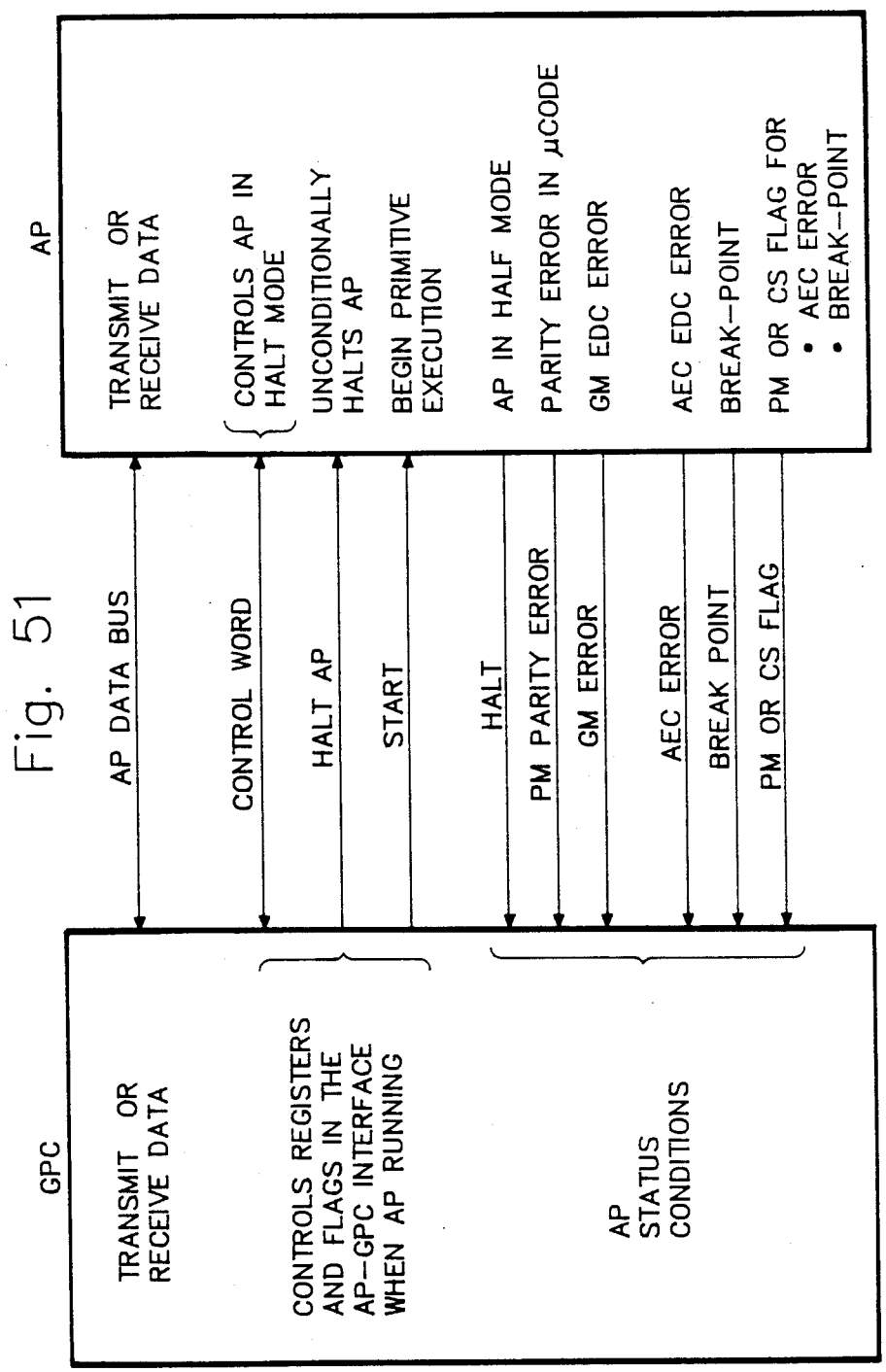
FIG. 51 shows the interface channels between the graph process controller (GPC) and the arithmetic processor (AP)

The graph process controller-arithmetic processor (GPC-AP) interface (shown in FIG. 51) provides data paths for the graph process controller to download the arithmetic processor memories, provides arithmetic processors with access to the graph process controller memory and with control paths for arithmetic processor access to the graph process controller node dispatch and to node finish processing. The graph process controller is able to control arithmetic processor execution via the "Control Word and Halt AP" signal, which allows the graph process controller to halt and start arithmetic processor program execution at a particular arithmetic processor program memory (PM) address. This capability is used during system start-up (to load arithmetic process memories) and PM/FL operations.

In the halt mode, the control word is enabled in the arithmetic processor direction to allow the graph process controller to access various counters, registers and memories within the arithmetic processor. Program memory (PM) and control store (CS) are loaded from and read to the graph process controller (GPC) using this control word. The control word is essential for arithmetic processor program development and test, as it allows new arithmetic processor primitives or superprimitives to be tested on arithmetic processor hardware. The control word is not recognized by the arithmetic processor when the arithmetic processor is executing. Rather, the control word is enables in the opposite direction to control the registers and the flags of the graph process controller's arithmetic processor interface and indicates to the graph process controller when arithmetic processor access to the graph process controller memory is desired. The "Halt AP" signal unconditionally halts the arithmetic processor whether the arithmetic processor is running or is halted. After a halt, the start signal is monitored by the arithmetic processor to start normal graph processing.

The arithmetic processor data bus is a bi-directional data link between the graph process controller (GPC) and the arithmetic processor (AP). The graph process controller transmits node instance parameters to the arithmetic processor along this path for arithmetic processor primitive execution. In addition, program memory (PM) microinstruction words, program memory (PM) access addresses, control store (CS) data words and control store (CS) access addresses can also be sent to the arithmetic processor using this bus. The graph process controller (GPC) uses the same bus to obtain program memory (PM) microinstruction words, control store data words, node finish controller data (NFC), graph process controller memory access addresses, and the contents of counters and registers within the arithmetic processor.

The graph process controller scheduler asynchronously monitors the activity of the arithmetic processor through an arithmetic processor status word. This status word consists of six arithmetic processor conditions: halt, program memory (PM) parity error, global memory (GM) error (detected and corrected), arithmetic element controller (AEC) error, break point, and program memory (PM) or control store (CS) flag which describes the type of arithmetic element controller error or break point. Halt tells the scheduler (SCH) that the arithmetic processor (AP) has finished the execution of a primitive and is free to process another primitive. Program memory (PM) parity error informs the graph process controller (GPC) of the occurrence of a parity error in a program memory microinstruction. Global memory error informs the graph process controller (GPC) of any corrected single errors type (hard or soft) and any detected dual bit failure, arithmetic element controller (AEC) error informs the graph process controller (GPC) of any corrected single errors type (hard or soft) and any detected dual bit, failure in either program memory (PM) or control store (CS). Breakpoint informs the graph process controller (GPC) that a previously entered program memory (PM) or control store (CS) breakpoint address has been reached. The status condition program memory (PM) or control store (CS) flag tells the graph process controller (GPC) whether the breakpoint reached is from the control store (CS) or the program memory (PM) or if the arithmetic element controller (AEC) error occurred in the program memory (PM) or the control store (CS).

Global Memory Interface

Figure 52:
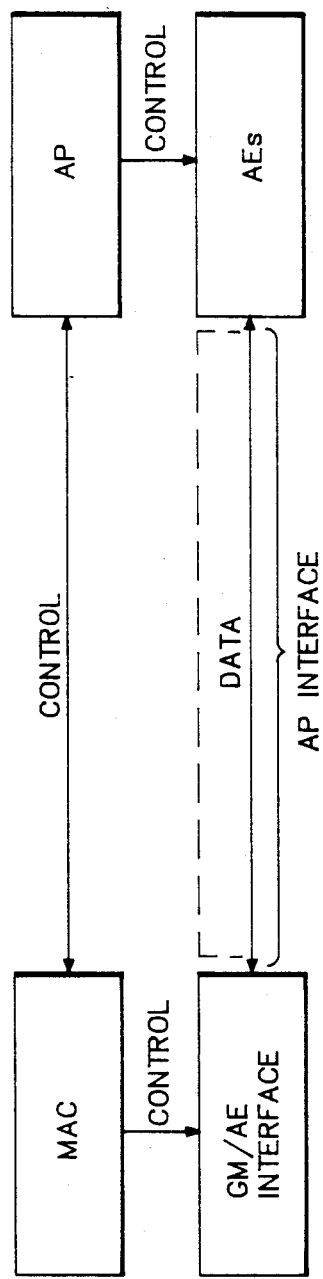
FIG. 52 is a functional diagram of an arithmetic processor interface.

The arithmetic processor interface provides a bi-directional data path between global memory and arithmetic elements. The interface easily connects multiple arithmetic elements with global memory to match the high global memory data throughput capability. The arithmetic processor interface provides the data path for each arithmetic element to global memory. All control signals used for global memory access are routed to the memory access controller. The arithmetic interface consists of three major parts: a set of time-division-multiplexed (TDM) registers, a set of bi-directional data buses between global memory ports and the time-division-multiplexed register files, and a set of bi-directional data buses between the arithmetic elements and the time-division-multiplexed register files (see FIG. 18). The interface allows the arithmetic processors uncontested access to global memory as well as the ability to simultaneously transfer data at their maximum data rate without bus contention (see FIG. 52).

Figure 53:
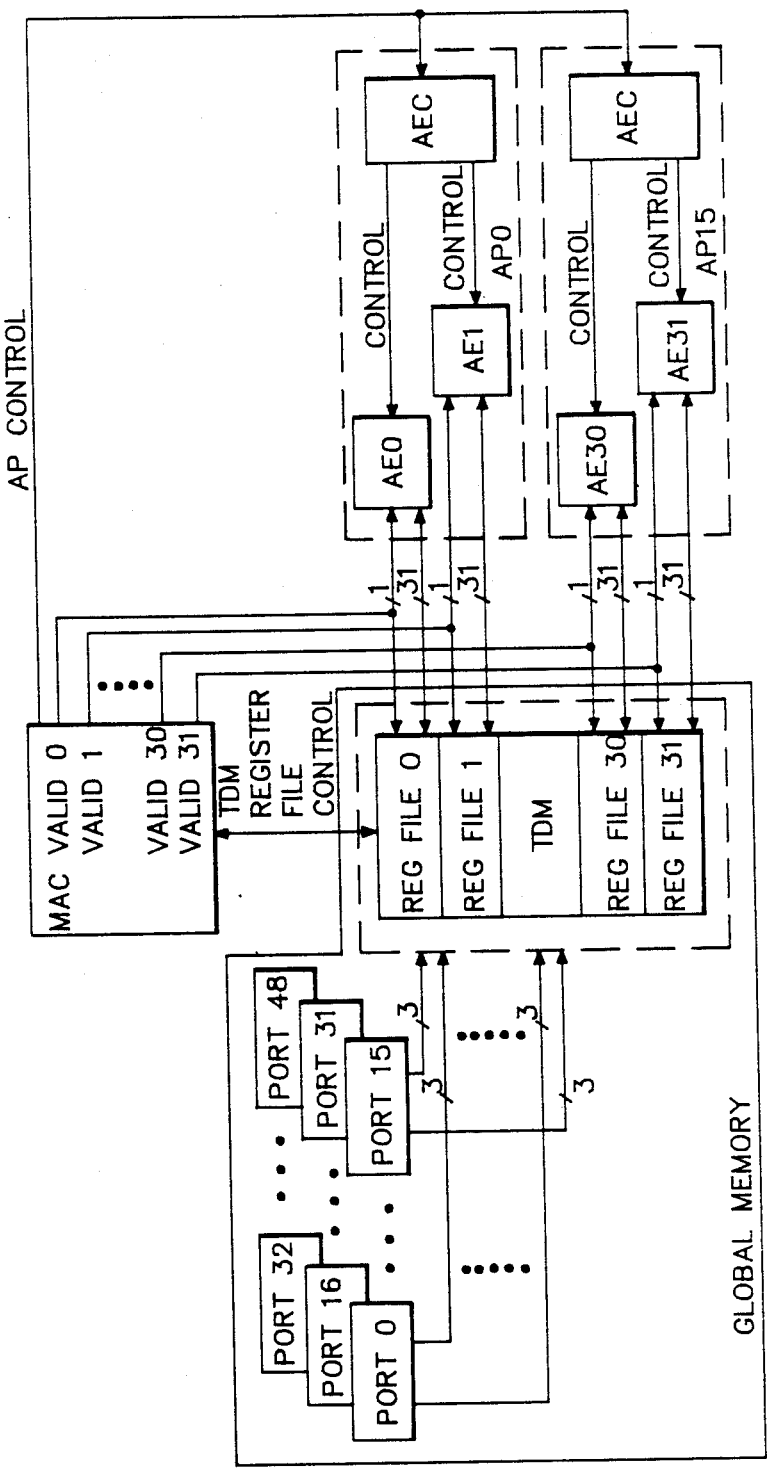
FIG. 53 shows a global memory-arithmetic processor interface.

Each global memory port is connected to the time-division-multiplex register files via two 31-bit bi-directional data buses (provided for enhanced reliability). During an arithmetic element global memory access slot, a group of global memory ports can parallel transfer or receive a data queue (one 31-bit word per port) along either of these buses (see FIG. 53).

The arithmetic elements are connected to the time-division-multiplexed register files via two 31-bit bi-directional data buses. The global memory data words are transferred word serially to or from the arithmetic elements. Since each arithmetic element has its own time-division-multiplexed register file and data bus, the pair of (provided for enhanced reliability) arithmetic elements transfer data at their internal clock rate without contending for global memory access or for data bus ues.

For reliability, the time-division-multiplexed register files are bit sliced into 31 1-bit slices. Twenty-two of the slices are used for the actual data word. Error detection circuits (EDC) add a 6-bit modified Hamming code and require 6 slices. The remaining 3 slices are used for redundancy. The purpose of these slices is to replace any failed bit slice from the 28 slices belonging to the 28-bit error detection circuit encoded data word.

The memory access controller (MAC) controls data transfers between the global memory (GM) and the arithmetic elements (AE). The time-division-multiplexed register files receive control signals directly from the memory access controller (MAC). The arithmetic element access to global memory is controlled indirectly from the memory access controller via control signals from the arithmetic processors. In addition, one control signal is shared between each time-division-multiplexed register file and arithmetic element. This signal originates directly from the memory access controller and it informs a time-division-multiplexed register, or an arithmetic element, that valid data exists on the bi-directional arithmetic element data bus.

The system flow diagram of FIG. 54 brings the individual functions together in a single illustration, which will help clarify the improved performance and the architecture organization of this data signal processor. This figure comprises four sections designated FIG. 54a illustrating the graph process controller function; FIG. 54b illustrating the arithmetic processor (AP) function; FIG. 54c illustrating the command element (CE) function; and FIG. 54d illustrating the graph process controller (GPC) input/output function.

In this data flow signal processor, programmability is defined so as to describe all logical formats necessary to understand the internal communications among programmable machine elements and to define the control structures necessary to understand the invocation of functions and the operations and interplay of these functions.

This provides a virtual data flow machine with functional hardware elements which insulate the user from many of the details of machine operation. To achieve this, the improved data flow signal processor comprises seven (7) functional element classes shown in FIG. 2. The machine, however, can be fully exercised by programming only three (3) of these elements. These elements are the command element (CE), the graph process controller (GPC) and the arithmetic processor (AP). The remaining functional elements are transparent to the user.

Figure 54D:
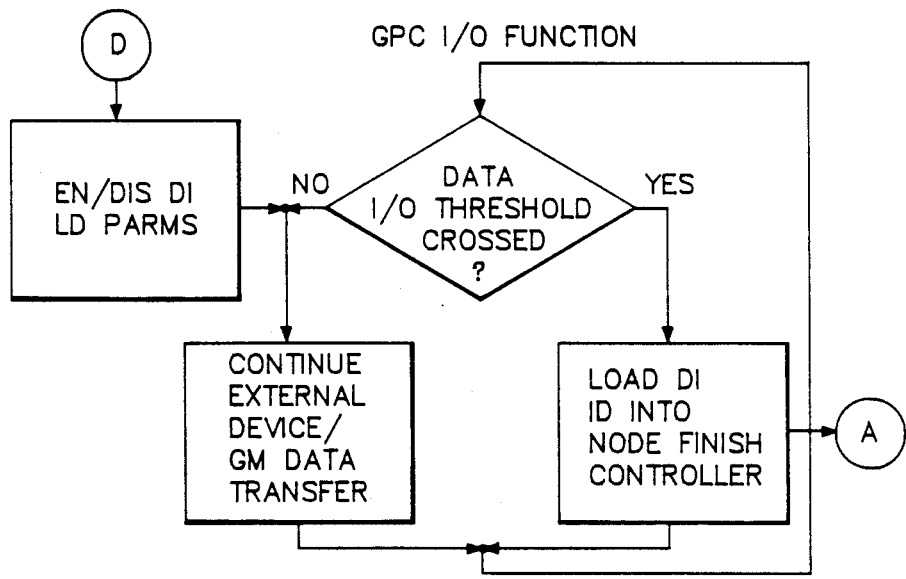
FIGS. 54a, b c and d depict the flow of programmable functions of the improved data flow signal processor.
Figure 54A:
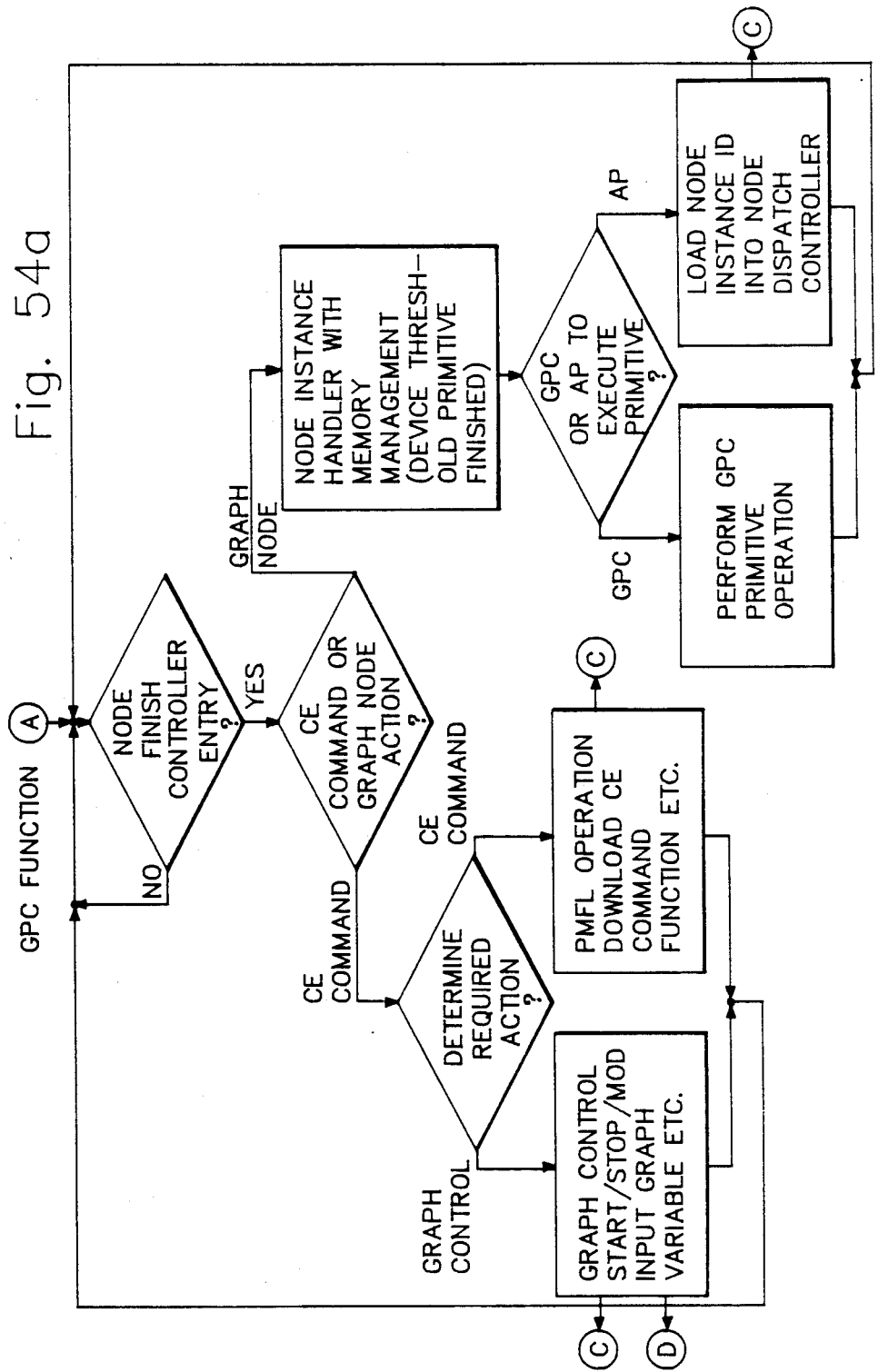
Figure 54C:
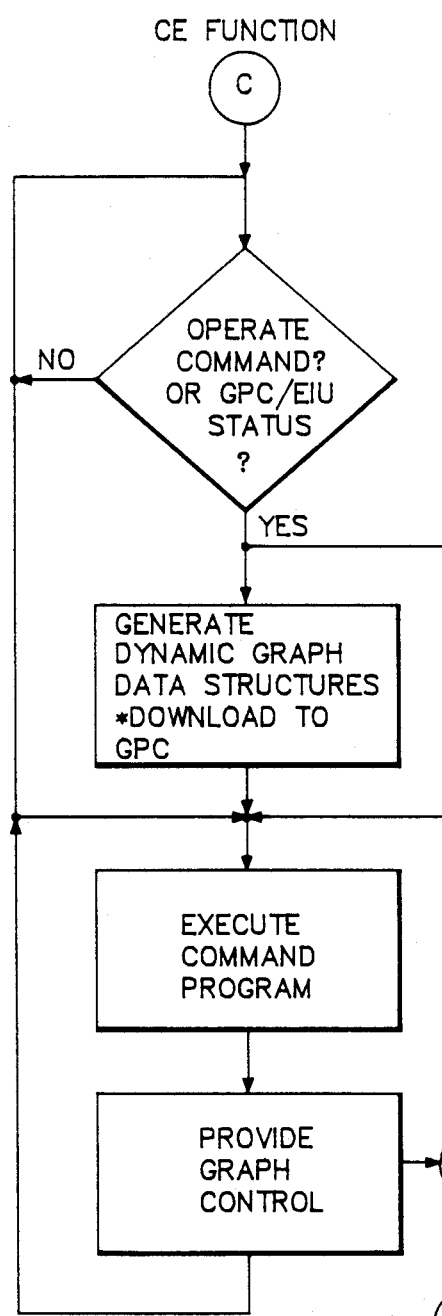
Figure 54B:
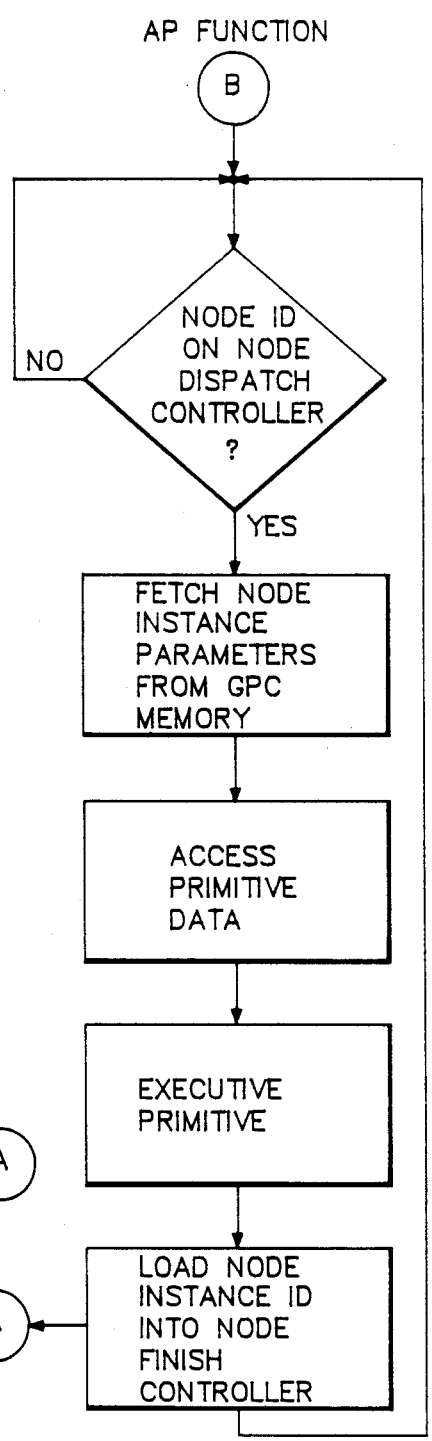

FIGS. 54a, b and c illustrate these three (3) independent programmable functions of the data flow signal processor. The macro data flow control shell software and associated support software use the graph data structures as data to effect graph control. These loosely coupled asynchronous operations are the key to macro data flow control efficiency.

All actions of the data flow signal processor are initiated via the command element (CE). Once the command element (CE) is initiated by the user and the macro data flow control graph data structures are downloaded to the graph process controller (GPC), the command element (CE) macro data flow control command program initiates the graph. Graph initialization is then performed in the graph process controller (GPC). This process includes the initialization of external device interfaces (EIU), initializing the memory access controller (MAC) queues and initiating graph execution.

Graph execution includes manipulating the macro data flow control data structures as part of the graph scheduling function to control the execution of macro data flow control nodes in the arithmetic processors (APs) and the utilization and control of data queues stored in global memory (GM) and controlled by the memory access controller (MAC). These actions are performed by the scheduler (SCH) of the graph process controller (GPC).

Additionally, graph execution also provides command element (CE) interfacing, such as command programming interfacing, as well as the scheduling and command element (CE) scheduling to operate concurrently and asynchronously, thereby minimizing most scheduling overhead.

Graph scheduling includes identifying available arithmetic processors (AP) (in the finish queue) and nodes which are available for processing (based on availability of data via the dispatch queue.

Primitive and superprimitive execution is performed in the arithmetic processor (AP), the primitive and associated data queues. The primitive and associated data queues are identified by the programmer in the macro data flow control graph data structures. The arithmetic processor (AP) which is selected executes the primitive and signals the graph process controller (GPC) when execution of the primitive or superprimitive is complete by placing its identity (ID) on the finish queue in the graph processor controller (GPC). This is the only graph control function performed by the arithmetic processor (AP).

FIG. 54d illustrates the graph process controller (GPC) input/output function. This function is under the control of the graph process controller (GPC) graph control function (D). Depending upon whether or not the data threshold has been crossed, this independent function signals the graph process controller (GPC) at (A) whether to load data identity (ID) into the node finish controller, see FIG. 17, or whether to continue data transfer between the external device and the global memory (GM).

Graph Data Structures

Table IX illustrates the typical contents of the graph data structures. The graph data structures are defined in four separate parts:
 node descriptor block
 queue descriptor block
 trigger queue descriptor block
 node-instance descriptor block.
These data structures are described in detail below, Table VIII.

The command element (CE) is the repository for all user interface software as well as the macro data flow control graph command program. Additionally, it controls the operation of all performance monitor and fault location software in the remaining functional element classes.

Graph control functions are performed in the graph process controller (GPC) using dynamic graph data, structures compiled by the SPL/I compiler, and generated and downloaded from the command element (CE), as seen in FIG. 55.

As illustrated in FIG. 55a, the graph process controller (GPC) received a data structure from the command element (CE) and starts an active graph:

1. Initialize external data device interface (DI), see FIG. 23 and FIGS. 54a and c.
 2. When Q1 exceeds threshold, the external data device interface (DI) places "done" on "Finish" queue, see FIGS. 24 and 54d.
 3. Scheduler (SCH) then processes the external data device interface (DI) done, starting up bandshift, see FIG. 25 and FIGS. 54a and d.
 4. Scheduler (SCH) continues to schedule nodes to available arithmetic processors (AP) based on status of queues, see FIGS. 25 and 54a.
 5. Scheduler (SCH) initializes external data device interface (DI) to output queue N when queue status so indicates.

FIG. 55b illustrates the corresponding steps for a passive graph. The graph process controller (GPC) again receives a data structure from the command element (CE) and starts a passive graph:

1. Initialize the external data device interface (DI) to produce onto Q4, see FIG. 23 and FIGS. 54a and c.
 2. When Q4 exceeds threshold, the external data device interface (DI) places I/0 node ID on "Finish" queue, see FIGS. 24 and 54d.
 3. Scheduler (SCH) then processes the I/O node, see FIG. 25 and FIGS. 54a and d.
 4. Scheduler (SCH) continues to schedule nodes to available arithmetic processors (APs) based on status of queues, see FIGS. 25 and 54a.
 5. Scheduler (SCH) initializes the external data device interface (DI) to output queue N when queue status so indicates.

Signal processing primitives and superprimitives are executed in the arithmetic processors. References (calls) to primitives and superprimitives are performed via the graph data structures. Primitives are implements in the arithmetic processor (AP) microcode. Superprimitives are formed from primitives or other superprimitives using an arithmetic processor (AP) specific SPL/I high order language.

TABLE VIII

| SAMPLE MACRO DATA FLOW CONTROL GRAPH DATA STRUCTURES | |
|---|---|
| Trigger Queue Descriptor Block: | Value |
| Element #0 Pointer to sink node | 1 |
| 1 Pointer to next output trigger queue of source node | 1 |
| 2 Pulse | 1 |
| 3 Threshold | 1 2 |
| 4 Value | 1 2 |
| 5 Consume amount | 2 |
| 6 Pointer to next input trigger queue of sink node | 2 |
| 7 Source node | |
| 8 — | |
| Graph Dynamic Data Structure | |
| Node Descriptor Block: | |
| 0 Normal node flag | |
| 1 Node-Instance block length | |
| 2 Pointer to first node-instance | |
| 3 Pointer to last node-instance | |
| 4 Pointer to first input data queue | |
| 5 Pointer to first input trigger queue | |
| 6 Pointer to first output data queue | |
| 7 Pointer to first output trigger queue | |
| 8 Semaphore value | |
| 9 Node group number | |
| 10 Pointer to control parameter block | |
| 11 Number of items in the control parameter block | |
| 12 Priority | |
| 13 Arithmetic processor (AP) type | |
| 14 Primitive code | |

TABLE VIII-continued
SAMPLE MACRO DATA FLOW CONTROL GRAPH DATA STRUCTURES 15 Node ID
16 —
17 —

Node Instance Descriptor Block:

0 Pointer to node descriptor block
1 Pointer to the next node-instance
2 Block index
3 Primitive code
4 Control parameter address
5 Control parameter number
6 First input data queue define ID
7 Second input data queue define ID
8 Third input data queue define ID
9 First output data queue define ID
10 First output data queue produce amount
11 Second output data queue define ID
12 Second output data queue produce amount
13 —

Date Queue Descriptor Block:

0 Pointer to next input data queue of sink node
1 Maximum produce amount
2 Memory access controller (MAC) queue ID
3 Extendable
4 Pointer to next output data queue of source node
5 Pointer to sink node
6 Consumable
7 Effective threshold
8 Consume amount
9 Read amount
10 Pointer to source node
11 —

Applications Programming Tools and Procedures

The use of the data flow signal processing graph notation language and SPL/I simplifies the user's task of programming the system for signal processing military land command operations. The system translates the command program into SPL/I control and data structures and then into data and instructions for the command element (CE) to be executed by the command element computer such as an AN/UYK-44. The development of a signal processing application follows the macro data flow control methodology. Before the data flow signal processor can be programmed, the specific processing functions to be performed must be defined. These functions are defined in terms of the primitives (filters, FFTs, etc.) available in the data flow signal processor library. The applications programmer needs to define various produce and consume amounts for data queues, define input sensor channels, specify data types and formats, output data channels, and the command program functions, such as vernier controls, racker beams, etc., to be performed. The signal processing graphs to perform the functions are then drawn, the nodes identified, the queues, triggers, and variables names, and the command program structured.

The primary applications programming language is the data flow signal processor graph notation. This is used to write both signal processing and command programs. The signal processing programs are ultimately executed by the graph process controller (GPC) of the data flow signal processor. The command program is executed by the command element (CE). To program an application, the user must define the signal processing functions or graphs to be done using this graph notation. The associated command program is written using this graph notation and SPL/I.

The graph notation signal processing graph is translated into a series of data structures which are interpreted by the functional elements of the data flow signal processor. The graph notation command program is translated into SPL/I control and data structures which are then translated into command element data and instructions to be executed by the command element (CE) (an AN/UYK-44).

Figure 56:
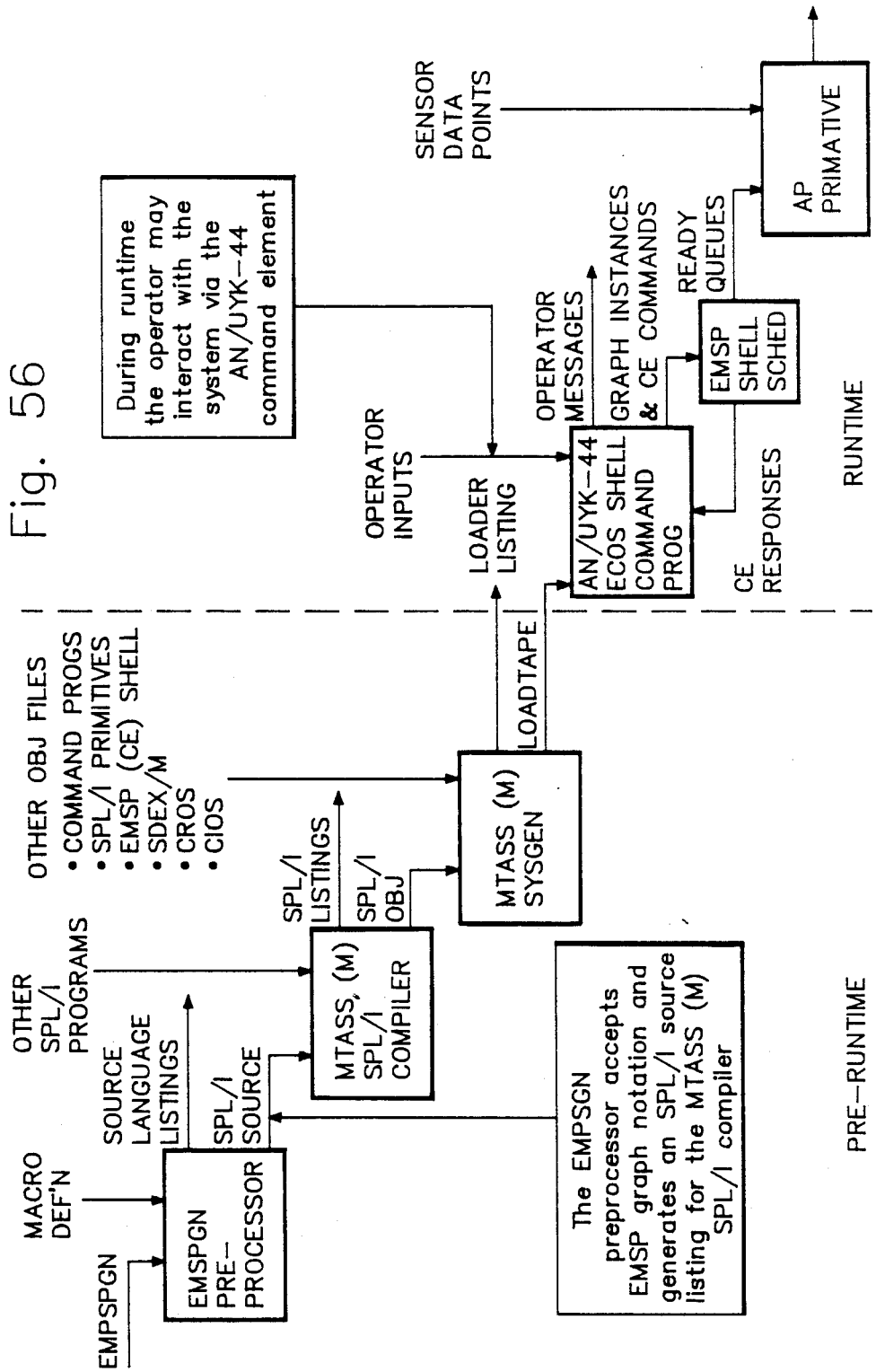
FIG. 56 illustrates the data flow signal processor programming environment.

The user interface is divided into a pre-runtime and a runtime environment. The pre-runtime is a conventional software development environment and the runtime is a real time application environment. The overall process is shown in FIG. 56.

In the pre-runtime environment, three support programs are used to develop an application program. These are the graph notation preprocessor (P), the standard AN/UYK-44 SPL/I compiler (M), and the standard AN/UYK-44 SYSGEN (N). The graph notation preprocessor (P) accepts graph notation (for signal processing or command programs) and the associated macro definitions and then generates an SPL/I source language program of a graph realization and diagnostic listings as output. These SPL/I graphs and command programs are then compiled by the SPL/I compiler (M) into AN/UYK-44 object programs. Program listings of source and object, symbol tables, and other data are also output as hard copy for programmer reference. The graph program, the command program, the macro data flow control (MDFC) shell, and other AN/UYK-44 object programs (such as SDEX/M and CIOS) are linked together by SYSGEN (N) to create a loadable application program. The arithmetic processor primitives, graph process controller code, and macro data flow control (MDFC) shell are then downloaded to the appropriate data flow signal processor functional elements.

At runtime, the graph programs, command program, and macro data flow control shell are loaded into the command element (CE). When a graph is to be run, usually under operator control, the macro data flow control shell, operating in the command element (CE) expands the graph into a graph instance and downloads it to the graph process controller (GPC). The graph is started by the macro data flow control (MDFC) shell operating in the graph process controller (GPC) of the data flow signal processor. Input from sensors is started and the associated graph command program is invoked. During real time operations, the command program and the graph may interact to control operation and reconfiguration.

What is claimed is:

1. A data flow signal processor architecture for implementing macro data flow control, said architecture comprising:
   a global memory having a plurality of data storage spaces and a plurality of data access ports, at least one of said data access ports providing a means for coupling data to be processed into, and processed data out of, said architecture;
   individual data processors coupled in bidirectional data transmission paths to respective ones of said data access ports;

a graph process controller coupled to said data processors for scheduling data processing tasks defined in graphs in said individual data processors;

command element means coupled to said graph process controller for executing a command program and for initiating graph executions in said architecture by downloading descriptions of said graphs to said graph process controller for execution thereby; and memory access controller means coupled to said graph process controller, said plurality of data processors and said global memory, for controlling access to said global memory by said data processors.

2. The architecture set forth in claim 1 in which:
said graph process controller comprises a graph processor memory adapted to received graph data structures from said command element means and store said graph data structures representing said graphs therein.

3. The architecture as set forth in claim 2, in which:
said graph process controller comprises a graph processor memory for receiving said graph data structures, and wherein said graph data structures comprise primitive execution data parameters which are passed to said data processors for use in performing primitive execution operations.

4. The architecture as set forth in claim 1, in which:
said graph process controller comprises a graph processor memory adapted to receive graph data structures from said command element means and store said graph data structures representing said graphs therein, said graph data structures comprising primitive execution data parameters which are passed to said data processors for use in performing primitive execution operations, and wherein said graph data structures including said primitive execution data parameters are shared among said schedules and said data processors to eliminate requirements for the transfer and synchronization of such data.

5. The architecture as set forth in claim 3, wherein said memory access controller is slaved to said graph process controller for addressing and dynamically allocating and deallocating space in said global memory.

6. The architecture as set forth in claim 3, in which:
said data processors are arithmetic processors and said processing tasks include primitive node executions defining arithmetic processes to be performed.

7. The architecture as set forth in claim 1, in which:
said data processors comprise arithmetic processors and said graph process controller provides said processing tasks which include primitive node executions in the form of data queues defining arithmetic processes to be performed in said arithmetic processors; and wherein said graph process controller comprises a scheduler and a node dispatch controller controlled by said scheduler for controlling the allocation of said data queues to said arithmetic processors.

8. A data flow signal processor architecture for implementing macro data flow control, said architecture comprising:

a global memory having a plurality of data storage spaces and a plurality of data access ports, at least one of said data access ports providing a means for coupling data to be processed into, and processed data out of, said architecture;

individual data processors coupled in bidirectional data transmission paths to respective ones of said data access ports;

a graph process controller coupled to said global memory and said data processors for defining and controlling the scheduling and execution of data processing tasks defined in graphs in said individual data processors;

command element means coupled to said graph process controller for executing a command program and for initiating graph executions in said architecture by downloading descriptions of said graphs to said graph process controller for execution thereby;

memory access controller means coupled to said graph process controller, said plurality of data processors and said global memory, for controlling access to said global memory by said data processors under control of the graph process controller; and external interface means coupled between the command element means, the graph process controller and the global memory for providing an interface therebetween that permits the coupling of data and control signals therebetween, and for providing a means to input and output data from the architecture.

9. The architecture as set forth in claim 8 in which:
said graph process controller further comprises a scheduler for controlling the allocation of said data processing tasks to said data processors.

10. The architecture as set forth in claim 8 in which:
said graph process controller comprises a graph processor memory for receiving graphs represented by graph data structures.

11. The architecture as set forth in claim 10, in which:
said memory access controller is slaved to said graph process controller for addressing and dynamically allocating and deallocating space in said global memory.

12. The architecture as set forth in claim 8, in which:
said graph process controller comprises a graph processor memory for receiving and storing graphs represented by graph data structures, and wherein said graph data structures including said primitive execution data parameters are passed to said data processors for use in performing primitive execution operations.

13. The architecture as set forth in claim 8, in which:
said graph process controller comprises a graph processor memory for receiving graphs represented by graph data structures, said graph data structures comprising primitive execution data parameters which are passed to said data processors for use in performing primitive execution operations, and wherein said graph data structures including said primitive execution data parameters are shared among said graph process controller and said data processors to eliminate requirements for the transfer and synchronization of such data.

14. The architecture as set forth in claim 8, in which:
said data processors are arithmetic processors and said processing tasks include primitive node executions defining arithmetic processes to be performed.

15. The architecture as set forth in claim 8, in which:

said data processors comprise arithmetic processors and said graph process controller provides said processing tasks which include primitive node executions in the form of data queues defining arithmetic processes to be performed in said arithmetic processors; and wherein said graph process controller comprises a scheduler and a node dispatch controller controlled by said scheduler for controlling the allocations of said data queues to said arithmetic processors.

* * * * *